(12) United States Patent
Takabatake et al.

(10) Patent No.: US 7,158,483 B1
(45) Date of Patent: Jan. 2, 2007

(54) COMMUNICATION NODE AND COMMUNICATION TERMINAL

(75) Inventors: Yoshiaki Takabatake, Kanagawa (JP); Takeshi Saito, Tokyo (JP); Keiichi Teramoto, Tokyo (JP); Mikio Hashimoto, Chiba (JP); Minoru Namekata, Kanagawa (JP); Toshio Okamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/343,509

(22) Filed: Jun. 30, 1999

(30) Foreign Application Priority Data

Jun. 30, 1998 (JP) .................................. 10-199597
Sep. 11, 1998 (JP) .................................. 10-258839

(51) Int. Cl.
*H04L 12/66* (2006.01)
*H04L 12/28* (2006.01)

(52) U.S. Cl. ...................................... 370/254; 370/401
(58) Field of Classification Search ................ 370/389, 370/392, 393, 400, 401, 402, 408, 419, 422, 370/423, 464, 475, 908, 911, 254, 255, 257; 710/100, 104, 105, 300, 305, 306, 313, 314, 710/315

See application file for complete search history.

(56) References Cited

U.S. PATENT DOCUMENTS

| | | | | |
|---|---|---|---|---|
| 5,937,175 A * | 8/1999 | Sescila et al. | ............... | 710/305 |
| 5,959,536 A * | 9/1999 | Chambers et al. | ........... | 710/104 |
| 6,101,528 A * | 8/2000 | Butt | ............................ | 709/203 |
| 6,199,136 B1 * | 3/2001 | Shteyn | ........................ | 370/260 |
| 6,219,697 B1 * | 4/2001 | Lawande et al. | ............ | 709/220 |
| 6,275,865 B1 * | 8/2001 | Zou | ............................. | 709/245 |
| 6,349,352 B1 * | 2/2002 | Lea | ................................. | 707/1 |
| 6,385,693 B1 * | 5/2002 | Gerszberg et al. | ........... | 711/118 |
| 6,445,690 B1 * | 9/2002 | Sato et al. | .................. | 370/338 |
| 6,523,696 B1 * | 2/2003 | Saito et al. | ................. | 709/223 |

FOREIGN PATENT DOCUMENTS

| | | |
|---|---|---|
| EP | 0 622 924 | 11/1994 |
| EP | 0 756 276 | 1/1997 |
| EP | 0 844 769 | 5/1998 |
| JP | 6-318945 | 11/1994 |

(Continued)

OTHER PUBLICATIONS in.routed Maintenance Command. UNIX Man pages. SunOS 5.6 Copyright 1994.*

(Continued)

*Primary Examiner*—Derrick W. Ferris
(74) *Attorney, Agent, or Firm*—Oblon, Spivak, McClelland, Maier & Neustadt, P.C.

(57) ABSTRACT

The disclosed communication node has a function for recognizing one communication node on the first network as one of constituent elements in own communication node, and a function for disclosing an own configuration information regarding the constituent elements as recognized above, to another communication node on the second network. Also, the disclosed communication terminal has a function for disclosing functions in the own communication terminal as Sub Units in an AV/C (Audio/Visual Control) protocol executed on an IEEE 1394 bus, and a function for receiving at least a part of information regarding Sub Units existing in the communication node on the second network with which it is communicating. Together, these communication node and communication terminal make it possible to transmit various information transferred on the IEEE 1394 bus, to the radio node that is connected by the radio interface, and it becomes possible to execute the data communications as if the connection to the IEEE 1394 bus is made by the radio interface.

6 Claims, 51 Drawing Sheets

FOREIGN PATENT DOCUMENTS

| | | |
|---|---|---|
| JP | 10-145420 | 5/1998 |
| JP | 10-154996 | 6/1998 |
| WO | WO 98/16886 | 4/1998 |

OTHER PUBLICATIONS

Eilley S. "'In Home' Digital Networks and Coredless Options". IEEE. May 23, 1997. pp. 8/1-8/6.*

IEEE. IEEE Standard for a High Performance Serial Bus. Aug. 30, 1996. pp. 16-45.*

T. Sato, 1394 Wireless Bridge with Virtual Bus, pp. 1-8. "A Solution to Wireless Connections in Multi-Bus Network". Jun. 9, 1998.

Saito, T., et al. "Homenetwork Architecture Considering Digital Home Appliances" Technical Report of IEICE. IN97-12B (Nov. 1997).

* cited by examiner (*1 : Only for the cable environment)

FIG.8

| MESSAGE | UTILIZATION FREQUENCY (W) | TIME SLOT (T) |
|---|---|---|
| SB_CONT. req | W=A | T=X |
| SB_CONT. ind<br>SB_CONT. resp | W=A | T=Y |
| TR_DATA. req<br>TR_DATA. conf | W=B | T=X |
| TR_DATA. ind<br>TR_DATA. resp | W=B | T=Y |
| LK_ISO. req | W=C | T=X |
| LK_ISO. ind | W=C | T=Y |
| LK_ISO_CONT. req | W=C | T=$Z_1$ |
| LK_CYCLE. ind | W=C | T=$Z_2$ |

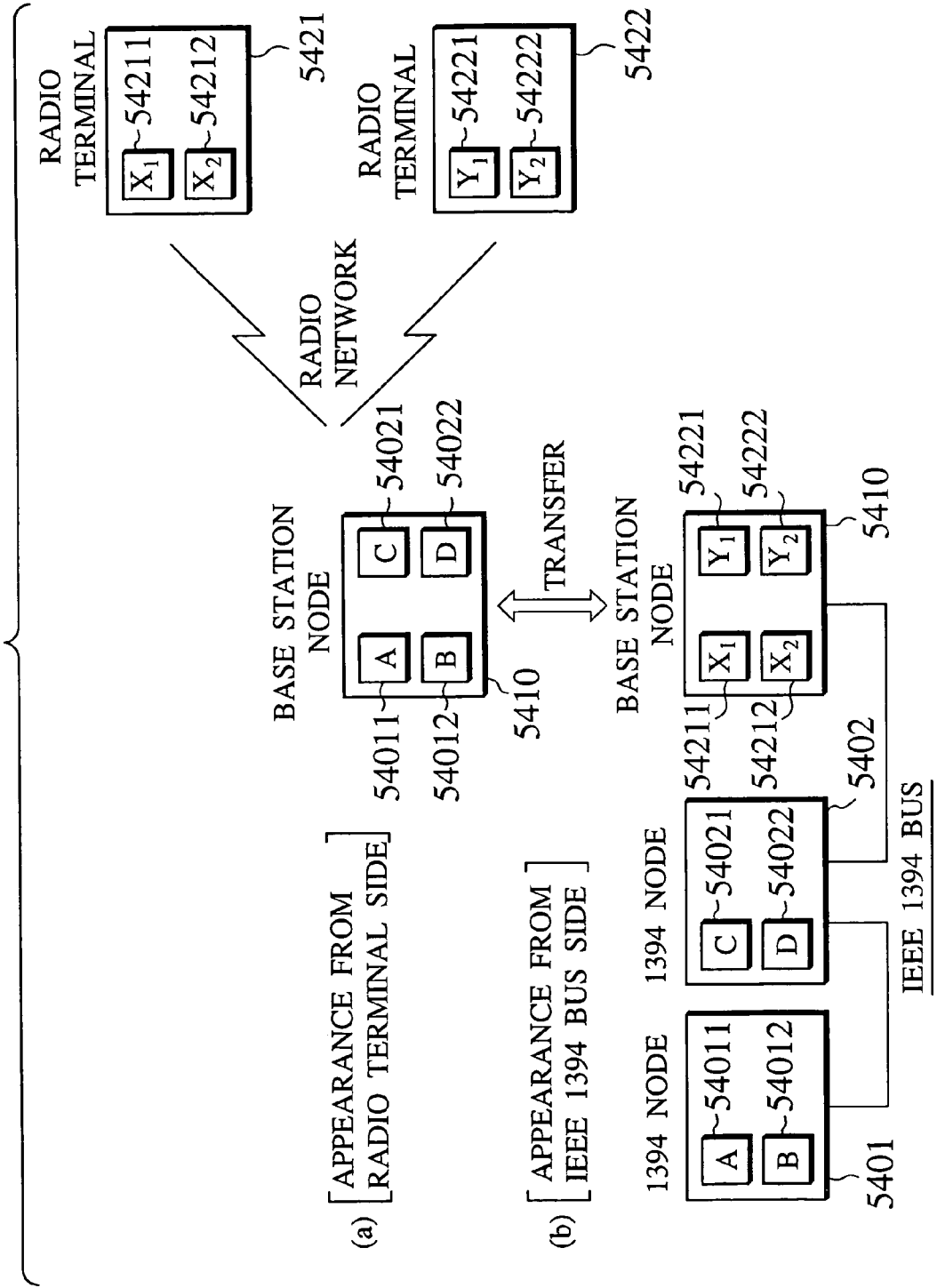

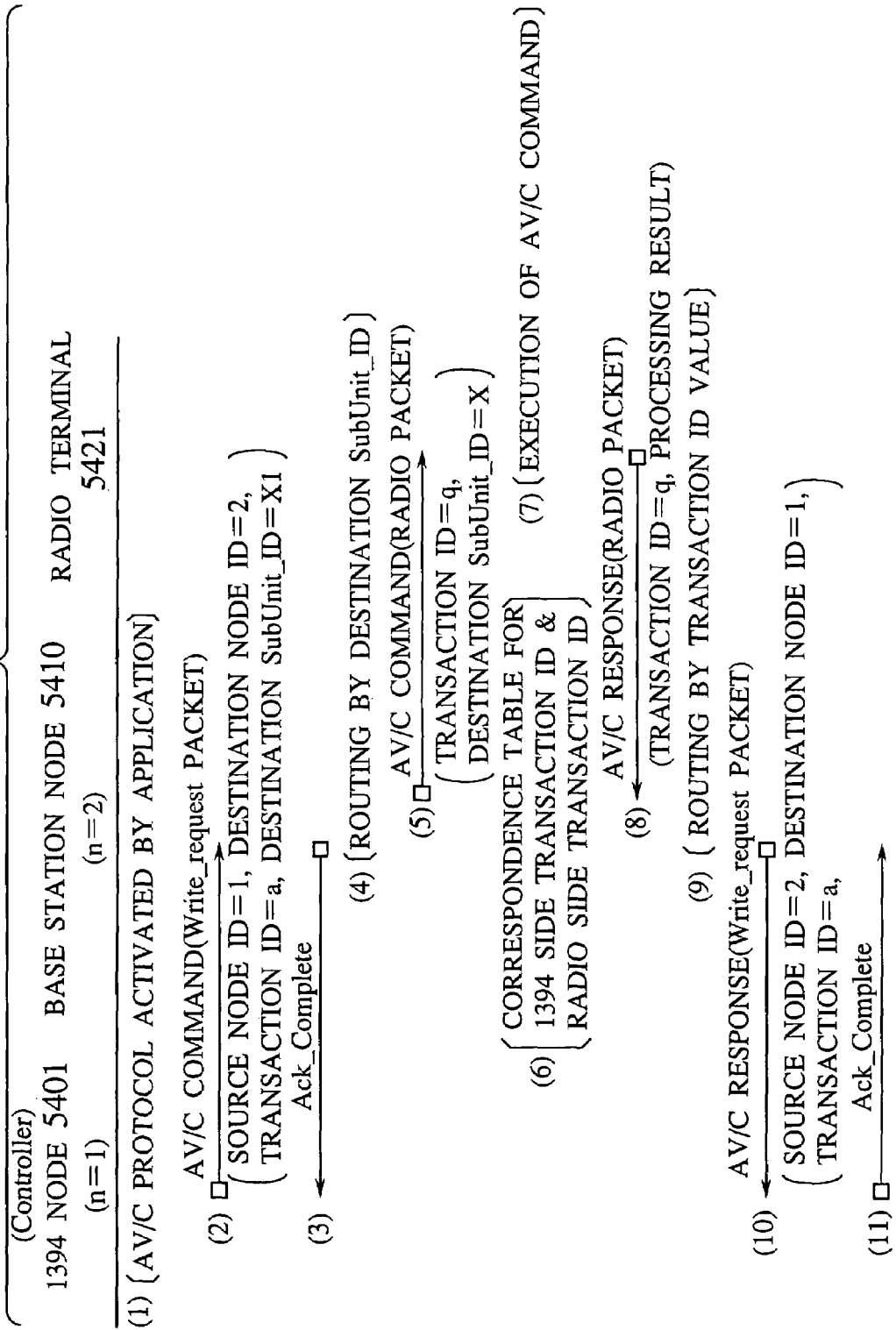

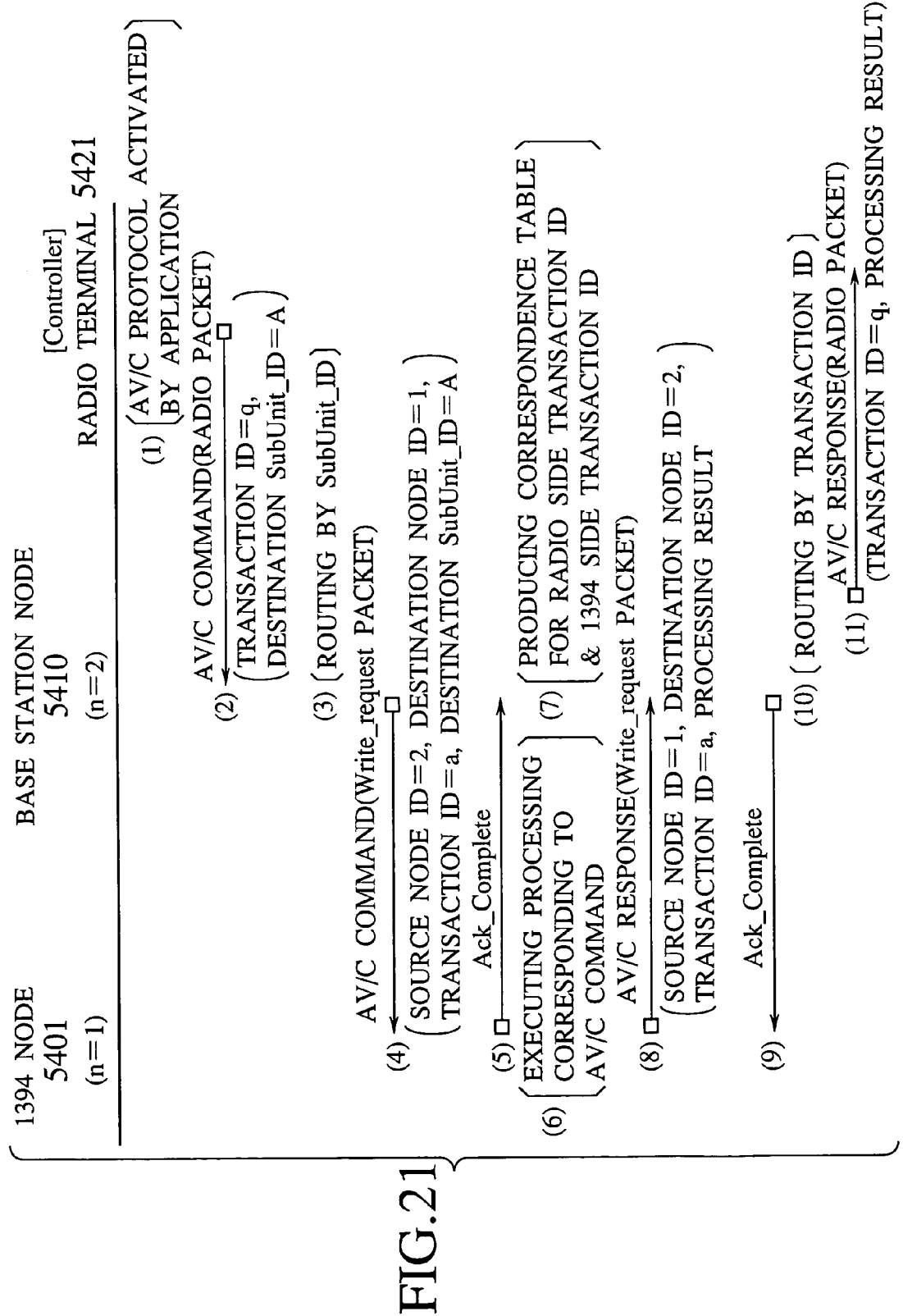

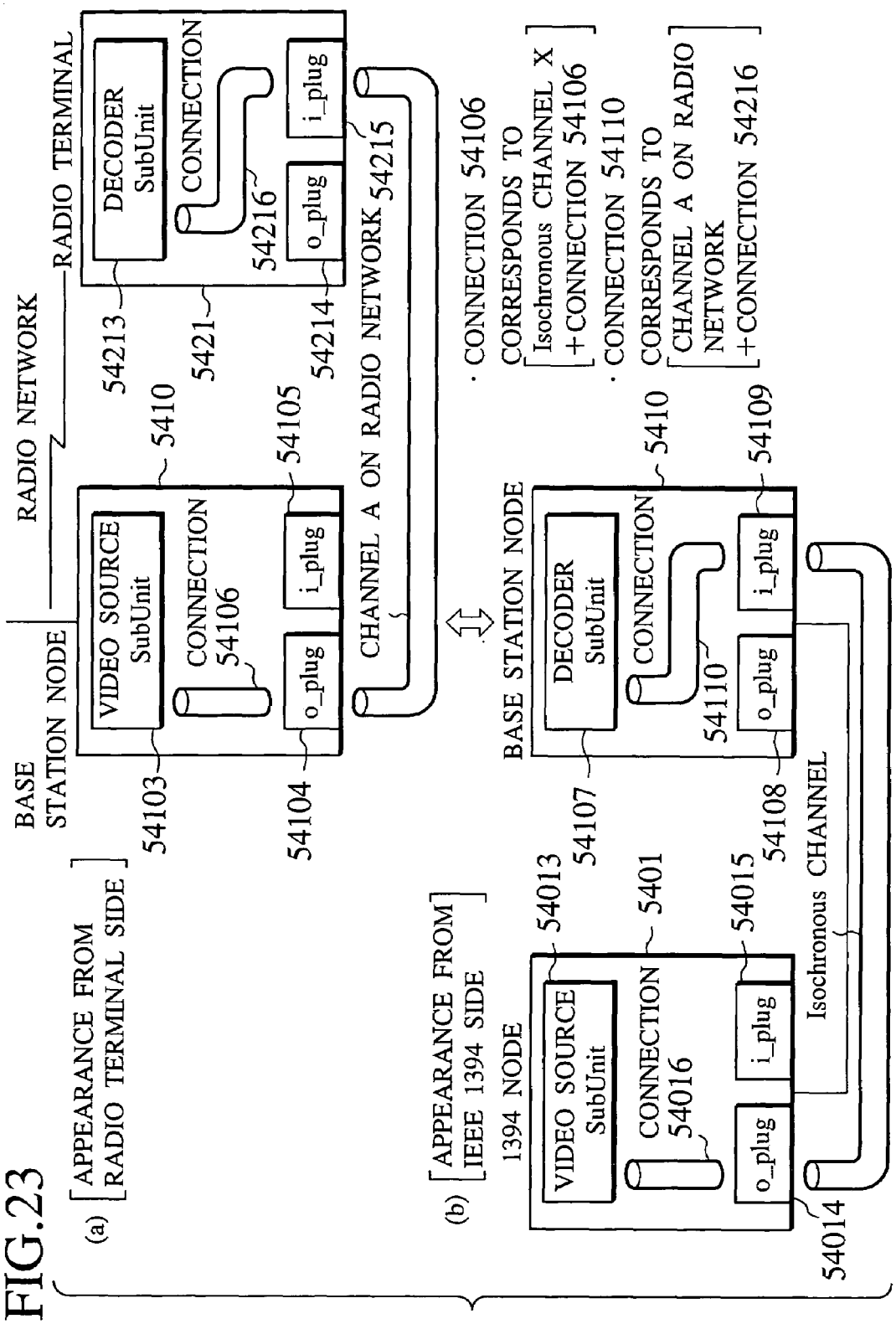

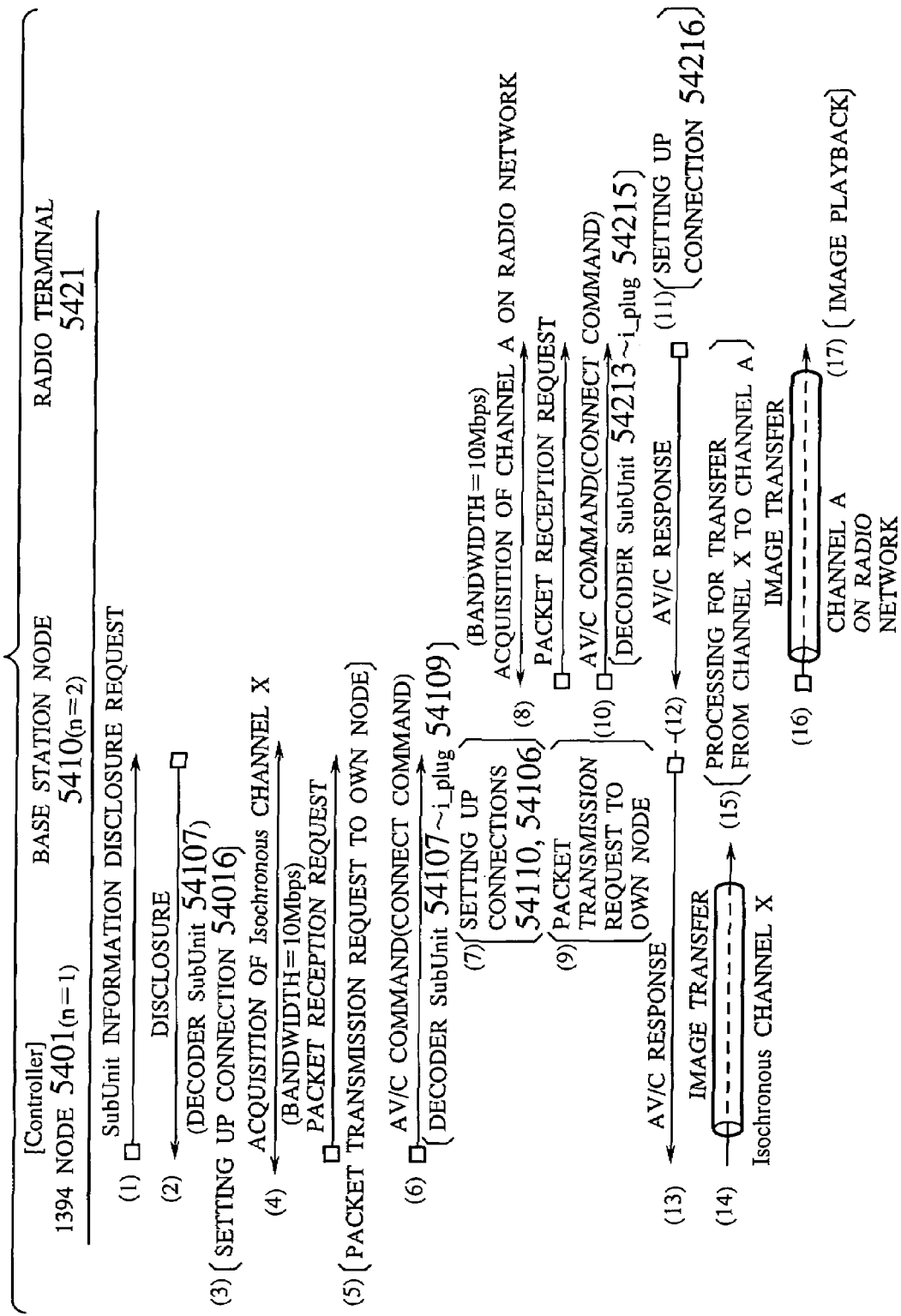

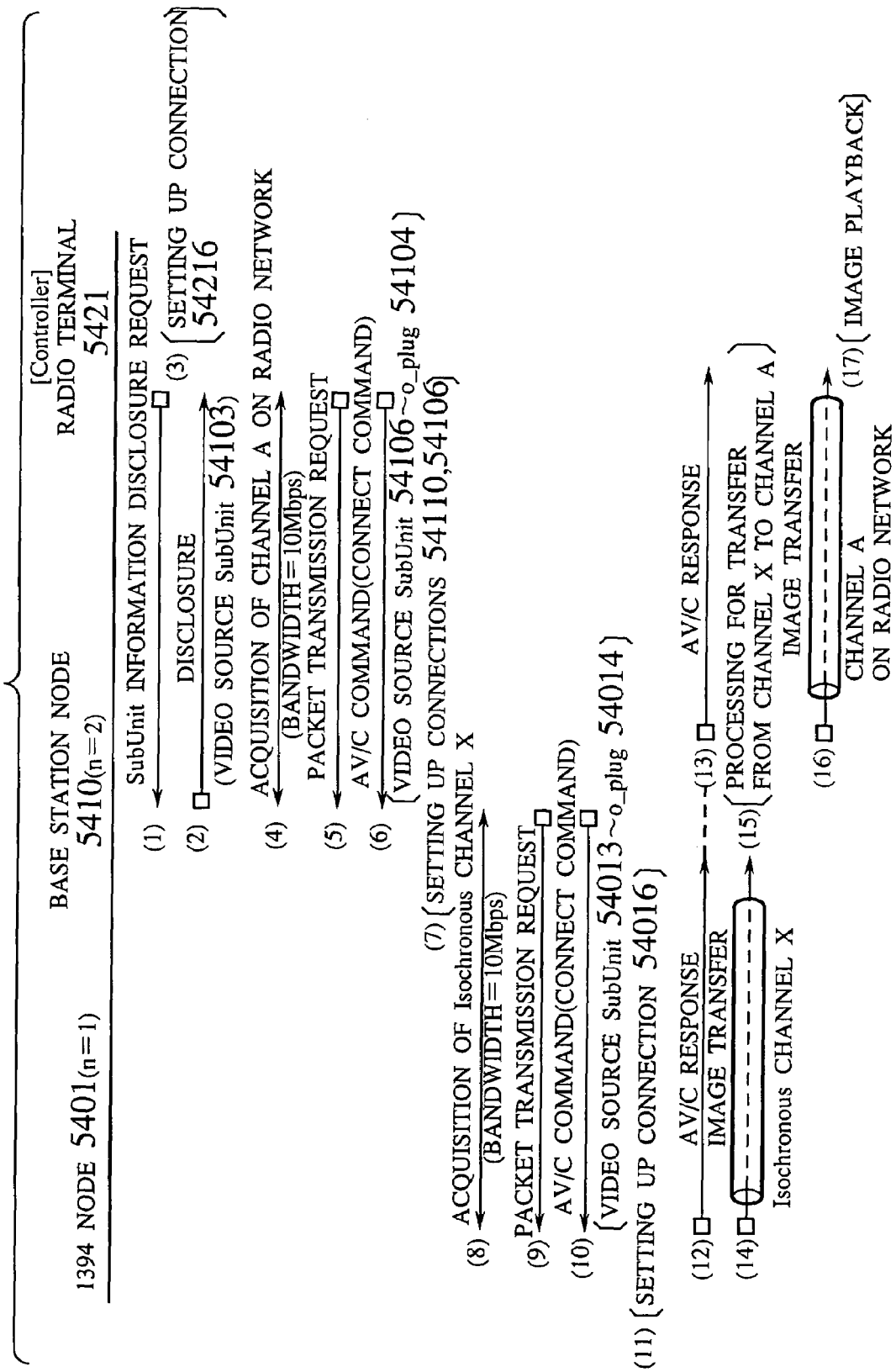

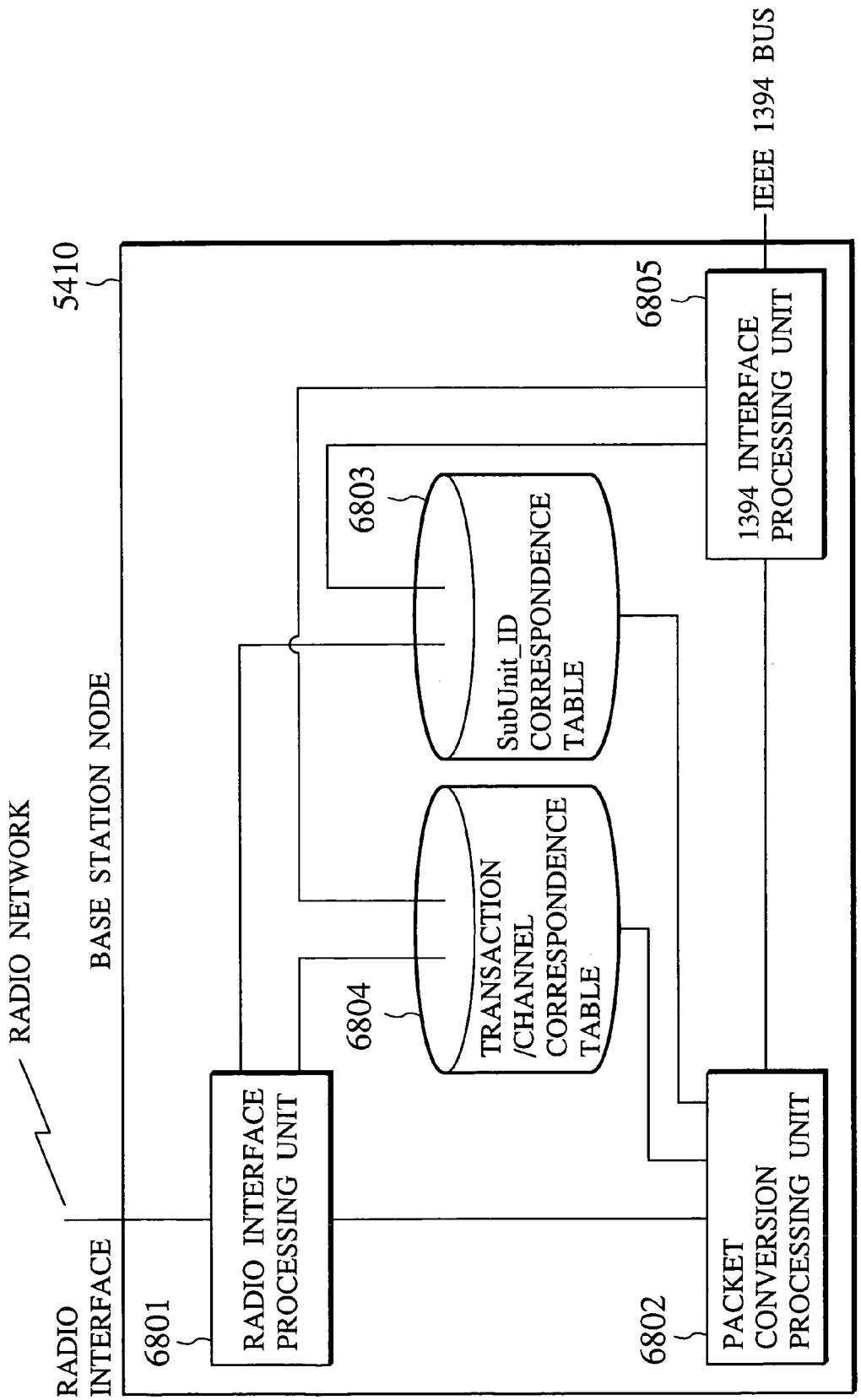

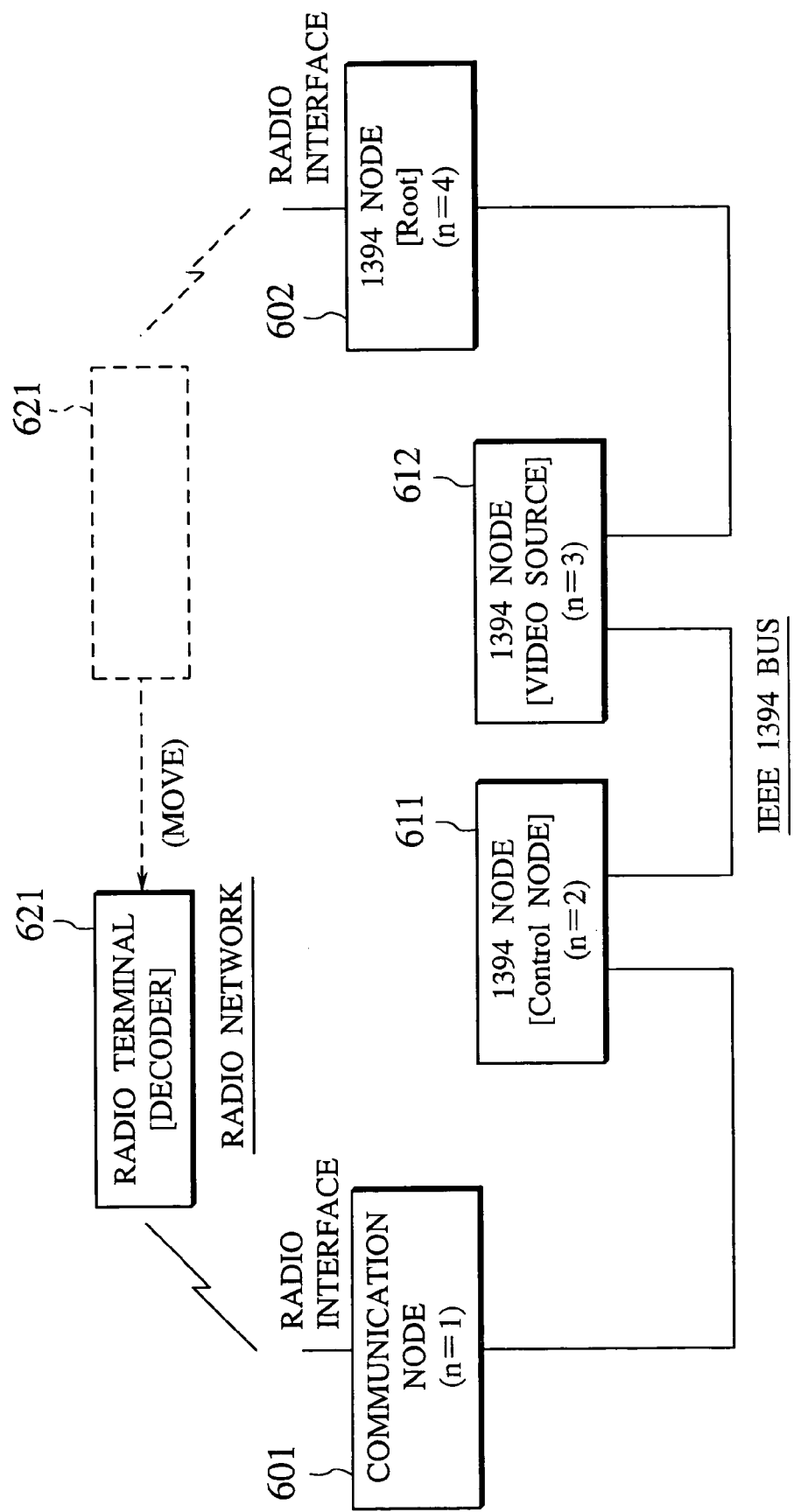

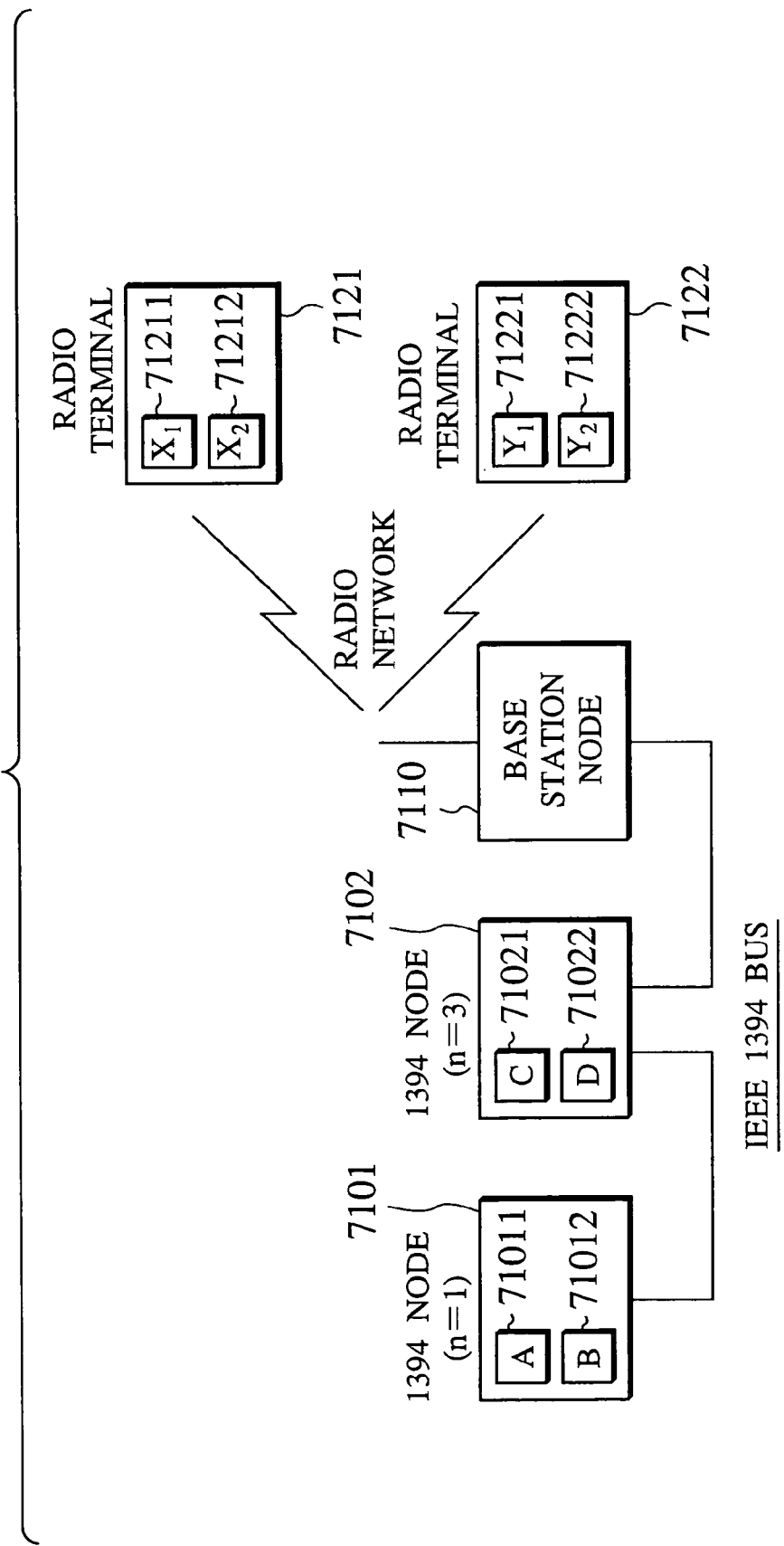

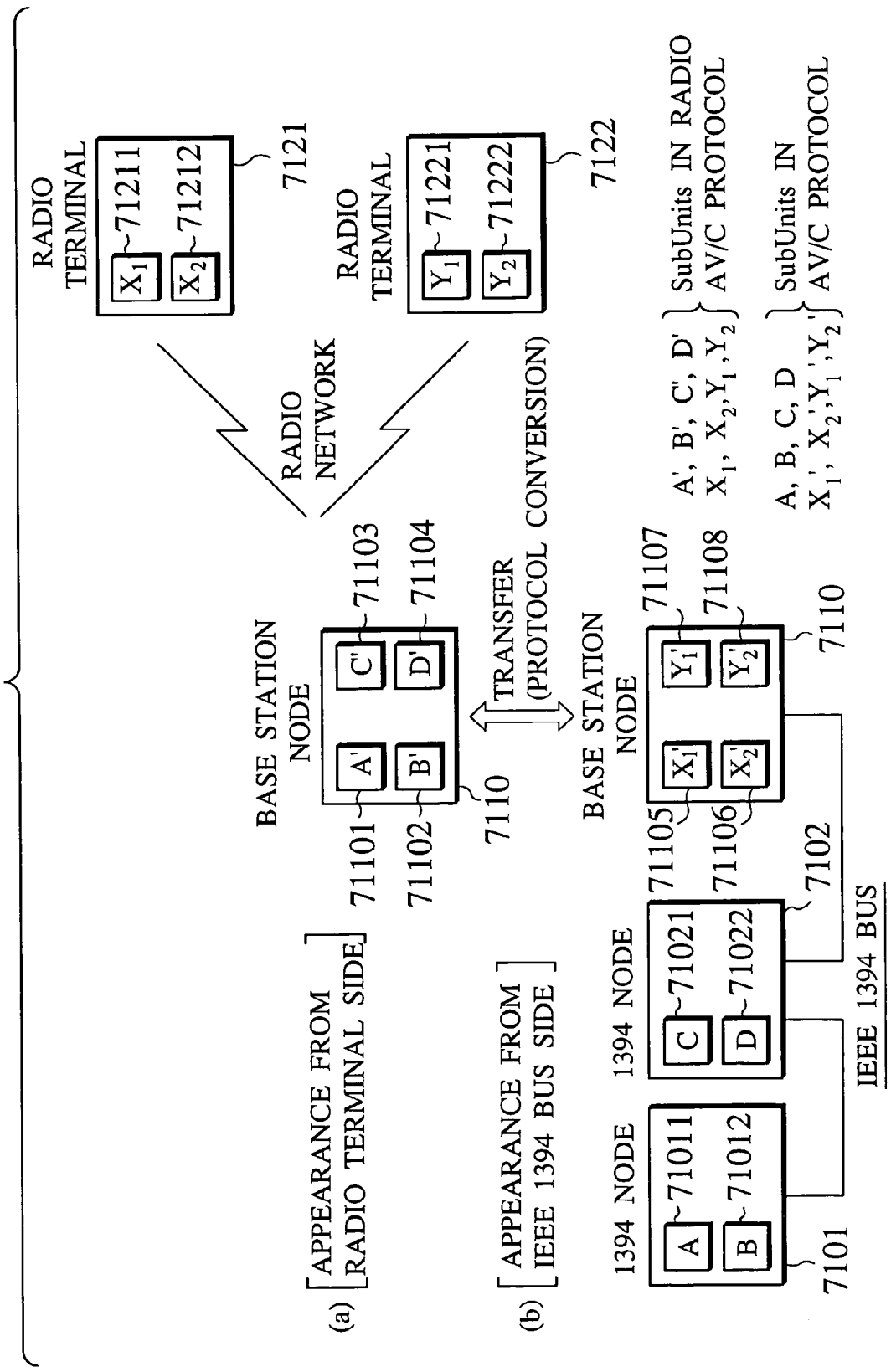

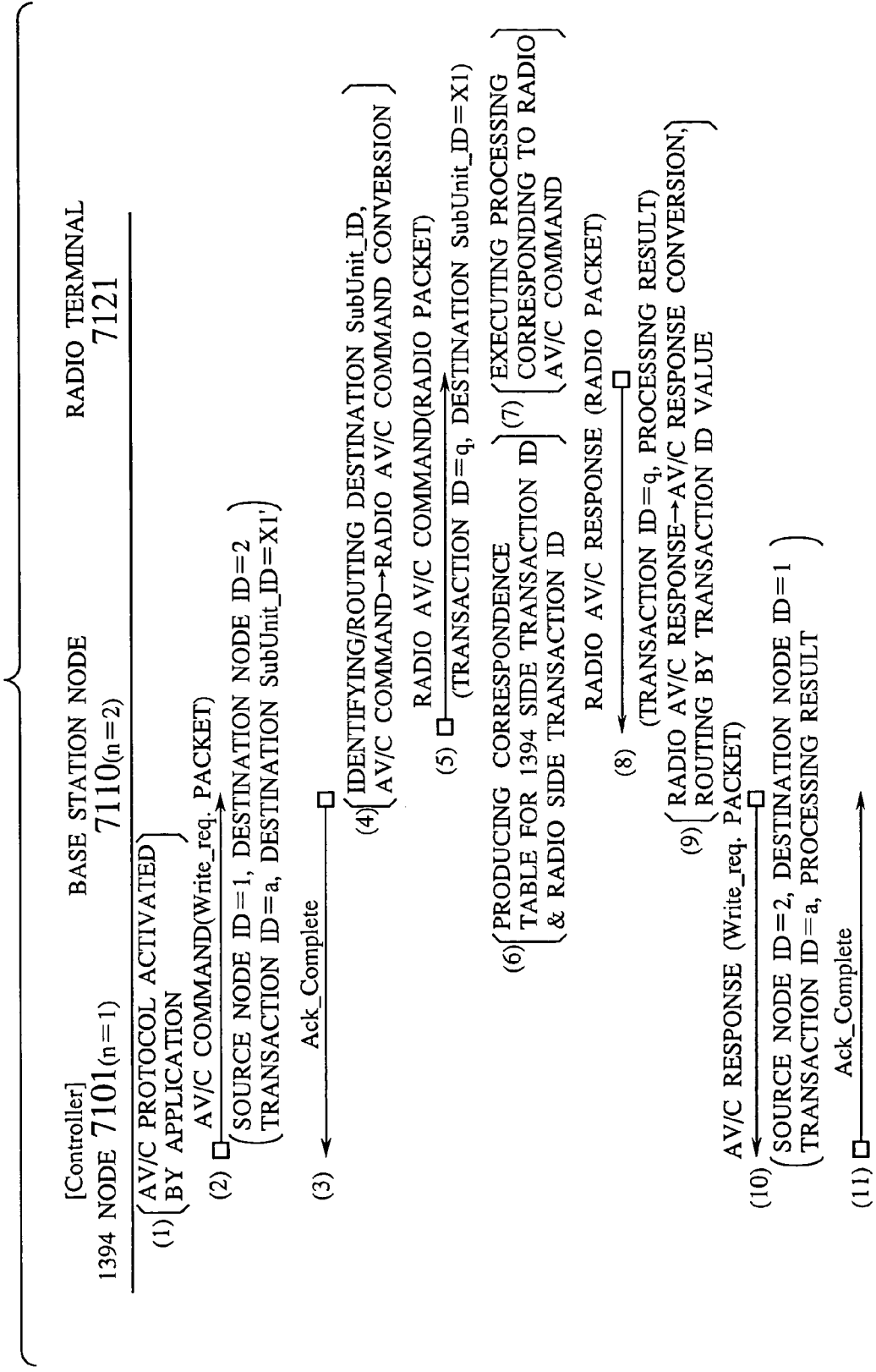

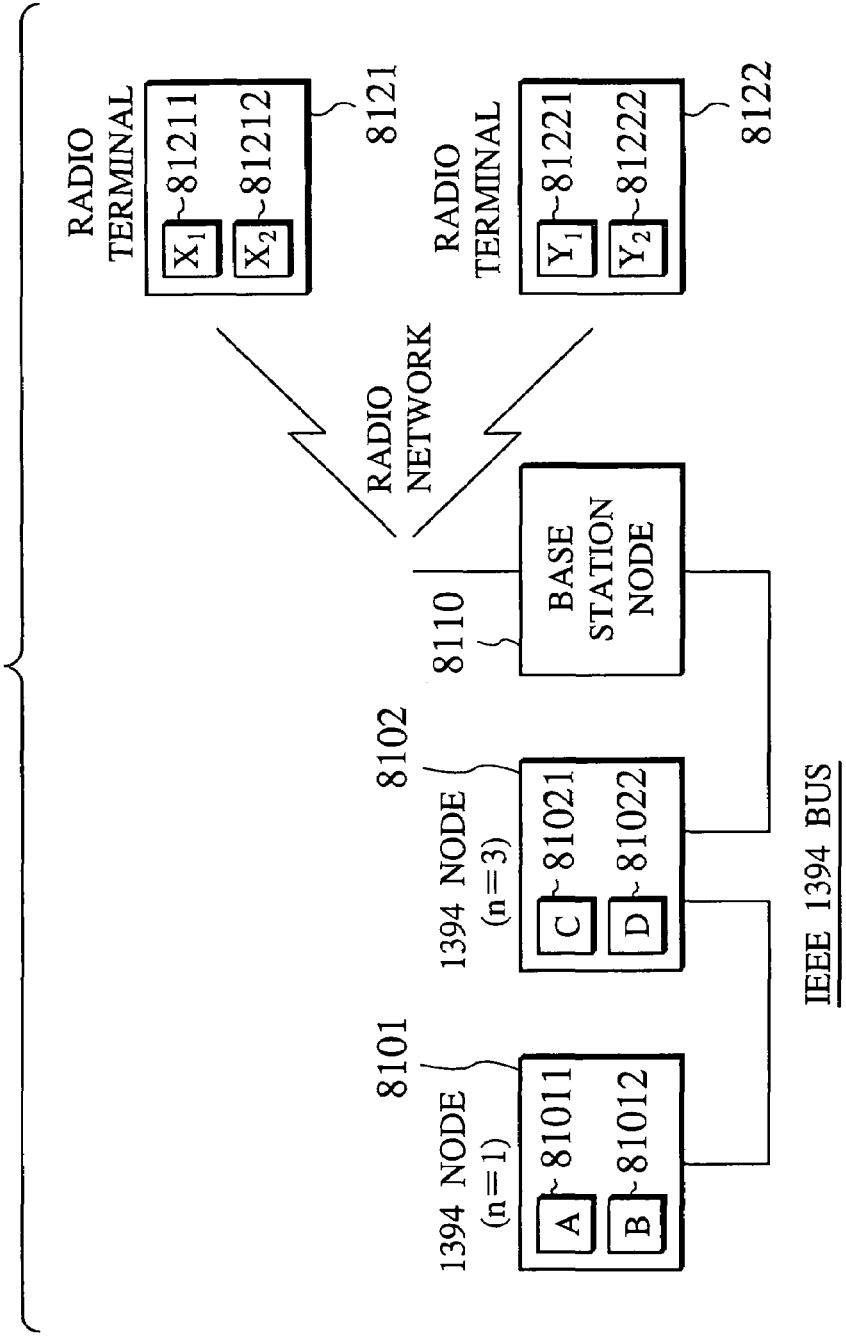

COMMUNICATION NODE AND COMMUNICATION TERMINAL

BACKGROUND OF THE INVENTION

1. Field of the Invention

The present invention relates to a communication node for carrying out data transfer between a first network and a second network, and a communication terminal for carrying out communications with a node on a second network by being connected to a first network.

2. Description of the Background Art

In recent years, the home network formation has been attracting much attention, but such a concept itself is not new and, in particular, the standard specifications such as CEBus and LON have already been proposed for the home network aiming at the home security. In addition, the analog AV cables (white, red, and yellow cables) for connecting AV (Audio Visual) devices can also be regarded as a kind of home network. As such, there have been potential demands for the home network formation even conventionally, but currently it has not come to be used widely except for the AV cables for connecting AV devices, and it can be said that the home network formation has hardly progressed yet.

This is due to problems including that the connections with the other home networks or PCs cannot be made because the conventional AV cables carries out the data transfer using analog signals, and that the conventional home network such as CEBus and LON can only transfer narrow bandwidth data. In addition, the fact that users could not have enjoyed many merits from the conventional home network formation appears to be the major obstacle for its spread.

In view of these problems, a new standard for serial bus called IEEE 1394 that has been developed as a next generation version of SCSI is attracting much attention in recent years. The IEEE 1394 bus is designed such that a plurality of terminals can be connected either in a daisy chain or in a star connection, and wide bandwidth data of over 100 Mbps can be transferred. Also, its most characteristic feature is the fact that both Asynchronous data and Isochronous data can be transmitted on the same cable. For this reason, there are increasingly active trends for using the IEEE 1394 as a cable for connecting AV devices despite of the fact that the IEEE 1394 was originally developed as a next generation version of SCSI.

With this technique, large capacity data such as image information to be transferred between AV devices that have conventionally been transferred by the analog transmission can now be transferred by digital signals using the Isochronous data transfer function of the IEEE 1394. For this reason, in addition to the existing function for connecting AV devices, there is also a function for connecting AV devices with digital devices such as PC so that this technique is attracting much attention lately. In addition, in recent years, there are several propositions for a way of realizing this IEEE 1394 bus even in the radio environment. For instance, an attempt for transferring 100 Mbps of data using the infrared rays and an attempt for implementing the IEEE 1394 protocol on the wide bandwidth radio using high frequency band are have been initiated.

Also, as a way of realizing the radio network in home, a new home radio network has been discussed by an organization called HRFWG (Home Radio Frequency Working Group) which is centered around the Microsoft Inc. of U.S.A. These radio networks basically realize the data transfer between a radio terminal and a node having a base station function on the IEEE 1394 bus, and it is expected that the interworking function with respect to the IEEE 1394 bus will become an indispensable function.

In order to realize such an interworking processing with respect to the IEEE 1394, several functions become necessary. For example, in the case of transferring some kind of compressed image data from a node on the IEEE 1394 bus toward a radio terminal, it is impossible to ascertain what kind of image information should be transferred unless it is possible to ascertain a kind of image data decoding function provided at the radio terminal and a king of image information (how it is encoded, etc.) possessed by the node on the IEEE 1394 bus.

Thus there are increasingly active trends for using the IEEE 1394 as a cable for connecting AV devices, and there are several propositions for realizing the IEEE 1394 bus even in the radio environment. However, the proposition such as the infrared 1394 basically contemplates the direct application of the IEEE 1394 protocol to the radio section, and it has been pointed out that such a proposition does not match the actual IEEE 1394 bus utilization states. In particular, it is expected that the route blocking in the radio section will directly influences the bus reset function of the IEEE 1394 bus, so that there will be a problem that communications on the IEEE 1394 bus will be frequently interrupted due to the route blocking in the radio section.

SUMMARY OF THE INVENTION

It is therefore an object of the present invention to provide a communication node and a communication terminal which are capable of continuing data communications between the communication terminal connected to a first network and the communication node connected to a second network which is operated by a protocol different from the first network, without being influenced by the fluctuating factors on the first network side.

It is another object of the present invention to provide a communication node and a communication terminal which are capable of preventing factors associated with the radio network such as the route blocking or the handoff from influencing the IEEE 1394 bus, in a network environment in which the radio network and the IEEE 1394 bus are mixedly present.

It is another object of the present invention to provide a communication node and a communication terminal which are capable of enabling flexible handling of functions provided at a node on a first network, in a network environment in which the first network such as the radio network and a second network such as the IEEE 1394 bus are mixedly present.

According to one aspect of the present invention there is provided a communication node, comprising: a first interface unit connected to a first network; a second interface unit connected to a second network; a recognition unit for recognizing one communication node on the first network as one of constituent elements in said communication node; and a configuration information disclosure unit for disclosing an own configuration information regarding the constituent elements as recognized by the recognition unit, to another communication node on the second network through the second interface unit.

In this communication node, the configuration information disclosure unit may also disclose existing constituent elements in said one communication node on the first network as sub constituent elements in the constituent elements of said communication node.

This communication node may further comprises: a detection unit for detecting a first message identifier on the second network which is described in a packet received through the second interface unit; a message identifier attaching unit for attaching a second message identifier on the first network to the packet at a time of transferring the packet to the first network; a message identifier correspondence memory unit for storing a correspondence between the first message identifier and the second message identifier; and a routing unit for identifying a message identifier on the second network corresponding to one message identifier on the first network which is described in a packet sent from the first network, by referring to the correspondence stored by the message identifier correspondence memory unit according to said one message identifier.

This communication node may further comprises: a resource acquisition unit having at least one of a function for reserving a network resource on the second network by using a first resource information regarding a network resource reserved on the first network, and a function for reserving a network resource on the first network by using a second resource information regarding a network resource reserved on the second network; and a resource information correspondence memory unit for storing a correspondence between the first resource information and the second resource information.

This communication node may further comprises at least one of: a node constituent elements information addition unit for adding a new configuration information regarding constituent elements in a new communication node to the own configuration information regarding constituent elements in said communication node, when the new communication node is added on the first network; and a node constituent information deletion unit for deleting an old configuration information regarding constituent elements in an old communication node from the own configuration information regarding constituent elements in said communication node, when the old communication node is deleted from the first network.

This communication node may further comprises: a configuration information notification unit for notifying to said one communication node on the first network at least a part of the own configuration information regarding constituent elements in said communication node including constituent elements corresponding to said one communication node or constituent elements in said one communication node; and a configuration information reception unit for receiving from said one communication node at least a part of another configuration information regarding constituent elements in one other communication node on the second network including constituent elements corresponding to said one communication node or constituent elements in said one communication node, that was notified from said one other communication node to which said one communication node was connected up until then.

This communication node may further comprises: a communication resource notification unit for notifying to said one communication node on the first network a resource information regarding communication resources on the second network that are exclusively used for communications between said one communication node and one other communication node on the second network to which said one communication node was connected up until then; and a configuration information reception unit for receiving from said one communication node the resource information, that was notified from said one other communication node.

According to another aspect of the present invention there is provided a communication node, comprising: a first interface unit connected to a first network; a second interface unit connected to a second network; and a configuration information disclosure unit having at least one of a function for disclosing a first configuration information regarding constituent elements in one communication node on the first network as an own configuration information regarding constituent elements in said communication node, to another communication node on the second network through the second interface unit, and a function for disclosing a second configuration information regarding constituent elements in said another communication node on the second network as the own configuration information regarding constituent elements in said communication node, to said one communication node on the first network through the first interface unit.

In this communication node, the configuration information disclosure unit may disclose the first configuration information by defining said one communication node on the first network as one type of constituent elements of said communication node.

This communication node may further comprises: a configuration information correspondence memory unit for storing a correspondence between the first configuration information disclosed to the second network as constituent elements corresponding to said one communication node or constituent elements existing in said one communication node, and actual configuration information regarding said one communication node or constituent elements existing in said one communication node; and a routing unit for identifying a destination communication node on the first network or a destination constituent element of the destination communication node on the first network for a packet sent from the second network, by referring to the configuration information correspondence memory unit according to identifiers of constituent elements in said communication node which are disclosed by the configuration information disclosure unit and described in the packet.

This communication node may further comprises: a detection unit for detecting a first message identifier on the second network which is described in a packet received through the second interface unit; a message identifier attaching unit for attaching a second message identifier on the first network to the packet at a time of transferring the packet to the first network; a message identifier correspondence memory unit for storing a correspondence between the first message identifier and the second message identifier; and a routing unit for identifying a message identifier on the second network corresponding to one message identifier on the first network which is described in a packet sent from the first network, by referring to the correspondence stored by the message identifier correspondence memory unit according to said one message identifier.

This communication node may further comprises: a resource acquisition unit having at least one of a function for reserving a network resource on the second network by using a first resource information regarding a network resource reserved on the first network, and a function for reserving a network resource on the first network by using a second resource information regarding a network resource reserved on the second network; and a resource information correspondence memory unit for storing a correspondence between the first resource information and the second resource information.

This communication node may further comprises at least one of: a node constituent elements information addition unit for adding a new configuration information regarding constituent elements in a new communication node to the own configuration information regarding constituent elements in said communication node, when the new communication node is added on the first network; and a node constituent information deletion unit for deleting an old configuration information regarding constituent elements in an old communication node from the own configuration information regarding constituent elements in said communication node, when the old communication node is deleted from the first network.

This communication node may further comprises: a configuration information notification unit for notifying to said one communication node on the first network at least a part of the own configuration information regarding constituent elements in said communication node including constituent elements corresponding to said one communication node or constituent elements in said one communication node; and a configuration information reception unit for receiving from said one communication node at least a part of another configuration information regarding constituent elements in one other communication node on the second network including constituent elements corresponding to said one communication node or constituent elements in said one communication node, that was notified from said one other communication node to which said one communication node was connected up until then.

This communication node may further comprises: a communication resource notification unit for notifying to said one communication node on the first network a resource information regarding communication resources on the second network that are exclusively used for communications between said one communication node and one other communication node on the second network to which said one communication node was connected up until then; and a configuration information reception unit for receiving from said one communication node the resource information, that was notified from said one other communication node.

According to another aspect of the present invention there is provided a communication node, comprising: a first interface unit connected to a first network; a second interface unit connected to a second network; a packet input/output unit for carrying out packet input/output processing according to a protocol of the second network; and an application interface information transfer unit for transferring data to be exchanged at an interface between the packet input/output unit and an application executed on another communication node on the second network, through the first interface unit, so as to handle one communication node connected through the first interface unit as if said one communication node is connected to the second network.

This communication node may further comprises: a detection unit for detecting a first message identifier on the second network which is described in a packet received through the second interface unit; a message identifier attaching unit for attaching a second message identifier on the first network to the packet at a time of transferring the packet to the first network; a message identifier correspondence memory unit for storing a correspondence between the first message identifier and the second message identifier; and a routing unit for identifying a message identifier on the second network corresponding to one message identifier on the first network which is described in a packet sent from the first network, by referring to the correspondence stored by the message identifier correspondence memory unit according to said one message identifier.

This communication node may further comprises: a resource acquisition unit having at least one of a function for reserving a network resource on the second network by using a first resource information regarding a network resource reserved on the first network, and a function for reserving a network resource on the first network by using a second resource information regarding a network resource reserved on the second network; and a resource information correspondence memory unit for storing a correspondence between the first resource information and the second resource information.

According to another aspect of the present invention there is provided a communication terminal, comprising: an interface unit connected to a first network; a connection unit for making a connection to a first communication node on the first network through the interface unit; a communication unit for communicating with a second communication node on a second network different from the first network, through the first communication node; a communication terminal function disclosure unit for disclosing functions in said communication terminal as Sub Units in an AV/C (Audio/Visual Control) protocol executed on an IEEE 1394 bus; and a Sub Unit information reception unit for receiving at least a part of information regarding Sub Units existing in the second communication node.

This communication terminal may further comprises: a configuration information reception unit for receiving at least a part of a configuration information regarding constituent elements existing in the first communication node including a constituent element corresponding to said communication terminal, which is notified from the first communication node in order for the first communication node to handle said communication terminal as one of constituent elements existing in the first communication node; a configuration information memory unit for storing at least a part of the configuration information received by the configuration information reception unit; and a configuration information notification unit for notifying at least a part of the configuration information stored in the configuration information memory unit, to a third communication node on the second network to which said communication terminal is newly connected.

This communication terminal may further comprises: a communication resource information reception unit for receiving a communication resource information regarding communication resources on the second network which are exclusively used for communications between said communication terminal and the second communication node, which is notified from the first communication node; a communication resource information memory unit for storing at least a part of the communication resource information received by the communication resource information reception unit; and a communication resource information transfer unit for notifying the communication resource information stored in the communication resource information memory unit, to a third communication node on the second network to which said communication terminal is newly connected.

According to another aspect of the present invention there is provided a communication terminal, comprising: an interface unit connected to a first network; a connection unit for making a connection to a first communication node on the first network through the interface unit; a communication unit for communicating with a second communication node on a second network different from the first network, through the first communication node; and an application execution unit for executing an application on the second network which is to be executed in the second communication node.

This communication terminal may further comprises: a configuration information reception unit for receiving at least a part of a configuration information regarding constituent elements existing in the first communication node including a constituent element corresponding to said communication terminal, which is notified from the first communication node in order for the first communication node to handle said communication terminal as one of constituent elements existing in the first communication node; a configuration information memory unit for storing at least a part of the configuration information received by the configuration information reception unit; and a configuration information notification unit for notifying at least a part of the configuration information stored in the configuration information memory unit, to a third communication node on the second network to which said communication terminal is newly connected.

This communication terminal may further comprises: a communication resource information reception unit for receiving a communication resource information regarding communication resources on the second network which are exclusively used for communications between said communication terminal and the second communication node, which is notified from the first communication node; a communication resource information memory unit for storing at least a part of the communication resource information received by the communication resource information reception unit; and a communication resource information transfer unit for notifying the communication resource information stored in the communication resource information memory unit, to a third communication node on the second network to which said communication terminal is newly connected.

In the present invention as described above, when the first network is a radio network, the communication node to be connected to the first network is a radio terminal, for example.

Also, when the second network is an IEEE 1394 bus, the communication node on the second network is a 1394 node, for example.

Note that the communication node according to the present invention itself corresponds to a node on the second network. For example, when a plurality of communication nodes according to the present invention are connected to the IEEE 1394 bus and a radio terminal connected to the radio network communicates with the other communication node through the communication node according to the present invention, the other communication node is functioning as the 1394 node on the second network.

Note that it is also possible for the communication terminal connected to the first network to communicate through a relaying function of the communication node according to the present invention with a device corresponding to a Sub Unit (on the second network) in that communication node.

The communication node according to the present invention has two interface functions for the first network (radio network, for example) and the second network (IEEE 1394 bus, for example), and a node processing load distribution unit for providing a function for the purpose of operating as a node (IEEE 1394 node, for example) on the second network by a combination with the communication terminal (radio terminal, for example) with which it is connected by the first network. At this point, the interface between the communication node and the communication terminal becomes the so called 1394 API and information transferred between the IEEE 1394 interface processing function portion and the upper layer application execution portion is transferred by the first network such as the radio network, for example.

Also, in the case where the first network is the radio network and the second network is the IEEE 1394 bus, for example, the communication node maintains a correspondence between the transaction identifier on the IEEE 1394 bus and a transaction identifier on the radio network, a correspondence between the Isochronous channel on the IEEE 1394 bus and the resource information on the radio network, etc., and provides the protocol conversion function between the IEEE 1394 bus and the radio network.

In this way, by the combination of the communication node and the communication terminal of the present invention, it becomes possible to provide the node functions on the second network such as the IEEE 1394 bus, so that it becomes possible to provide the service on the second network to the user.

The communication node according to the present invention has two interface functions for the first network (radio network, for example) and the second network (IEEE 1394 bus, for example), and introduces the constituent elements (Sub Units, for example) in the communication terminal (radio terminal, for example) existing on the first network to the second network side as the constituent elements in the own node. It also introduces the constituent elements in nodes on the second network to the first network side as the constituent elements in the own node. Each of the communication node and the radio terminal also has a function for loading an FCP frame to be used in the AV/C protocol into a packet to be transferred on the radio network, for example.

Also, in the case where the first network is the radio network and the second network is the IEEE 1394 bus, the communication node maintains a correspondence between a transaction identifier on the IEEE 1394 bus and a transaction identifier on the radio network, a correspondence between the Isochronous channel on the IEEE 1394 bus and the resource information on the radio network, etc., and provides the protocol conversion function between the IEEE 1394 bus and the radio network.

In this way, the communication node of the present invention can carry out communications using FCP frames in the AV/C protocol with respect to the radio terminal, for example, so that it becomes possible to recognize Sub Units in each node or radio terminal each other without being conscious of the physical layer. As a result, the smooth execution of the AV/C protocol or the HAVi protocol over the radio network and the IEEE 1394 bus becomes possible. Also, even in the case where a plurality of radio terminals exist on the radio network and they are recognized as being contained in a single base station node, it becomes possible to identify the Sub Units on each radio terminal.

The communication node according to the present invention has a communication resource information notification function for notifying information (communication resource information) regarding constituent elements in the own node that correspond to constituent elements (Sub Units, for example) in the communication terminal (radio terminal, for example), to that communication terminal, a communication resource information reception function for receiving the communication resource information in the other communication node to which that communication terminal has been connected up until it is connected to the own node, from that communication terminal, a resource identifier notification function for notifying an identifier (channel number of Isochronous channel of IEEE 1394 bus, for example) of the communication resource on the second network which is reserved by that radio terminal for the purpose of communicating with a node on the second network (IEEE 1394 bus, for example), to that radio terminal, and a resource identifier reception function for receiving the identifier of the communication resource that is notified to that radio terminal by the resource identifier notification function.

In this way, even in the case where the communication node to be connected is changed as the communication terminal moves, it becomes possible to continue the connection with that communication terminal quickly (the execution of the so called handoff processing). By adding such a handoff function, it becomes possible to continue the communications while the communication terminal moves, under the environment in which a plurality of communication nodes having the base station function exist on the second network (IEEE 1394 bus, for example), without requiring the reset processing of the second network (including the configuration recognition) (the bus reset processing of the IEEE 1394 bus, for example).

The communication node according to the present invention has two interface functions for the first network (radio network, for example) and the second network (IEEE 1394 bus, for example), and introduces the communication terminal (radio terminal, for example) existing on the first network to the second network side as the constituent elements (Sub Units, for example) in the own node. It also introduces the constituent elements in nodes on the second network to the first network side as the constituent elements in the own node. Also, each of the communication node and the radio terminal also has a function for loading an FCP frame to be used in the AV/C protocol into a packet to be transferred on the radio network, for example. In addition, in the case where the correspondent to which the AV/C command is to be transferred is the radio terminal, for example, the communication node executes the AV/C protocol for radio terminal (protocol which transfers the AV/C command by assuming that the radio terminal Sub Unit exists in the 1394 node and Sub Units exist in that radio terminal Sub Unit) rather than the usual AV/C protocol.

Also, in the case where the first network is the radio network and the second network is the IEEE 1394 bus, the communication node according to the present invention maintains a correspondence between a transaction identifier on the IEEE 1394 bus and a transaction identifier on the radio network, a correspondence between the Isochronous channel on the IEEE 1394 bus and the resource information on the radio network, etc., and provides the protocol conversion function between the IEEE 1394 bus and the radio network.

In this way, the communication node of the present invention can send the control message by using the radio AV/C protocol for the transfer of the AV/C command to the radio terminal or the usual AV/C protocol for the transfer of the AV/C command to the usual 1394 node, for example. Also, it becomes possible to recognize Sub Units in each node or radio terminal each other without being conscious of the physical layer. As a result, the smooth execution of the AV/C protocol over the radio network and the IEEE 1394 bus becomes possible. Also, even in the case where a plurality of radio terminals exist on the radio network and they are recognized as being contained in a single base station node, it becomes possible to identify the Sub Units on each radio terminal.

As described, according to the present invention, it becomes possible to transmit various information transferred on the IEEE 1394 bus, to the radio node that is connected by the radio interface, and it becomes possible to execute the data communications as if the connection to the IEEE 1394 bus is made by the radio interface. Also, even when the route blocking occurs in the radio section, it is possible to continue the data transfer without giving its influence to the IEEE 1394 bus side (without causing the bus reset), and even when the handoff processing is executed in the case where the radio terminal is moving, it is possible to continue the data transfer without giving its influence to the IEEE 1394 bus side (without causing the bus reset).

Also, according to the present invention, it is possible to flexibly handle functions provided at a node on the first network, in a network environment in which the first network such as the radio network and the second network such as the IEEE 1394 bus are mixedly present.

Also, according to the present invention, it becomes possible to make the radio terminal and the constituent elements in the radio terminal appear as if they are a single constituent element in the IEEE 1394 node, to the other nodes on the IEEE 1394 bus, while resolving the problems that are expected to arise in the radio section by processing the radio communications between the radio terminal and the communication node as the communications between the constituent elements in the communication node.

Also, according to the present invention, it becomes possible to provide the network connection function that does not depend on the types of the networks, which is suitable for the case of using Ethernet as the first network and the radio network as the second network, for example.

Other features and advantages of the present invention will become apparent from the following description taken in conjunction with the accompanying drawings.

BRIEF DESCRIPTION OF THE DRAWINGS

FIG. 8 is a diagram showing a table for an exemplary allocation of 1394 API onto a radio network according to the first embodiment of the present invention.

FIG. 17 is a diagram showing another exemplary state of recognition of node constituent elements according to the second embodiment of the present invention.

FIG. 20 is a sequence chart of another exemplary processing sequence for a packet transfer according to the second embodiment of the present invention.

FIG. 21 is a sequence chart of still another exemplary processing sequence for a packet transfer according to the second embodiment of the present invention.

FIG. 23 is a diagram showing an exemplary state of resource acquisition in a case of transferring image data between a node on an IEEE 1394 bus and a terminal on a radio network according to the second embodiment of the present invention.

FIG. 24 is a sequence chart of an exemplary resource acquisition procedure on an IEEE 1394 bus and a radio network according to the second embodiment of the present invention.

FIG. 25 is a sequence chart of another exemplary resource acquisition procedure on an IEEE 1394 bus and a radio network according to the second embodiment of the present invention.

FIG. 26 is a block diagram showing an exemplary internal configuration of a base station node according to the second embodiment of the present invention.

FIG. 28 is a schematic diagram showing an exemplary network configuration using communication nodes according to the third embodiment of the present invention in a case where a radio terminal moves and changes a base station node.

FIG. 38 is a schematic diagram showing an exemplary network configuration using communication nodes according to the fifth embodiment of the present invention.

FIG. 39 is a diagram showing an exemplary state of recognition of node constituent elements according to the fifth embodiment of the present invention.

FIG. 42 is a sequence chart of an exemplary processing sequence for a packet transfer according to the fifth embodiment of the present invention.

FIG. 47 is a schematic diagram showing another exemplary network configuration using communication nodes according to the fifth embodiment of the present invention.

DETAILED DESCRIPTION OF THE PREFERRED EMBODIMENTS

In the following, six embodiments of the present invention will be described.

In short, the first embodiment is directed to the case where a communication node having a radio interface and a 1394 interface carries out functions below the transaction layer on behalf of a radio terminal connected to the own node, such that a combination of the radio terminal and the communication node can function as a single 1394 node.

On the other hand, the second to sixth embodiments are directed to the case where a service function of the radio terminal is recognized as a Sub Unit of the 1394 node, or the radio terminal is recognized as a Sub Unit of the 1394 node while a service function of the radio terminal is recognized as a Sub Unit within a Sub Unit (Sub_Sub Unit) of the 1394 node.

Referring now to FIG. 1 to FIG. 12, the first embodiment of a communication node and a communication terminal according to the present invention will be described in detail.

Figure 1:
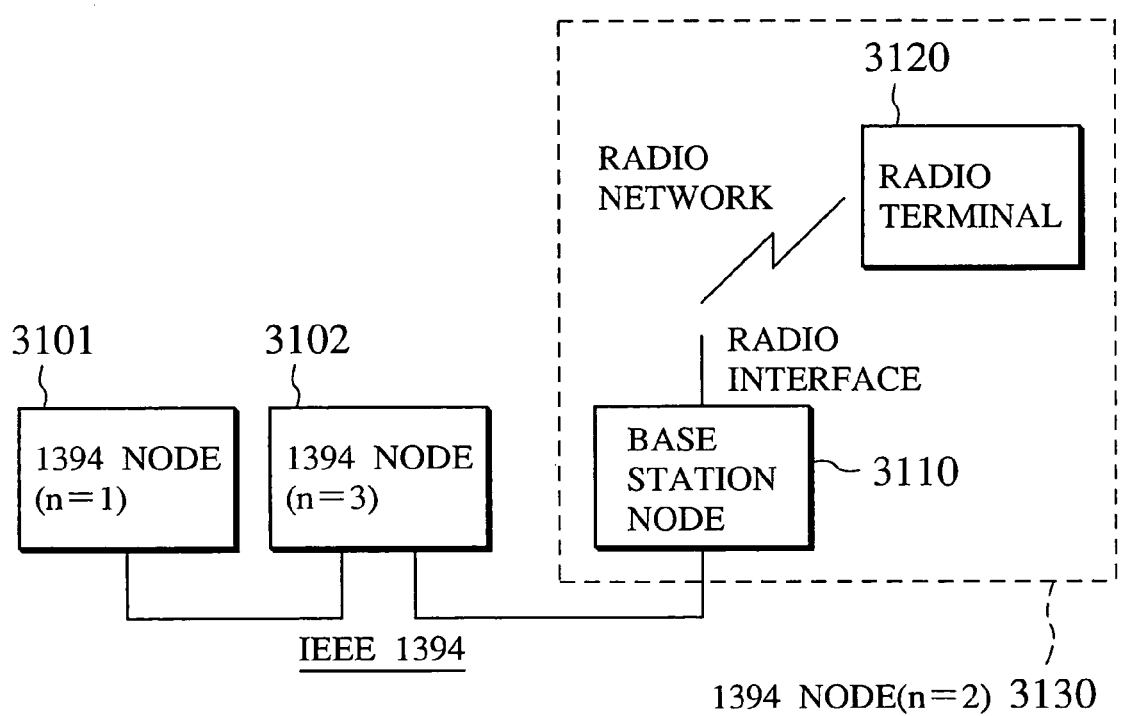
FIG. 1 is a schematic diagram showing an exemplary network configuration using communication nodes according to the first embodiment of the present invention.

FIG. 1 shows a schematic configuration of a network in this first embodiment. In the configuration of FIG. 1, 1394 nodes 3101 and 3102 are present on an IEEE 1394 bus, and further a base station node 3110 is connected. Also, a radio terminal 3120 is connected to the base station node 3110 through a radio network.

Here, the base station node 3110 and the radio terminal 3120 operate as a single 1394 node 3130 as a result of having these two node/terminal connected with each other. Consequently, from a viewpoint of the 1394 node 3101 on the IEEE 1394 bus, the base station node 3110 will be recognized as if it is a 1394 node 3130 (a block enclosed by a dashed line in FIG. 1 will be recognized as the 1394 node 3130).

In addition, in FIG. 1, each node is assigned with a physical ID on the 1394 bus. More specifically, the 1394 node 3101 has a node ID=1 (n=1), the 1394 node 3102 has a node ID=3 (n=3), and the 1394 node 3130 has a node ID=2 (n=2). Thus, according to the specification of the IEEE 1394-1995, the 1394 node 3102 is the Root node on the IEEE 1394 bus.

In this first embodiment, the base station node 3110 executes a function of an 1394 interface function portion (1394 board portion in a PC, for example) of the 1394 node 3130 such that it is possible to behave as if there exists some 1394 node on the IEEE 1394 bus even when the radio terminal 3120 is not connected to the base station node 3110. An exemplary IEEE 1394 protocol processing allocation in such a 1394 node 3130 is shown in FIG. 2.

Figure 2:
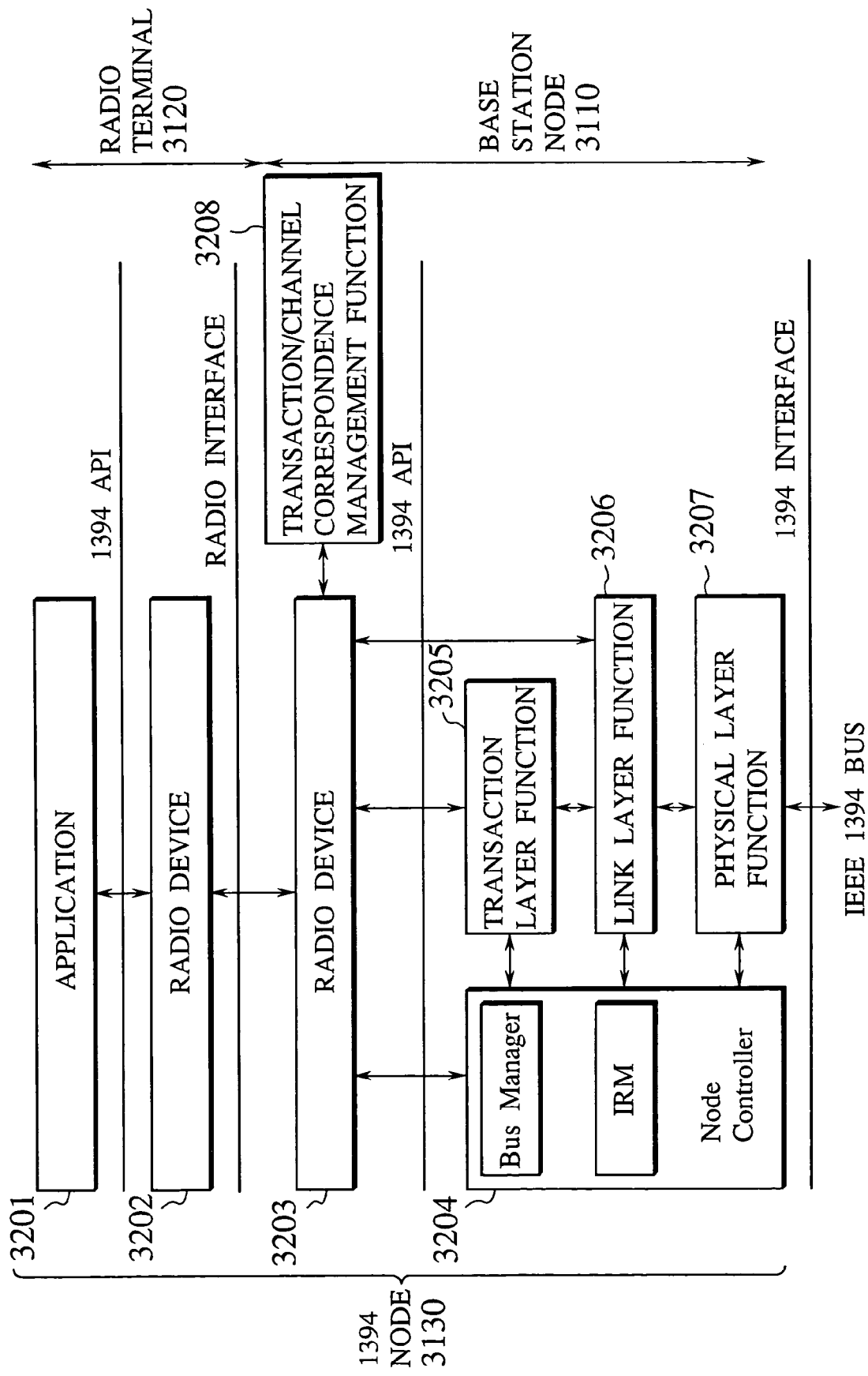
FIG. 2 is a diagram showing an exemplary protocol stack to be executed by a communication node/radio terminal according to the first embodiment of the present invention.

FIG. 2 shows a Node Controller function 3204, a physical layer function 3207, a link layer function 3206 and a transaction layer function 3205, for the purpose of providing the 1394 interface, and these functions for executing unique functions the 1394 are provided in the base station node 3110. Then, information on an interface (hereafter referred to as 1394 API) between these unique 1394 functions and the upper level application is transferred between the radio terminal 3120 and the base station node 3110. More specifically, the base station node 3110 and the radio terminal 3120 are connected by a radio interface through respective radio devices 3202 and 3203. Also, in this first embodiment, the base station node 3110 and the radio terminal 3120 behave as a single 1394 node 13130 so that an application 3201 on the 1394 node 3130 is to be executed on the radio terminal 3120.

Figure 3:
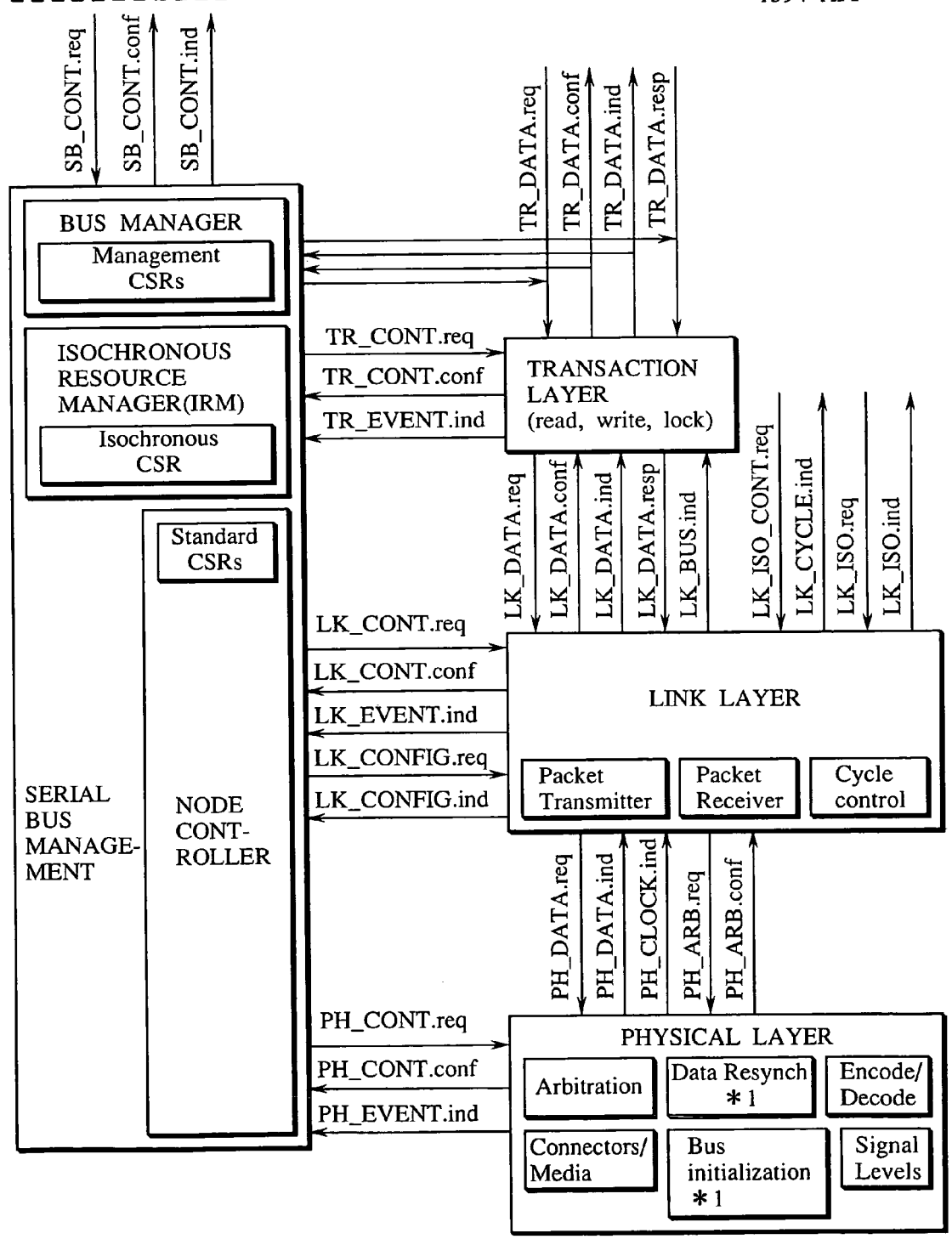
FIG. 3 is a diagram showing an exemplary protocol stack for an IEEE 1394 interface processing executed on a node on an IEEE 1394 bus according to the first embodiment of the present invention.

Here, the specific example of signals to be exchanged by the 1394 API as specified by the IEEE 1394-1995 is shown in FIG. 3. FIG. 3 is the serial bus protocol stack diagram described in the IEEE 1394-1995.

As shown in FIG. 3, the following eleven messages are defined for the 1394 API.

SB_CONT.req
SB_CONT.conf
SB_CONT.ind
TR_DATA.req
TR_DATA.conf
TR_DATA.ind
TR_DATA.resp
LK_ISO_CONT.req
LK_CYCLE.ind
LK_ISO.req
LK_ISO.ind Hence, by enabling transfer of these messages between the base station node 3110 and the radio terminal 3120 through the radio interface, a combination of the base station node 3110 and the radio terminal 3120 can behave as a single 1394 node 3130.

Figure 4:
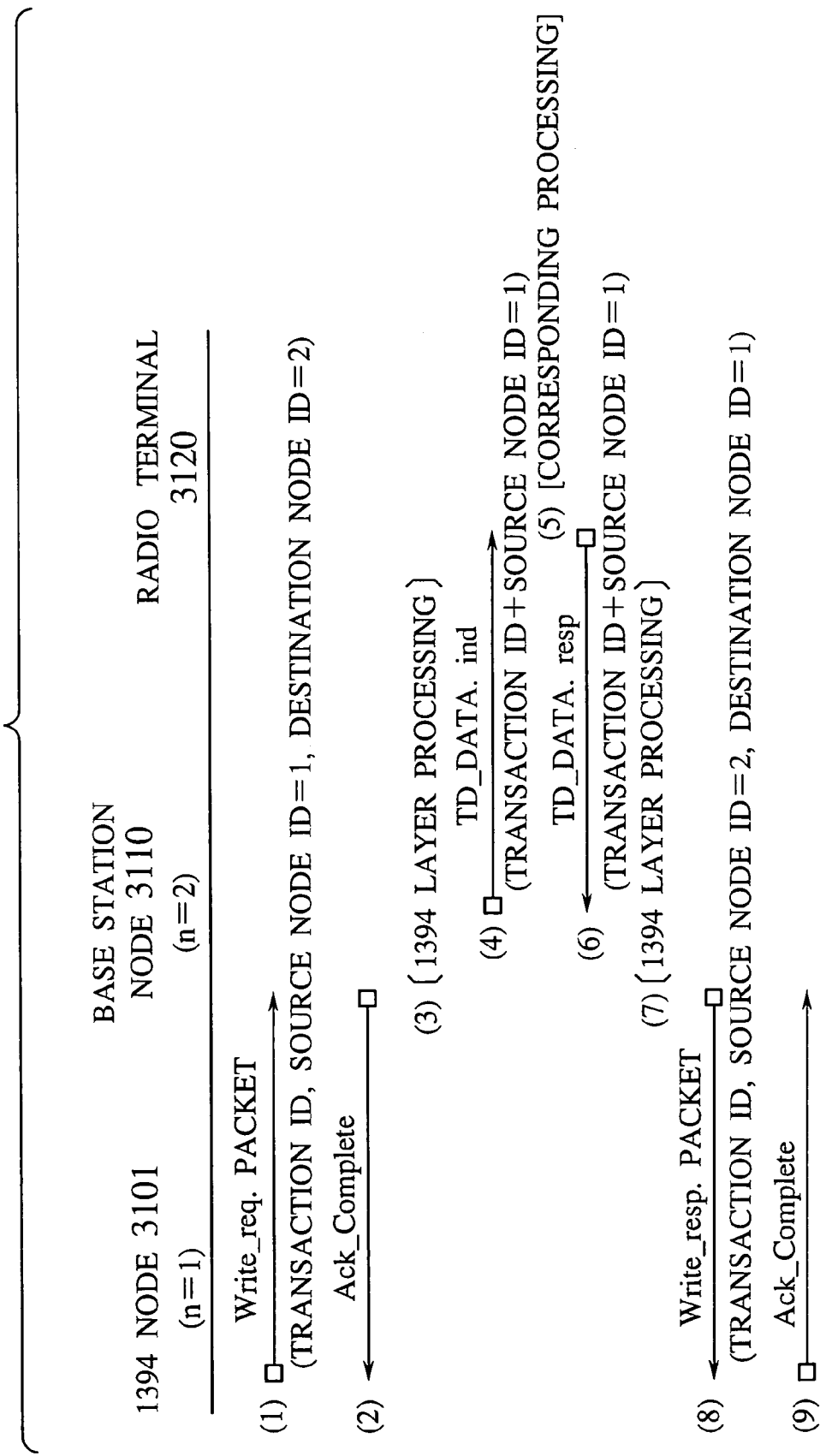
FIG. 4 is a sequence chart of an exemplary processing sequence for a packet transfer according to the first embodiment of the present invention.
Figure 5:
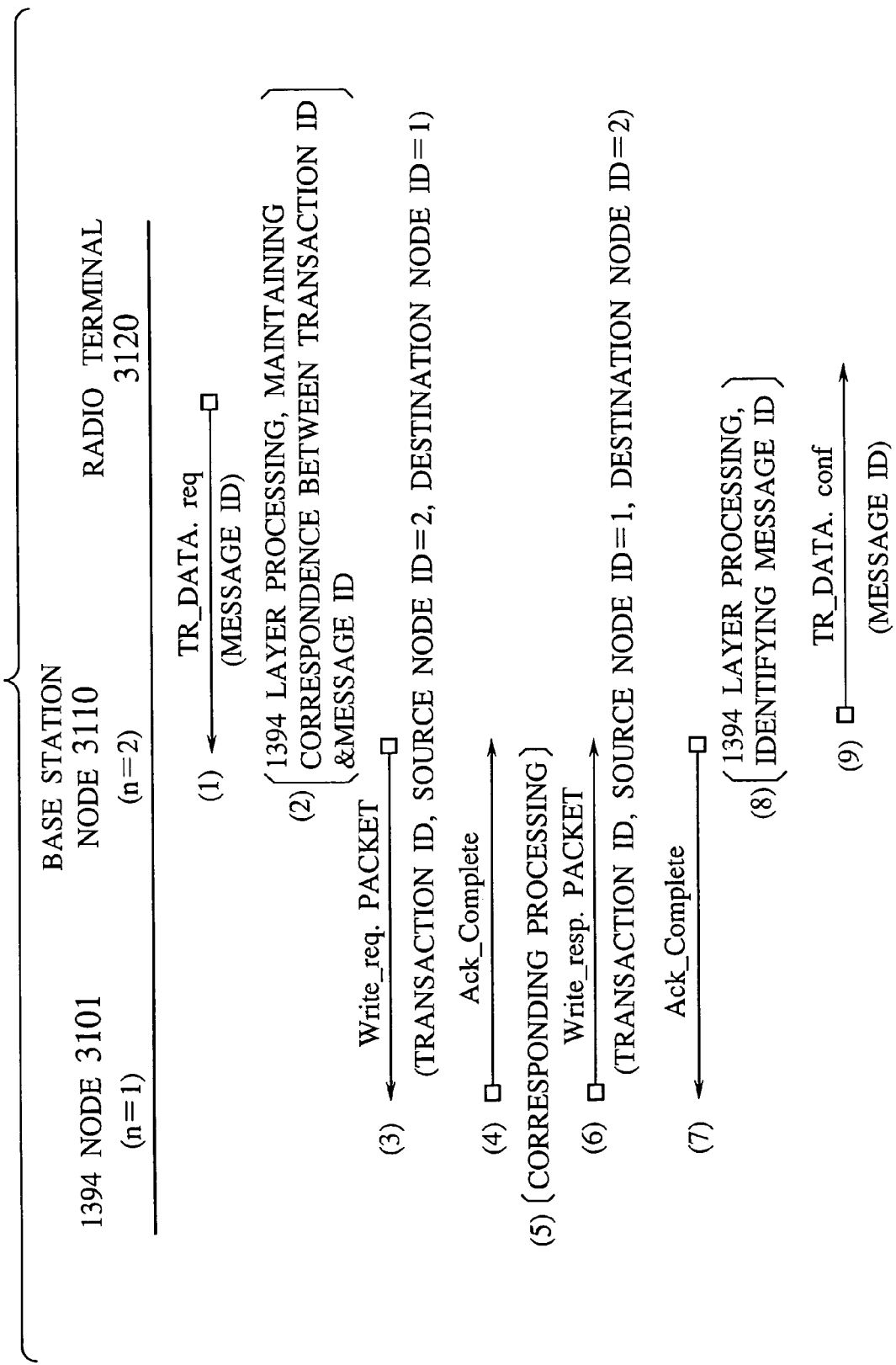
FIG. 5 is a sequence chart of another exemplary processing sequence for a packet transfer according to the first embodiment of the present invention.

An exemplary packet transfer processing sequence in such a case is shown in FIG. 4 and FIG. 5.

First, FIG. 4 shows an exemplary case of transferring an Asynchronous packet of the IEEE 1394 from the 1394 node 3101 on the IEEE 1394 bus to the 1394 node 3130 (actually the base station node 3110 and the radio terminal 3120). This processing proceeds as follows.

(1) The 1394 node 3101 transfers the Asynchronous packet (Write Request packet, for example) to the 1394 node 3130 (actually the base station node 3110). At this point, the transfer packet has the destination node ID=2 and the source node ID=1.

(2) When the base station node 3110 receives the Write Request packet properly, it returns an Ack_Complete message to the 1394 node 3101.

(3) The base station node 3110 applies the physical layer processing, the link layer processing, and the transaction layer processing to the received Write Request packet.

(4) The base station node 3110 transmits a message (TR_DATA.ind, for example) on the 1394 API corresponding to the received Write Request packet, to the radio terminal 3120 through the radio interface.

(5) The radio terminal 3120 applies the corresponding processing to the TR_DATA.ind message received from the radio interface.

(6) The radio terminal 3120 transfers a TR_DATA.resp message which is a response message with respect to the received message, to the base station node 3110 through the radio interface.

(7) The base station node 3110 applies the corresponding transaction layer processing, link layer processing, and physical layer processing to the received TR_DATA.resp message.

(8) The base station node 3110 transmits a Write Response packet corresponding to the Write Request packet of the above processing (1), to the 1394 node 3101. At this point, the packet has the destination node ID=1 and the source node ID=2.

(9) When the 1394 node 3101 receives the Write Response packet properly, it returns an Ack_Complete message to the base station node 3110.

Here, in the base station node 3110, there is a need to store the correspondence between the Write Request received by the above processing (1) and the messages on the 1394 API that are transmitted by the above processing (4) or received by the above processing (6), at a transaction/channel correspondence management function 3208 of FIG. 2. This will be used in order to identify the response received by the above processing (6) as a response corresponding to one AV/C command among a plurality of AV/C commands that are transmitted by the 1394 node 3101, for example.

As a method for maintaining such a correspondence between a message identifier/transaction identifier on the IEEE 1394 bus and a message identifier on the radio network, there is a method which uses the transaction ID (transaction label in the IEEE 1394 packet, for example) issued by the 1394 node 3101 in the above processing (1) or a combination of the transaction ID and a source node ID. More specifically, in this method, the base station node 3110 transfers the TR_DATA.ind message transmitted by the above processing (4) by describing a combination of the transaction ID (transaction label) and the source node ID that are described within the Write Request packet received by the above processing (1), and the radio terminal 3120 describes a combination of the received transaction ID and source node ID into the TR_DATA.resp message to be transmitted by the above processing (6). Besides this method, there is also a method which defines in advance an identifier for identifying a message on the radio network, and stores the correspondence between this identifier and the transaction ID on the IEEE 1394 bus.

Next, FIG. 5 shows an exemplary case of transferring an Asynchronous packet of the IEEE 1394 from the 1394 node 3130 (actually the base station node 3110 and the radio terminal 3130) to the 1394 node 3101 on the IEEE 1394 bus. In this case, in order to maintain the correspondence between the message transmitted from the radio terminal 3120 and the transaction on the IEEE 1394 bus, a message ID is attached in advance as an identifier of the message to be transmitted. Specifically, the processing proceeds as follows.

(1) The radio terminal 3120 transfers information to be transferred as a TR_DATA.req message, to the base station node 3110 through the radio network. In order to identify the correspondence with the 1394 transaction, this message is transferred by attaching a message ID.

(2) The base station node 3110 applies the corresponding transaction layer processing, link layer processing, and physical layer processing to the received TR_DATA.req message. Also, a correspondence between the message ID of the received message and the transaction ID to be issued in the following processing is maintained.

(3) The base station node 3110 transfers an Asynchronous packet (Write Request packet, for example) corresponding to the received message, to the 1394 node 3101. At this point, a destination node ID of the packet is n=1, and the source node ID of the packet is n=2.

(4) When the 1394 node 3101 receives the Write Request packet properly, it returns an Ack_Complete message to the base station node 3110.

(5) The 1394 node 3101 applies the corresponding processing to a description of the Write Request packet received from the 1394 interface.

(6) The 1394 node 3101 transmits a Write Response packet of the transaction corresponding to the received Write Request packet, to the 1394 node 3130 (actually the base station node 3110). For the identification of the corresponding transaction, the transaction ID is used. At this point, the destination node ID of the packet is n=2 and the source node ID of the packet is n=1.

(7) When the base station node 3110 receives the Write Response packet properly, it returns an Ack_Complete message to the 1394 node 3101 as its reception processing.

(8) The base station node 3110 applies the corresponding physical layer processing, link layer processing, and transaction layer processing to the received Write Response packet. Also, the corresponding message ID is identified from the value of the received transaction ID.

(9) The base station node 3110 transmits a message (TR_DATA.conf) on the 1394 API corresponding to the received Write Response packet, to the radio terminal 3120 through the radio interface. For this message transfer, the message ID attached in the above processing (1) is attached so that the radio terminal 3120 can identify the message according to this message ID.

By the series of processing described above, it becomes possible to transmit and receive the Asynchronous packet between the radio terminal 3120 and the 1394 node 3101. As a result, it becomes possible to execute protocols to be executed using the Asynchronous packets of the IEEE 1394 such as the AV/C (Audio/Visual Control) protocol. In the above example, the transfer of the Write Request/Response packets on the 1394 bus is realized by the so called split transaction, but it should be obvious that it is also possible to realize this packet transfer by the unified transaction.

Figure 6:
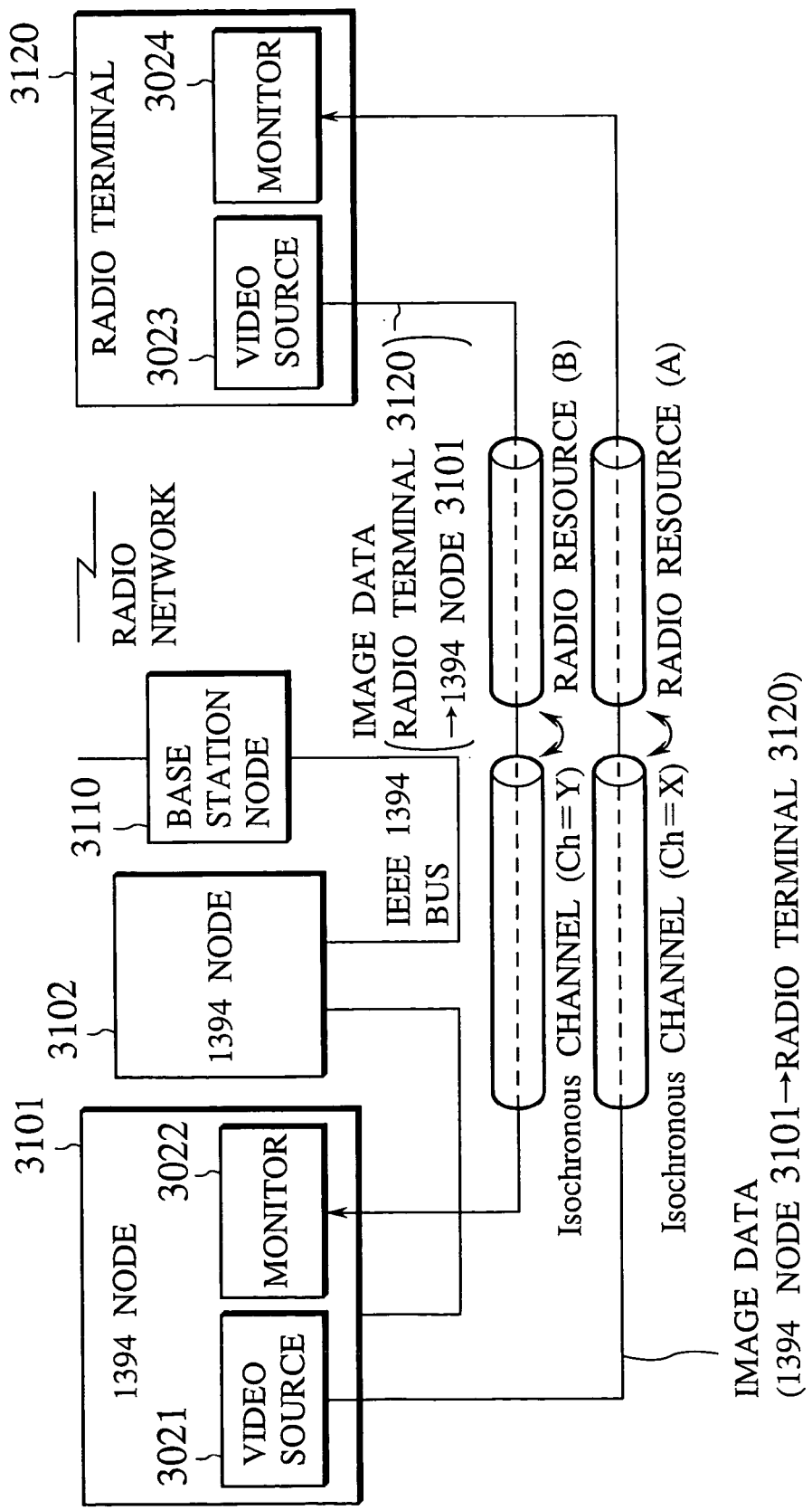
FIG. 6 is a diagram showing an exemplary state of resource acquisition in a case of transferring image data between a node on an IEEE 1394 bus and a terminal on a radio network according to the first embodiment of the present invention.

Next, as a case of actually transferring the image data between the radio terminal and the 1394 node, an exemplary image data transfer scheme between the radio terminal 3120 and the 1394 node 3101 is shown in FIG. 6. In FIG. 6, the image transfer from the 1394 node 3101 to the radio terminal 3120 and the image transfer from the radio terminal 3120 to the 1394 node 3101 are shown together.

First, for the sake of the image transfer to the radio terminal 3120, an Isochronous channel (Ch=X) is reserved as the resource on the IEEE 1394 bus, while a corresponding radio resource (A) on the radio network is also reserved. Also, for the sake of the image transfer from the radio terminal 3120, an Isochronous channel (Ch=Y) is reserved as the resource on the IEEE 1394 bus, while a corresponding radio resource (B) on the radio network is also reserved.

Here, the radio resource on the radio network can be frequencies, time-slots, etc., on the radio network by which the bandwidth necessary for the image transfer can be reserved. Also, a timing for reserving this radio resource can be a timing at which the radio terminal 3120 is connected to the base station node 3110, or a timing at which a bandwidth reservation (resource reservation) request is issued from the radio terminal 3120 or the 1394 node 3101. Also, a timing for reserving the Isochronous channel on the IEEE 1394 bus can be immediately before transferring the image information, or a timing at which the radio terminal 3120 is connected.

Figure 7:
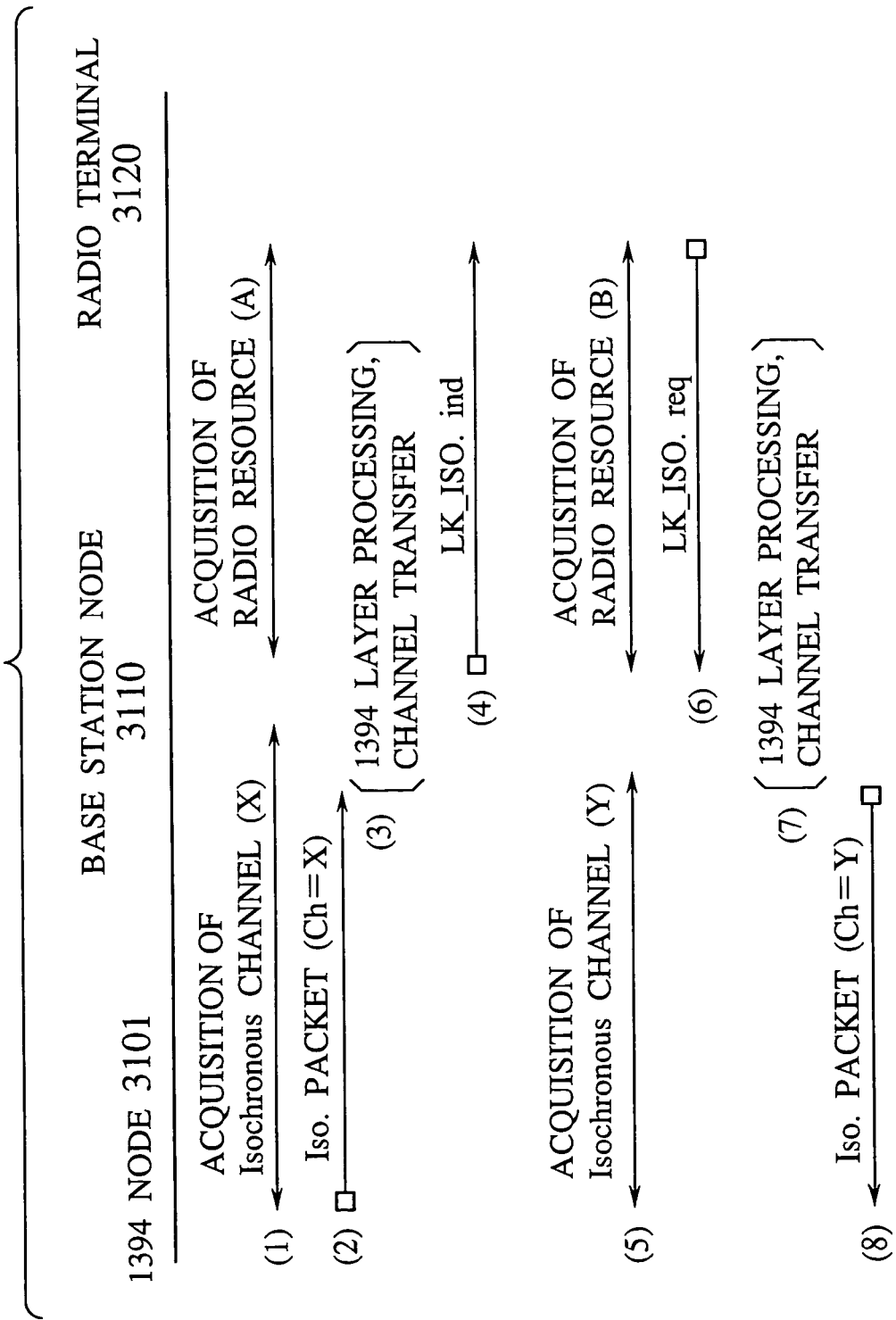
FIG. 7 is a sequence chart of an exemplary resource acquisition procedure on an IEEE 1394 bus and a radio network according to the first embodiment of the present invention.

FIG. 7 shows the actual image data transfer processing sequence in a state where the resource reservation as shown in FIG. 6 is done. FIG. 7 shows an exemplary case where, after two Isochronous channels X and Y on the IEEE 1394 bus are acquired, the image data transfer from the 1394 node 3101 to the 1394 node 3130 (actually the base station node 3110 and the radio terminal 3120) is executed through the channel X, while the image data transfer from the 1394 node 3130 (actually the base station node 3110 and the radio terminal 3120) to the 1394 node 3101 is executed through the channel Y. Note that the procedure for acquiring these Isochronous channels is omitted in the following sequence, but this can be realized using the processing shown in FIG. 4 and FIG. 5 (by executing the IEC 61883 protocol as the upper layer processing), for example. This processing proceeds as follows.

(1) The Isochronous channel (Ch=X) is acquired on the IEEE 1394 bus by some means. Also, the radio resource (A) is acquired on the radio network.

(2) The 1394 node 3101 transmits the image data onto the Isochronous channel X.

(3) The base station node 3110 receives the Isochronous packet on the channel X, and applies the corresponding physical layer processing and link layer processing to it.

(4) The base station node 3110 transfers an LK_ISO.ind message corresponding to the received Isochronous packet, to the radio terminal 3120 through the radio network (radio resource (A)).

(5) The Isochronous channel (Ch=Y) is acquired on the IEEE 1394 bus by some means. Also, the radio resource (B) is acquired on the radio network.

(6) The radio terminal 3120 transfers the image as an LK_ISO.req message, to the base station node 3110 through the radio network.

(7) The base station node 3110 applies the corresponding link layer processing and physical layer processing to the received LK_ISO.req message.

(8) The base station node 3110 transmits an Isochronous packet corresponding to the received LK_ISO.req message, onto the Isochronous channel Y.

In this way, it is possible to realize the data transfer between the 1394 node 3101 and the radio terminal 3120 even for the Isochronous data. Using such a method of FIG. 4, FIG. 5 and FIG. 6, it is possible to smoothly execute an application which carries out the image transfer from the 1394 node 3101 to the radio terminal 3120. More specifically, it is possible to realize the Isochronous channel according to the IEC 61883 protocol, the packet input and output setting with respect to the Isochronous channel, the data transfer route setting within each node/terminal according to the AV/C protocol, and the actual image data transfer using the Isochronous packet. In addition, although not described in detail here, it is also possible to transfer the other messages (SB_CONT.req, SB_CONT.ind, SB_CONT.conf, LK_CYCLE.ind, LK_ISO_CONT.req) by the similar method.

In the case of connection between the base station node 3110 and the radio terminal 3120 by the above described method, there is a need to determine the way of mapping each message defined on the 1394 API onto the radio network. FIG. 8 shows one exemplary mapping of the messages defined on the 1394 API in the radio section. FIG. 8 shows an exemplary case where a plurality of carriers exist on the radio frequencies used by the radio network and the multiplexing according to the TDMA scheme is used therein. Also, in the example of FIG. 8, the messages are basically defined in a form of combinations of "data transfer request" and "data transfer confirmation", so that the messages are allocated with respect to the frequencies (carries) or time-slots to be used on the radio network, in units of these combinations.

In the allocation of FIG. 8, a combination of TR_DATA.req/conf is set in correspondence to the time-slot X and the combination of TR_DATA.ind/resp is set in correspondence to the time-slot Y, of the carrier B on the radio network. Also, the LK_ISO.req is set in correspondence to the time-slot X, the LK_ISO_CONT.req is set in correspondence to the time-slot Z1, and the LK_CYCLE.ind is set in correspondence to the time-slot Z2, of the carrier C on the radio network. Also, the SB_CONT.req is set in correspondence to the time-slot X and the SC_CONT.ind is set in correspondence to the time-slot Y, of the carrier A on the radio network.

In such an allocation, it is possible to set up a bandwidth of the radio resource to be reserved for the purpose of the real time data transfer such as image data transfer, by making a length of the time-slot allocated to the LK_ISO.req variable, for example. Similarly, the bandwidth can be set up by a length of the time-slot allocated to the LK_ISO.ind. However, the message allocation method is not limited to the above described one, and it is possible to use a method for transmitting the messages by mutually different frequencies/time-slots, a method for allocating time-slots only to the LK_ISO.req/LK_ISO.ind messages for which the real time property is required while the other messages are transferred by using only the other time-slots not used by the LK_ISO.req/LK_ISO.ind messages.

Figure 9:
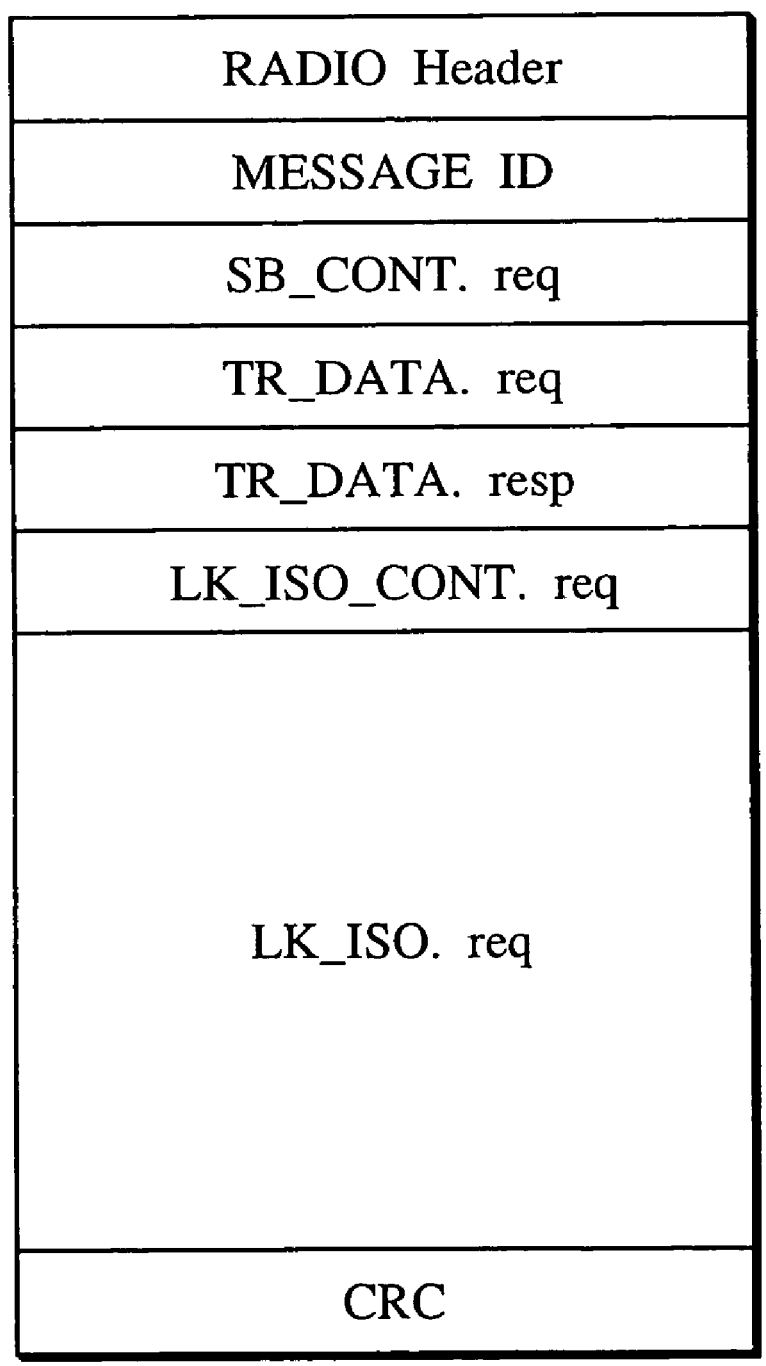
FIG. 9 is a diagram showing an exemplary format of a packet to be transferred on a radio network according to the first embodiment of the present invention.
Figure 10:
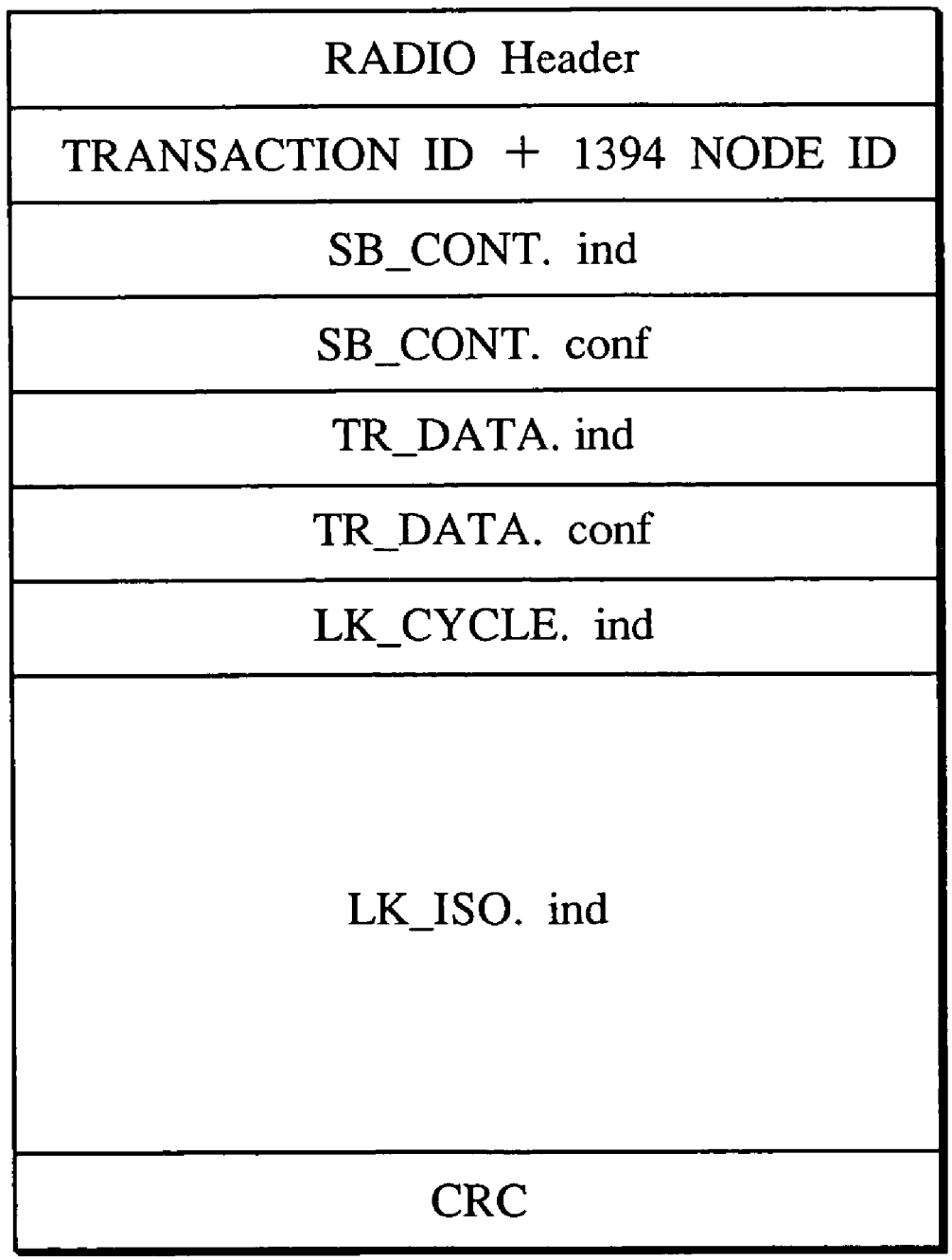
FIG. 10 is a diagram showing another exemplary format of a packet to be transferred on a radio network according to the first embodiment of the present invention.

FIG. 9 and FIG. 10 show an exemplary method of message and packet field allocation at each 1394 API, in the case where the radio network is operated as a packet network such as that of the wireless LAN scheme. FIG. 9 is an example in the case of the data transfer in a direction from the radio terminal to the base station node, and FIG. 10 is an example in the case of the data transfer in a direction from the base station node to the radio terminal.

In FIG. 9 and FIG. 10, two types of packets are defined depending on the direction of the data transfer between the radio terminal and the base station node, but it is also possible to transfer messages by allocating all the messages to one packet regardless of the direction of the data transfer. In addition, it is also possible to use a method in which one type of packet is used on the radio network while a field for identifying a type of message that is transferred by that packet is provided in that packet, so as to be able to identify which one of the messages shown in FIG. 3 is transferred on the packet according to a value of that identification field. Moreover, as a combination with the case of FIG. 8, it is also possible to use a method in which frequencies (carries) to be used are set differently for the LK_ISO.req/ind messages that transfer the Isochronous data and the other messages, for example, and a region for each message is allocated within the packet to be transferred by each carrier.

In the example of FIG. 9, SB_CONT.req, TR_DATA.req, TR_DATA.resp, LK_ISO_CONT.req, and LK_ISO.req messages are allocated in the packet going from the radio terminal toward the base station node. Also, in the example of FIG. 10, SB_CONT.ind, SC_CONT.ind, TR_DATA.ind, TR_DATA.conf, LK_CYCLE.ind, and LK_ISO.ind messages are allocated in the packet going from the base station node to the radio terminal. Among these messages, there are messages such as TR_DATA.req message for which the necessary field length is not constant. For this reason, it is also possible to include an information indicating a field length within a field of each message in FIG. 9 and FIG. 10. Also, in these examples, the packet to be transferred in the radio section itself is not particularly specified, but it is also possible to use FCP frames as specified by the IEC 61883 for field portions to which the messages are allocated, for example. In such a case, there is a need to define a new type of the FCP frame for transmitting the 1394 API information between the radio terminal and the base station node.

Also, as shown in the processing sequences of FIG. 4 and FIG. 5, there is a need to maintain the correspondence between the message identifier (transaction ID) on the IEEE 1394 bus and the message identifier on the radio network, so that the packet formats of FIG. 9 and FIG. 10 contain a field for describing the message ID and a field for describing the transaction ID+IEEE 1394 node ID, respectively. More specifically, the packet to be transferred from the radio terminal toward the base station node is provided with a field for describing the message ID that is attached by the radio terminal side as in FIG. 5, and the packet to be transferred from the base station node to the radio terminal is provided with a field for describing the transaction ID and the IEEE 1394 node ID on the IEEE 1394 bus. Note that the identifiers to be described in these fields are not limited to those shown in FIG. 9 and FIG. 10, and there can be cases where the transaction ID and the IEEE 1394 node ID on the IEEE 1394 bus are to be described in the packet to be transferred from the radio terminal toward the base station node, or cases where the message ID on the radio network is to be described in the packet to be transferred from the base station node toward the radio terminal, for example.

Figure 11:
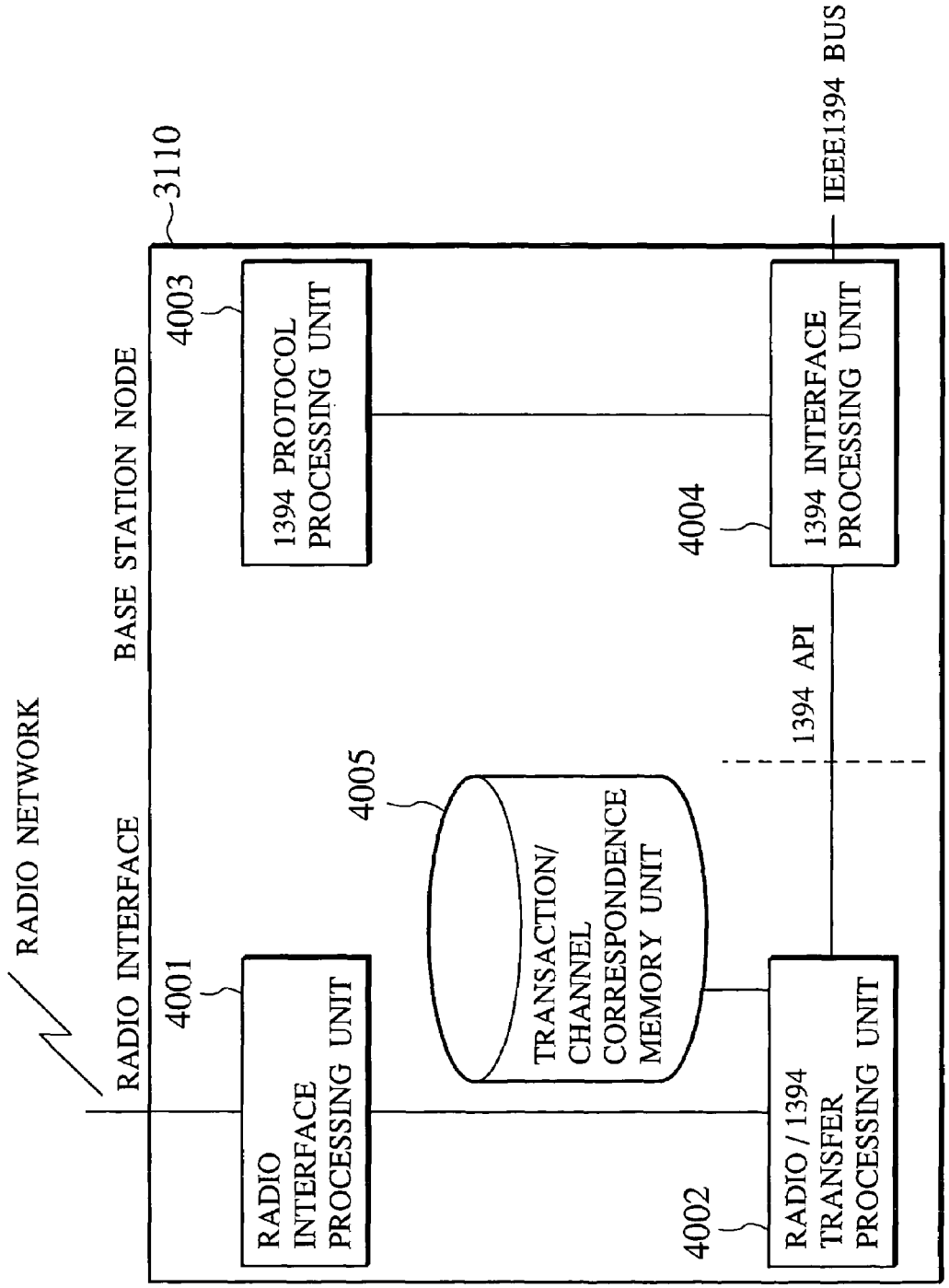
FIG. 11 is a block diagram showing an exemplary internal configuration of a base station node according to the first embodiment of the present invention.

FIG. 11 shows an exemplary internal configuration of the base station node 3110 in this first embodiment. The base station node 3110 is required to have an IEEE 1394 interface processing function as well as a function by which a message to be transferred to the upper layer through the 1394 API is transferred to the radio interface after the packet transferred on the IEEE 1394 bus is received. For this reason, in FIG. 11, the base station node 3110 includes a radio interface processing unit 4001 for providing the radio network interface function, a radio/1394 transfer processing unit 4002 for converting a packet received from the radio interface into a message corresponding to the 1394 API or converting a message transferred to the 1394 API into a packet to be transferred to the radio interface, a 1394 protocol processing unit 4003 for executing the 1394 protocol according to the packet received from the 1394 interface, and a 1394 interface processing unit 4004 for providing the IEEE 1394 bus interface function.

In addition, the radio/1394 transfer processing unit 4002 is accompanied by a transaction/channel correspondence memory unit 4005 for storing the correspondence between the 1394 transaction and the message on the radio network, and the correspondence between the Isochronous channel on the IEEE 1394 bus and the radio resource on the radio network, as described above in conjunction with FIG. 4, FIG. 5 and FIG. 7. Here, the interface between the 1394 interface processing unit 4004 and the radio/1394 transfer processing unit 4002 corresponds to the so called 1394 API.

Figure 12:
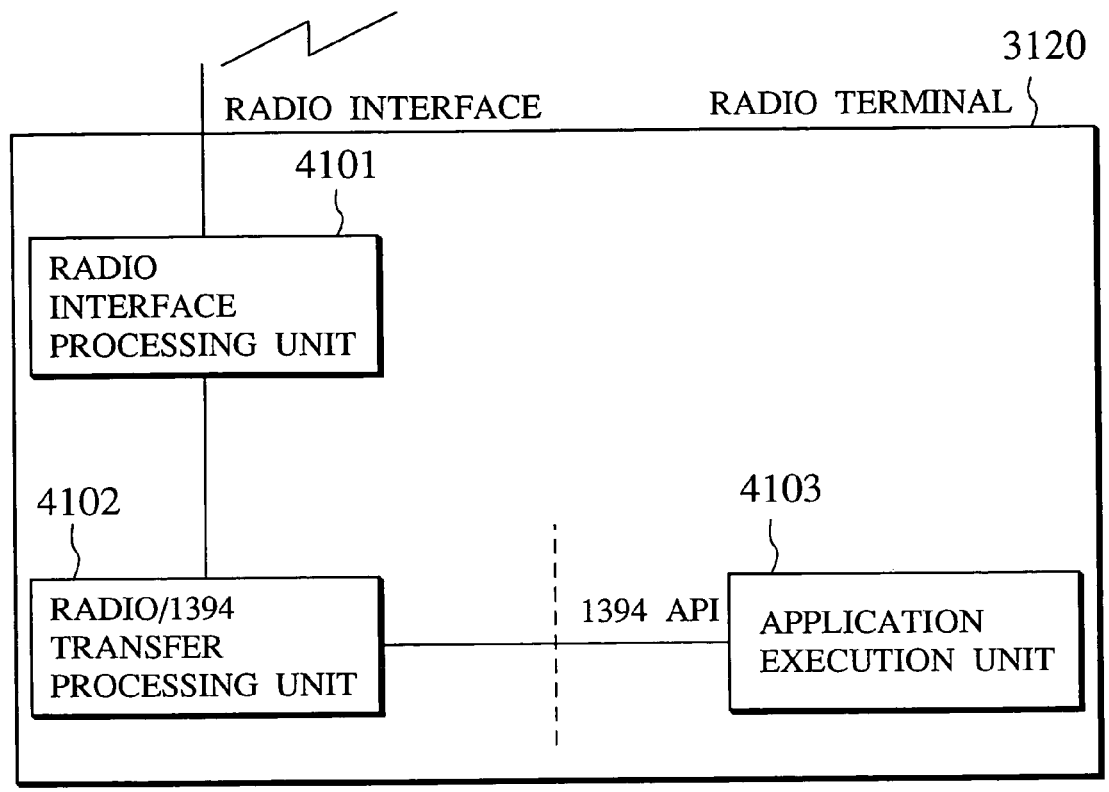
FIG. 12 is a block diagram showing an exemplary internal configuration of a radio terminal according to the first embodiment of the present invention.

FIG. 12 shows an exemplary internal configuration of the radio terminal 3120 in this first embodiment. The radio terminal 3120 is required to have a basic function for executing applications to be executed on the 1394 API as well as a function for transferring a message transmitted through the 1394 API onto the radio network interface. For this reason, in FIG. 12, the radio terminal 3120 includes a radio interface processing unit 4101 for providing the radio network interface function, a radio/1394 transfer processing unit 4102 for converting a packet received from the radio interface into a message corresponding to the 1394 API or converting a message transferred to the 1394 API into a packet to be transferred to the radio interface, and an application execution unit 4103 for executing applications on the 1394 API. Here, the interface between the application execution unit 4103 and the radio/1394 transfer processing unit 4102 corresponds to the so called 1394 API.

By using the base station node of FIG. 11 and the radio terminal of FIG. 12 in combination, they can behave as if they are a single 1394 node.

Referring now to FIG. 13 to FIG. 27, the second embodiment of a communication node and a communication terminal according to the present invention will be described in detail.

Figure 13:
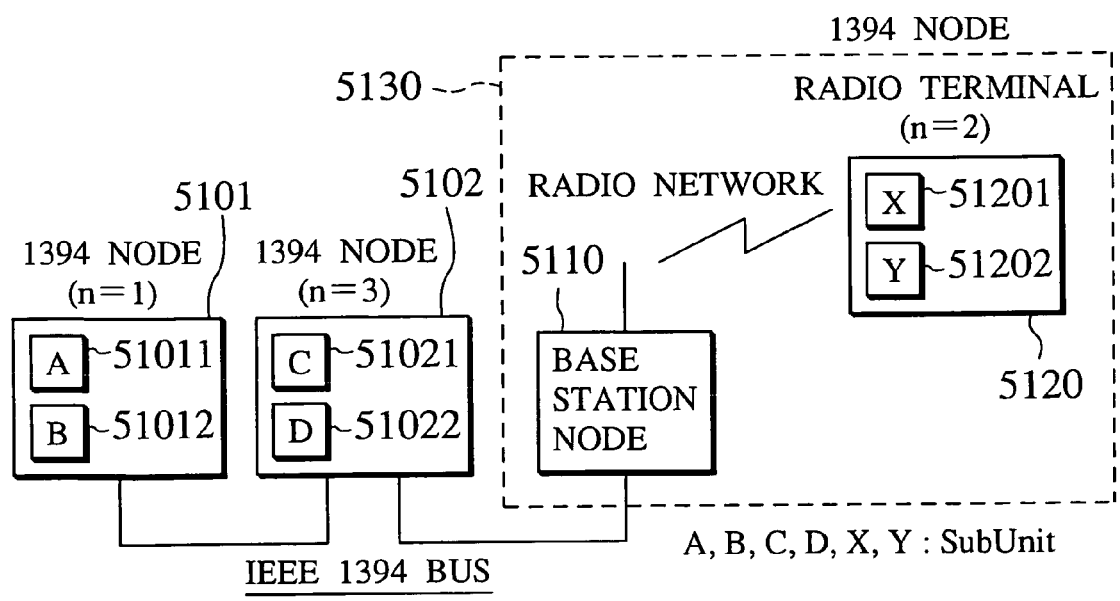
FIG. 13 is a schematic diagram showing an exemplary network configuration using communication nodes according to the second embodiment of the present invention.

FIG. 13 shows a schematic configuration of a network in this second embodiment. In the configuration of FIG. 13, 1394 nodes 5101 and 5102 are present on an IEEE 1394 bus, and further a base station node 5110 is connected. Also, a radio terminal 5120 is connected to the base station node 5110 through a radio network. Here, the node IDs of the nodes are n=1 for the 1394 node 5101, n=3 for the 1394 node 5102, and n=2 for the 1394 node 5130, so that the 1394 node 5102 is the Root node on the IEEE 1394 bus.

In this second embodiment, each of the 1394 nodes 5101 and 5102 and the radio terminal 5120 contains constituent elements (Sub Units) of each node/terminal. FIG. 13 shows the case where the 1394 node 5101 contains a Sub Unit A 51011 and a Sub Unit B 51012, the 1394 node 5102 contains a Sub Unit C 51021 and a Sub Unit D 51022, and the radio terminal 5120 contains a Sub Unit X 51201 and a Sub Unit Y 51202.

Here, similarly as in the first embodiment, the base station node 5110 and the radio terminal 5120 operate as a single 1394 node 5130 as a result of having these two node/terminal connected with each other.

Figure 14:
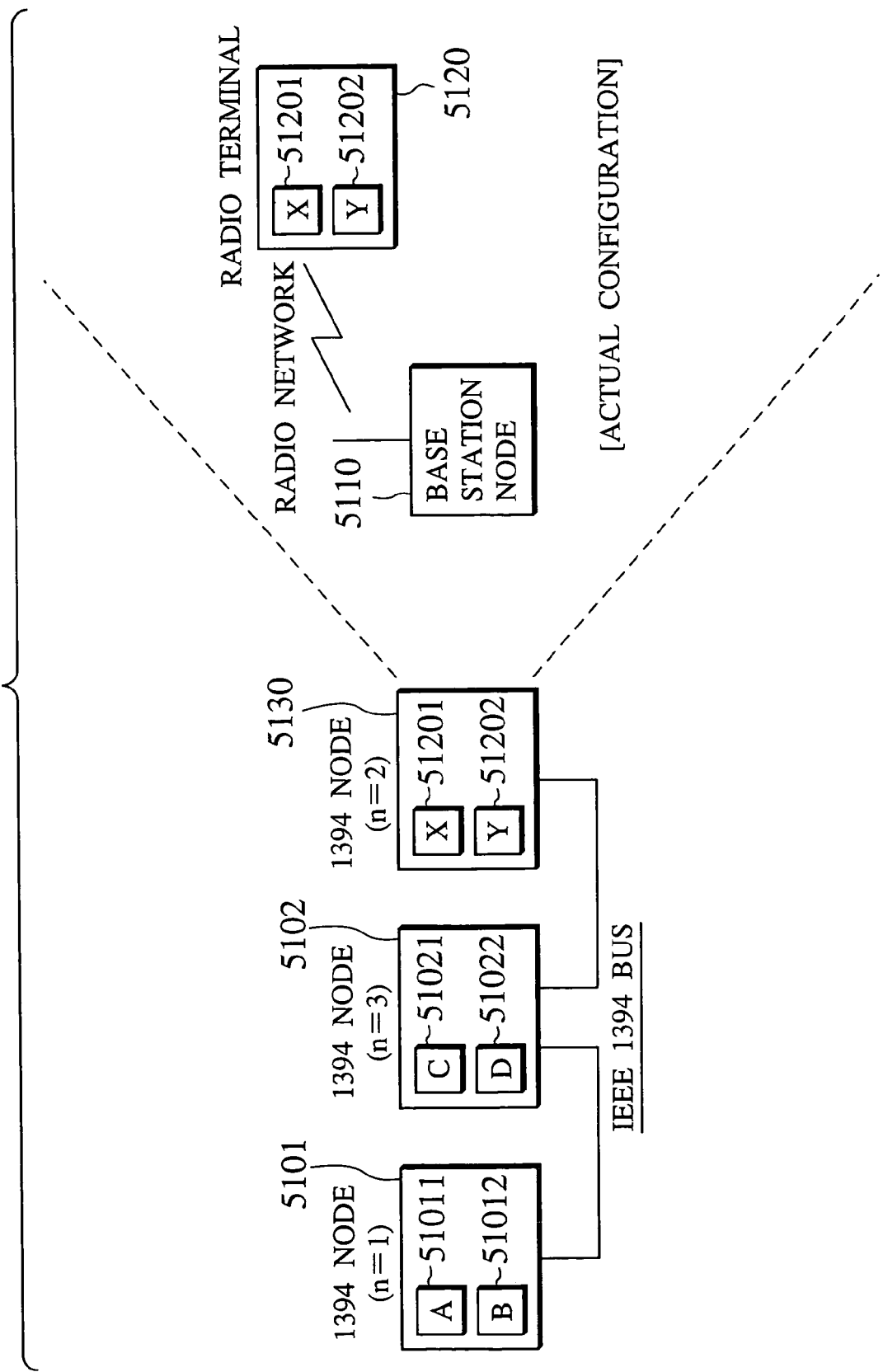
FIG. 14 is a diagram showing an exemplary state of recognition of node constituent elements according to the second embodiment of the present invention.

FIG. 14 shows how the entire network is recognized in this case. As shown in FIG. 14, the base station node 5110 is recognized as if it is the 1394 node 5130 from the 1394 nodes on the IEEE 1394 bus. Also, the Sub Unit X 51201 and the Sub Unit Y 51202 that are actually contained in the radio terminal 5120 are recognized as if they are constituent elements (Sub Units) contained in that 1394 node 5130.

Figure 15:
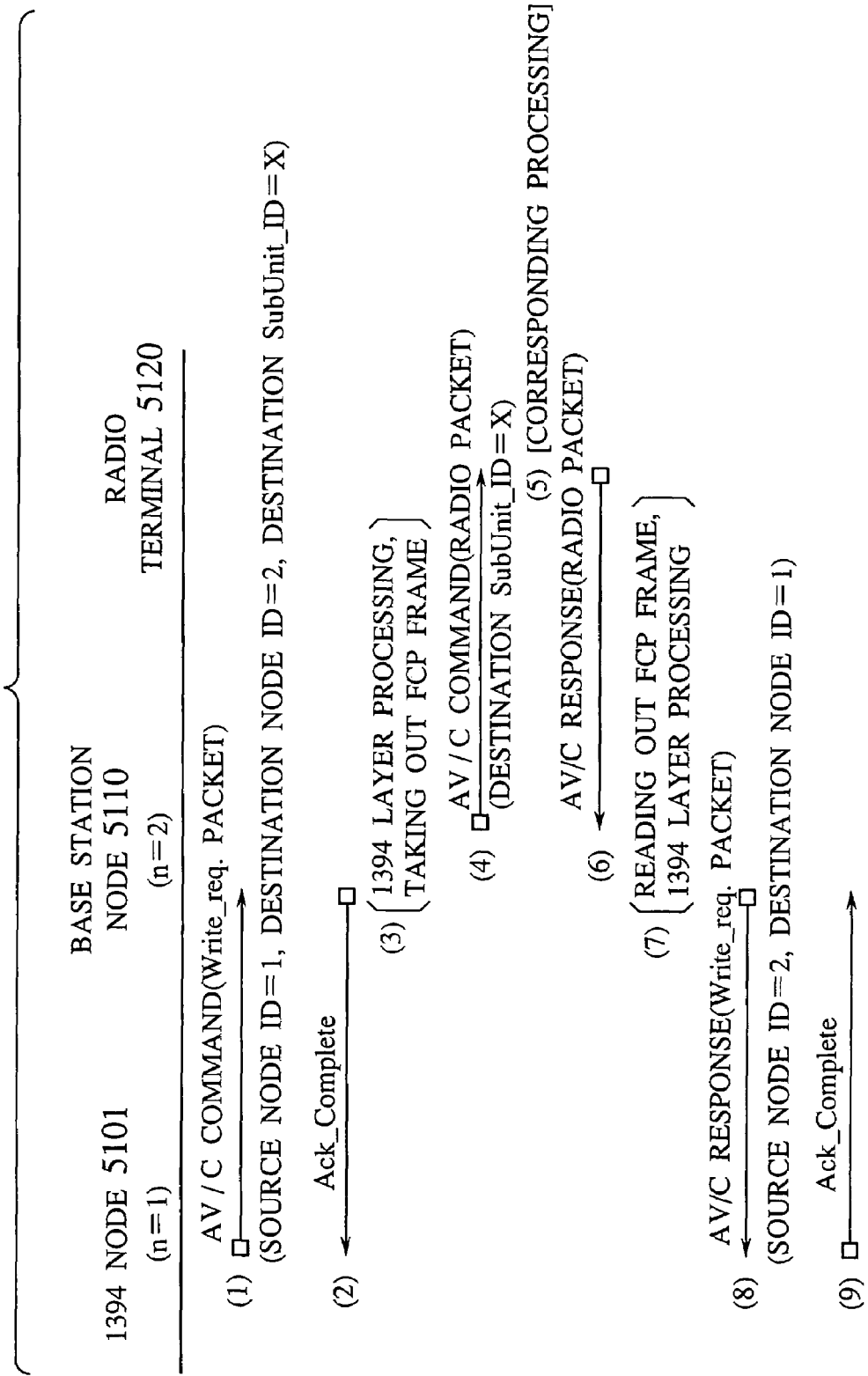
FIG. 15 is a sequence chart of an exemplary processing sequence for a packet transfer according to the second embodiment of the present invention.

FIG. 15 shows an exemplary processing sequence in the case of transferring an AV/C command according to the AV/C (Audio/Visual Control) protocol, from the 1394 node 5101 to the radio terminal 5120. The AV/C protocol uses a frame according to FCP (Function Control Protocol) as its transfer frame, and a Write Request packet of the IEEE 1394 as its transfer packet (FCP will be described in detail below). Also, the correspondence between the packet on the radio network and the transaction on the IEEE 1394 bus is assumed to be maintained by the method similar to that of the first embodiment, so that its description will not be repeated here. This processing sequence proceeds as follows.

(1) The 1394 node 5101 transmits the AV/C command to the Sub Unit X 51201 in the 1394 node 5130 (actually the radio terminal 5120). At this point, the transfer packet has the source node ID=1, the destination node ID=2, and the destination Sub Unit_ID=X.

(2) When the base station node 5110 receives the Write Request packet properly, it returns an Ack_Complete message to the 1394 node 5101.

(3) The base station node 5110 applies the 1394 layer processing to the received Write Request packet, and extracts from that packet an FCP frame in which the AV/C command is loaded.

(4) The base station node 5110 writes the extracted FCP frame into a packet to the transferred on the radio network, and transfers that packet to the radio terminal 5120.

(5) The radio terminal 5120 executes the AV/C command that is written in the received FCP frame.

(6) The radio terminal transfers an FCP frame with the processing result obtained by executing the AV/C command written thereon to the base station node 5110 by loading it into a packet on the radio network.

(7) The base station node 5110 extracts the FCP frame from the received packet, and executes the 1394 layer processing with respect to it.

(8) The base station node 5110 transfers the received FCP frame to the 1394 node 5101 as a response to the AV/C command received by the above processing (1). The transfer packet used here is also the Write Request packet, which has the source node ID=2 and the destination node ID=1.

(9) When the 1394 node 5101 receives the Write Request packet from the base station node 5110 properly, it returns an Ack_Complete message to the base station node 5110.

By the series of processing described above, it becomes possible to execute the upper level application such as AV/C command between the 1394 node and the radio terminal, in the case where a combination of one base station node and one radio terminal is recognized a single 1394 node. Here, instead of transferring the command from the 1394 node 5101 to the radio terminal as in FIG. 15, it is also possible to transfer the AV/C command from the radio terminal 5120 to the 1394 node 5101. Also, the upper level application is not limited to the AV/C protocol.

Figure 16:
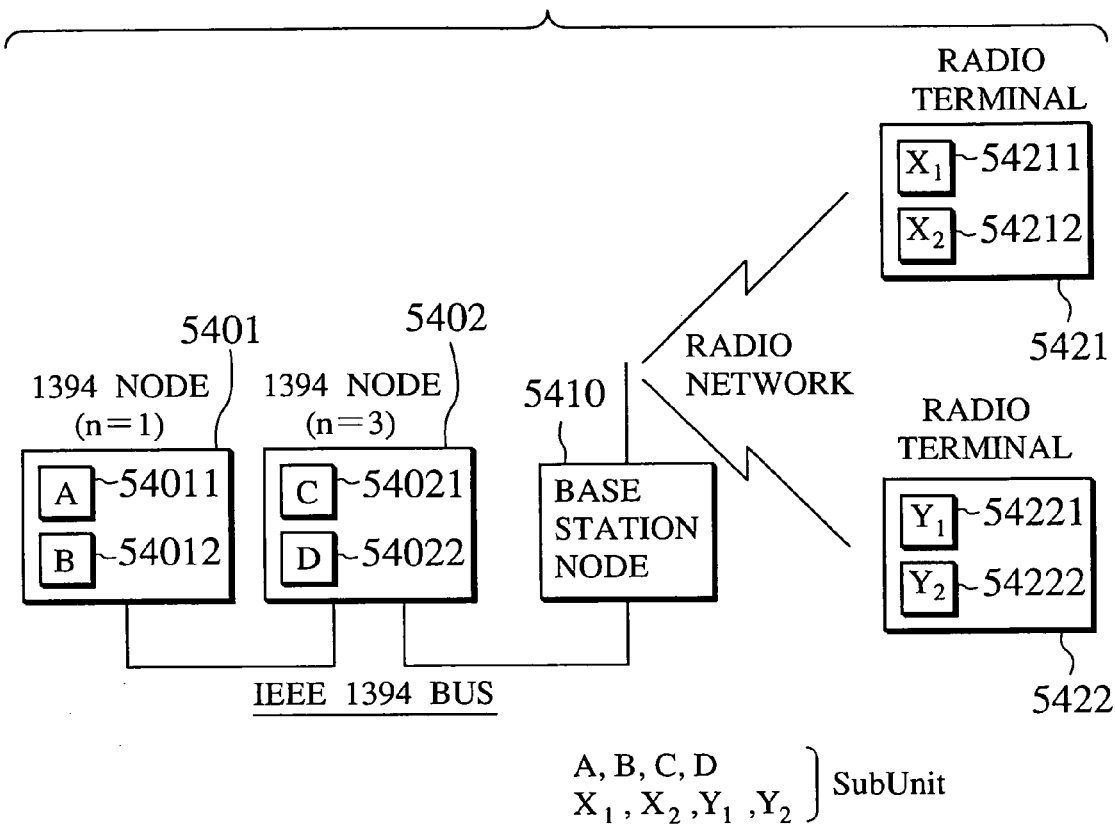
FIG. 16 is a schematic diagram showing another exemplary network configuration using communication nodes according to the second embodiment of the present invention.

FIG. 16 shows a schematic configuration of another network according to this second embodiment. In the configuration of FIG. 16, 1394 nodes 5401 and 5402 are present on an IEEE 1394 bus, and further a base station node 5410 is connected. Also, two radio terminals 5421 and 5422 are connected to the base station node 5410 through a radio network. This differs from the case of FIG. 13 in that a plurality of radio terminals are connected to a single base station node. FIG. 16 shows the case where the node IDs of the nodes are n=1 for the 1394 node 5401, n=3 for the 1394 node 5402, and n=2 for the base station node 5410, so that the 1394 node 5402 is the Root node on the IEEE 1394 bus.

Here, the 1394 node 5401 contains a constituent element (such as Sub Unit) A 54011 and a constituent element B 54012, the 1394 node 5402 contains a constituent element C 54021 and a constituent element D 54022, while the radio terminal 5421 contains a constituent element X1 54211 and a constituent element X2 51212 and the radio terminal 5422 contains a constituent element Y1 54221 and a constituent element Y2 54222.

Usually, in the AV/C (Audio/Visual Control) protocol or the like, the command is to be transmitted and received in units of such constituent elements (Sub Units) inside the 1394 nodes, so that in the case of carrying out the image data transfer in a form where the IEEE 1394 bus and the radio network coexist as in FIG. 16, there is a problem as to how such a Sub Unit information should be presented to each node/terminal. In particular, there is a problem as to how to distinguish Sub Units that are existing on a plurality of radio terminals.

In this second embodiment, the transfer processing for the constituent element (Sub Unit) information is executed between the respective networks (the IEEE 1394 and the radio network in this embodiment) at the base station node 5410. More specifically, it executes the processing that makes a group of Sub Units in each node on the IEEE 1394 bus or a group of Sub Units in the radio terminal to appear as if it is a group of Sub Units within the base station node, from the radio terminal side or the 1394 node side, respectively.

FIG. 17 shows how the radio terminal 5421 and the IEEE 1394 node 5401 recognize the entire network. First, a part (a) of FIG. 17 shows a configuration of the entire network as recognized by the radio terminal 5421. Namely, the radio terminal 5421 recognizes the constituent elements A, B, C and D that are existing in the nodes on the IEEE 1394 bus as if they are existing within the base station node 5410. Also, a part (b) of FIG. 17 shows a configuration of the entire network as recognized by a node on the IEEE 1394 bus such as the 1394 node 5401. Namely, the 1394 node 5401 recognizes constituent elements X1 and X2 in the radio terminal 5421 and the constituent elements Y1 and Y2 in the radio terminal 5422 as if they are existing in the base station node 5410. Based on such a recognition, each of the 1394 node and the radio terminal executes the application such as AV/C.

Figure 18:
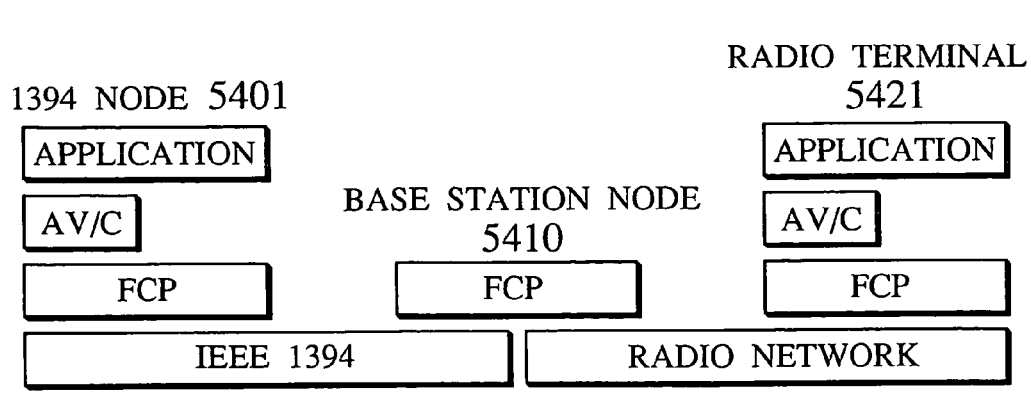
FIG. 18 is a diagram showing an exemplary protocol stack among a node on an IEEE 1394 bus, a base station node and a radio terminal according to the second embodiment of the present invention.
Figure 19:
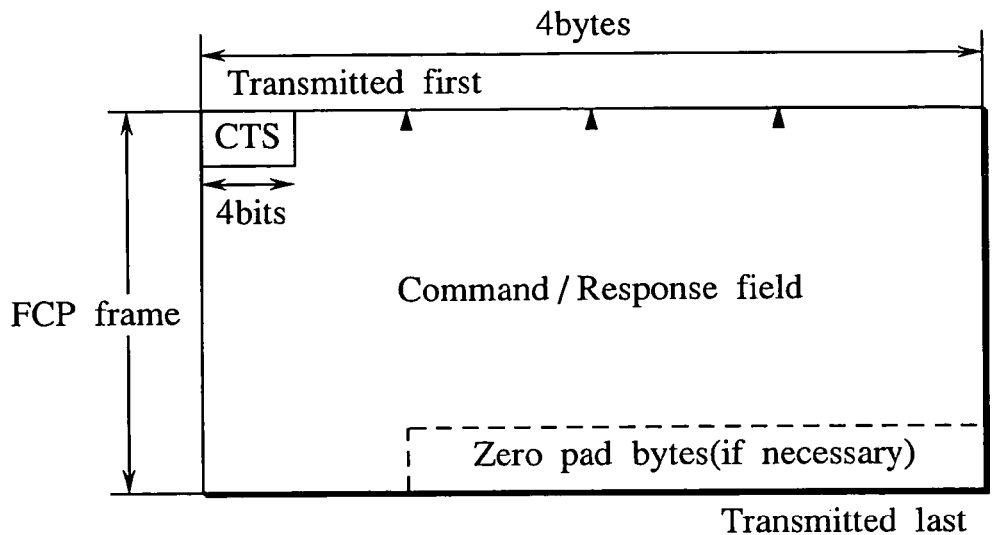
FIG. 19 is a diagram showing an exemplary configuration of an FCP frame according to the second embodiment of the present invention.

FIG. 18 shows an exemplary protocol stack for communications between the 1394 node 5401 and the radio terminal 5421 in this case. FIG. 18 shows the case where the AV/C protocol or the HAVi protocol is executed when some application is operated between the 1394 node 5401 and the radio terminal 5421. The AV/C uses an Asynchronous packet of the 1394 as their transfer packet, and an FCP (Function Control Protocol) frame as a frame to be embedded within that packet. This FCP is specified in ISO-IEC 61883 (Specification of Digital Interface for Consumer Electronics Audio/Video Equipment). In this second embodiment, whether it is a frame to be transferred to the radio terminal 5421 or the radio terminal 5422 will be judged according to the information in this FCP frame at the base station node 5410 (the routing processing at the FCP frame level). FIG. 19 shows details of the FCP frame.

FIG. 20 shows the processing sequence at a time of transferring the AV/C command from the 1394 node 5401 to the radio terminal 5421 by the Asynchronous packet in this case. FIG. 20 shows an exemplary case where the 1394 node 5401 plays a role of the controller in the AV/C protocol and this 1394 node 5401 transmits the AV/C command to the radio terminal 5421. Consequently, the series of processing described below will be preceded by the processing by which the 1394 node 5401 that is the controller obtains the Sub Unit information within each node on the IEEE 1394 bus and the processing by which the user commands the desired processing to the 1394 node 5401 that is the controller through a remote controller or the like. This processing sequence proceeds as follows.

(1) The application for activating the AV/C protocol is executed at the 1394 node 5401 that is the controller, and the transmission of some AV/C command is commanded. The destination of the command is the Sub Unit X1 54211 in the radio terminal 5421.

(2) The 1394 node 5401 transmits the AV/C command in a form of the Write Request packet, to the base station node 5410. At this point, the destination node ID=2, the source node ID=1, and the destination Sub Unit_ID that is indicated by the FCP frame loaded in a packet is X1. Also, a value "a" is allocated as the transaction ID on the 1394 layer.

(3) When the base station node 5410 receives the Write Request packet properly, it returns an Ack_Complete message.

(4) The base station node 5410 ascertains that the destination of this command is the radio terminal 5421, from the destination Sub Unit_ID=X1 in the received FCP frame.

(5) The base station node 5410 transfers the received FCP frame to the radio terminal 5421 by loading it into a radio packet on the radio network. At this point, a value "q" that is the transaction ID (message identifier) on the radio network and that is allocated at the base station node 5410 is also transferred together.

(6) Either before or after that, the base station node 5410 stores the fact that a combination of the transaction ID on the 1394 layer=a and its source node ID=1 is corresponding to the transaction ID on the radio network=q.

(7) The radio terminal 5421 executes the processing based on the prescribed AV/C protocol according to the information in the received FCP frame.

(8) The radio terminal 5421 transfers the processing result of the AV/C command for which the processing has been finished, to the base station node 5410 by using a packet on the radio network. At this point, the transaction ID=q that is written in the packet by which the executed command was received is also returned together, so that it becomes possible to identify the transaction ID on the 1394 layer which corresponds to this packet.

(9) The base station node 5410 can ascertain that the received FCP frame corresponds to a combination of the transaction ID on the 1394 layer=a and the source node ID=1, from the transaction ID=q written in the received radio packet, so that the base station node 5410 can figure out that it suffices to transfer this FCP frame to the 1394 node 5401.

(10) The base station node 5410 transmits an AV/C response packet (to be transferred by the Write Request packet) to the 1394 node 5401. At this point, the destination node ID=1 and the source node ID=2. Also, a value "a" is allocated as the transaction ID on the 1394 layer.

(11) When the 1394 node 5401 receives the AV/C response packet properly, it returns an Ack_Complete message to the base station node 5410.

The above example is directed to the case where a unique transaction ID on the radio network is allocated at the processings (5) and (6), but besides that, it is also possible to use a combination of the transaction ID on the 1394 layer and the source node ID directly as the transaction ID on the radio network.

FIG. 21 shows the processing sequence at a time of transferring the AV/C command from the radio terminal 5421 to the 1394 node 5401 by the Asynchronous packet in this case. FIG. 21 shows an exemplary case where the radio terminal 5421 plays a role of the controller in the AV/C protocol and this radio terminal 5421 transmits the AV/C command to the 1394 node 5401. Consequently, the series of processing described below will be preceded by the processing by which the radio terminal 5421 that is the controller obtains the Sub Unit information within each node on the IEEE 1394 bus and the processing by which the user commands the desired processing to the radio terminal 5421 that is the controller through a remote controller or the like. This processing sequence proceeds as follows.

(1) The application for activating the AV/C protocol is executed at the radio terminal 5421 that is the controller, and the transmission of some AV/C command is commanded. The destination of the command is the Sub Unit A 54011 in the 1394 node 5401.

(2) The radio terminal 5421 transmits an FCP frame on which the AV/C command is loaded, to the base station node 5410 by loading it into a radio packet. At this point, the destination Sub Unit_ID is A, and the transaction ID on the radio network is "q".

(3) The base station node 5410 extracts the FCP frame from the received radio packet, and ascertains that the destination node is the 1394 node 5401, according to the destination Sub Unit_ID value contained therein.

(4) The base station node 5410 transfers the received AV/C command to the 1394 node 5401 by loading it into a Write Request packet. At this point, the source node ID 2, the destination node ID=1, and the destination Sub Unit_ID is A. Also, the transaction ID on the 1394 layer=a is allocated at the base station node 5410.

(5) When the 1394 node 5401 properly receives the Write Request packet on which the AV/C command is loaded, it returns an Ack_Complete message to the base station node 5410.

(6) The 1394 node 5401 executes the processing based on the prescribed AV/C protocol according to the information in the received FCP frame.

(7) Either before or after that, the base station node 5410 stores the fact that the transaction ID on the radio network=q corresponds to the transaction ID on the 1394 layer=a.

(8) The 1394 node 5401 transfers a response message of the AV/C command for which the processing has been finished, to the base station node 5410 by loading it into a Write Request packet. At this point, the source node ID=1, the destination node ID=2, and the transaction ID is "a".

(9) When the base station node 5410 properly receives the Write Request packet on which the AV/C response is loaded, it returns an Ack_Complete message to the 1394 node 5401.

(10) The base station node 5410 ascertains that the received Write Request packet corresponds to the transaction ID on the radio network=q, from the transaction ID value "a" written in that Write Request packet.

(11) The base station node 5410 transfers the received FCP frame to the radio terminal 5421 that corresponds to the received transaction ID value, by loading it into a radio packet. At this point, the transaction ID value is the value "q" allocated by the radio terminal 5421 at the processing (2).

Figure 22:
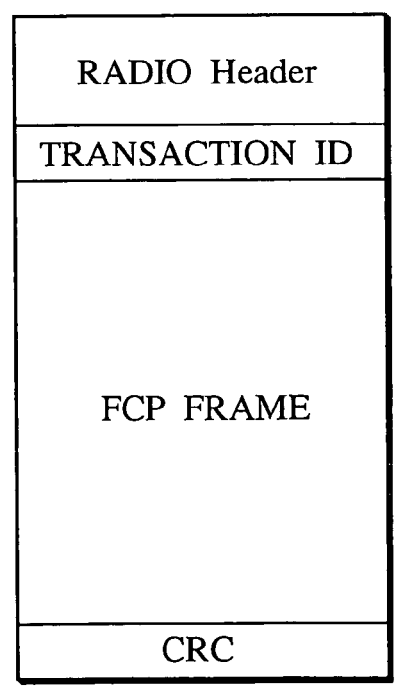
FIG. 22 is a diagram showing an exemplary format of a packet to be transferred on a radio network according to the second embodiment of the present invention.

FIG. 22 shows an exemplary packet format at a time of transferring the FCP frame on the radio network in the above example. The packet of FIG. 22 has a radio header for the sake of transfer on the radio network, and a field indicating the transaction ID for identifying the transaction (session) on the radio network. Then, the FCP frame is loaded into the packet, and a checksum such as CRC is included at the end. Using such a packet format, the communications regarding the AV/C protocol between the 1394 node and the radio terminal as shown in FIG. 20 and FIG. 21 can be realized.

FIG. 23 shows an exemplary case of actually executing the transfer of the real time data such as image data between a node existing on the IEEE 1394 bus and the radio terminal. A part (a) of FIG. 23 shows a configuration at a time of the image data transfer as recognized by the radio terminal 5421, and a part (b) of FIG. 23 shows a configuration at a time of the image data transfer as recognized by the 1394 node 5401. In this case, the transfer processing (the connection processing for an Isochronous channel and a radio channel) between them is executed by the base station node 5410. Also, FIG. 23 shows the case where the IEC 61883 protocol is executable even on the radio network.

The configuration shown in a part (a) of FIG. 23 as recognized by the radio terminal 5421 is actually a network on which the base station node 5410 and the radio terminals 5421 and 5422 are existing, but the radio terminal 5422 is omitted here. The radio terminal 5421 contains a decoder Sub Unit 54213 for decoding and displaying the received image data, and plugs (o_plug 54214, i_plug 54215) for executing the transmission and reception (input and output) processing of the image data with respect to a channel on the radio network. Then, the decoder Sub Unit 54213 and the i_plug 54215 is connected by a connection 54216. Also, the base station node 5410 appears to contain a video source Sub Unit 54103 for storing the video data which is actually existing in the 1394 node 5401, and contains plugs (o_plug 54104, i_plug 54105) for executing the transmission and reception (input and output) processing of the image data with respect to a channel on the radio network. Then, the video source Sub Unit 54103 and the o_plug 54104 is connected by a connection 54106. In addition, the o_plug 54104 of the base station node 5410 and the i_plug 54215 of the radio terminal 5421 is connected by a channel A on the radio network.

The configuration shown in a part (b) of FIG. 23 as recognized by the 1394 node 5401 is actually a network on which the base station node 5410 and the 1394 nodes 5401 and 5402 are existing, but the 1394 node 5402 is omitted here. The 1394 node 5401 contains a video source Sub Unit 54013 for storing the image data, and plugs (o_plug 54014, i_plug 54015) for executing the transmission and reception (input and output) processing of the image data with respect to an Isochronous channel on the IEEE 1394 bus. Then, the video source Sub Unit 54013 and the o_plug 54014 is connected by a connection 54016. Also, the base station node 5410 appears to contain a decoder Sub Unit 54107 for decoding and displaying the received image data which is actually existing in the radio terminal 5421, and contains plugs (o_plug 54108, i_plug 54109) for executing the transmission and reception (input and output) processing of the image data with respect to an Isochronous channel on the IEEE 1394 bus. Then, the decoder Sub Unit 54107 and the i_plug 54109 is connected by a connection 54110. In addition, the o_plug 54014 of the 1394 node 5401 and the i_plug 54109 of the base station node 5410 is connected by an Isochronous channel X on the IEEE 1394 bus.

In such a configuration, the base station node 5410 stores the fact that the connection 54106 in the own node in the configuration of a part (a) of FIG. 23 as recognized by the radio terminal 5421 is actually corresponding to a combination of the Isochronous channel X and the connection 54016 in the 1394 node 5401, and the fact that the connection 54110 in the own node in the configuration of a part (b) of FIG. 23 as recognized by the 1394 node 5401 is actually corresponding to a combination of the channel A on the radio network and the connection 54216 in the radio terminal 5421. Then, the transfer processing for the actually transferred image data is executed according these combinations.

FIG. 24 shows an exemplary processing sequence to be executed in the case of actually transferring the image data by constructing such a network configuration. FIG. 24 shows the case where the 1394 node 5401 is operating as the control node in the AV/C protocol. Consequently, FIG. 24 is directed to the sequence where the connection 54016 in the 1394 node is set up by the 1394 node itself, for example, but in the case where a separate control node exists, it is also possible to set it up by the AV/C command (such as a connect command, for example) from that control node. This processing sequence proceeds as follows.

(1) The 1394 node 5401 requests the disclosure of the Sub Unit information in the base station node 5410 (by transmitting the Unit Info/Sub Unit Info command of the AV/C protocol, for example).

(2) The base station node 5410 discloses the decoder Sub Unit 54107 (which is actually the decoder Sub Unit 54213 existing in the radio terminal 5421) in the base station node as the Sub Unit information in the own node, to the 1394 node 5401.

(3) The 1394 node 5401 sets up the connection 54016 in the own node.

(4) The 1394 node 5401 or the base station node 5410 acquires the Isochronous channel X on the IEEE 1394 bus. Here, the channel with bandwidth=10 Mbps is acquired.

(5) The 1394 node 5401 notifies to the base station node 5410 that packets from the Isochronous channel X will be received by the i_plug 54109. The 1394 node 5401 also notifies that packets will be transmitted to the Isochronous channel X by the o_plug 54014 in the own node (IEC 61883 protocol).

(6) The 1394 node 5401 transmits the AV/C command (a connect command, for example) for connecting between the decoder Sub Unit 54107 and the i_plug 54109 in the base station node 5410, to the base station node 5410.

(7) Upon receiving the command, the base station node 5410 sets up the connection 54106 in the configuration of a a part (a) of FIG. 23 as recognized by the radio terminal 5421 and the connection 54110 in the configuration of a part (b) of FIG. 23 as recognized by the 1394 node 5401, which are corresponding to the command, and stores that they are corresponding.

(8) The base station node 5410 acquires the channel A on the radio network (protocol on the radio network). At this point, the bandwidth of the channel A is set to be the bandwidth of the Isochronous channel X notified by the above processing (5), which is equal to 10 Mbps. In this way, the base station node 5410 recognizes that the Isochronous channel X and the channel A on the radio network are corresponding.

(9) The base station node 5410 notifies to the radio terminal 5421 that packets from the channel A will be received by the i_plug 54215. The base station node 5410 also notifies that packets will be transmitted to the channel A by the o_plug 54104 in the own node (IEC 61883 protocol).

(10) The base station node 5410 transmits the AV/C command (a connect command, for example) for connecting between the decoder Sub Unit 54213 and the i_plug 54215 in the radio terminal 5421, to the radio terminal 5421, as a processing corresponding to the AV/C command received by the above processing (6).

(11) The radio terminal 5421 sets up the connection 54216 in the own node according to the received command, and connects between the decoder Sub Unit 54213 and the i_plug 54215.

(12) The radio terminal 5421 returns a notice that the received command has been completed properly to the base station node 5410.

(13) Upon receiving a notice of the proper completion from the radio terminal 5421, the base station node 5410 returns a notice that the processing corresponding to the AV/C command received at the above processing (6) has been completed properly, to the 1394 node 5401.

(14) The image data are transmitted from the video source Sub Unit 54013 of the 1394 node 5401 to the Isochronous channel X through the connection 54016 and the o_plug 54014 in the 1394 node 5401, and further transferred to the decoder Sub Unit 54107 through the i_plug 54109 of the base station node 5410 and the connection 54110 in the base station node 5410.

(15) The base station node 5410 executes the processing for transferring the image data received at the decoder Sub Unit 54107 in the configuration as recognized from the 1394 node side into the transmission data to be transmitted from the video source Sub Unit 54103 in the configuration as recognized from the radio terminal side.

(16) The image data are transmitted from the video source Sub Unit 54103 of the base station node 5410 to the channel A on the radio network through the connection 54106 and the o_plug 54104 in the base station node 5410, and further transferred to the decoder Sub Unit 54213 through the i_plug 54215 of the radio terminal 5421 and the connection 54216 in the radio terminal 5421.

(17) The radio terminal 5421 executes the decoding processing of the received image data, and displays the decoded image data on a display screen.

In the above sequence, the transfer of a transfer acknowledgement message (Ack Message) for each packet as defined by IEEE 1394-1995 is omitted for simplicity.

FIG. 25 shows another exemplary processing sequence to be executed in the case of transferring the image data similarly. FIG. 25 shows the case where the radio terminal 5421 is operated as the control node in the AV/C protocol. This processing sequence proceeds as follows.

(1) The radio terminal 5421 requests the disclosure of the Sub Unit information in the base station node 5410 (by transmitting the Unit Info/Sub Unit Info command of the AV/C protocol, for example).

(2) The base station node 5410 discloses the video source Sub Unit 54103 (which is actually the video source Sub Unit 54013 existing in the 1394 node 5401) as the Sub Unit information in the own node, to the radio terminal 5421.

(3) The radio terminal 5421 sets up the connection 54216 in the own node.

(4) The radio terminal 5421 or the base station node 5410 acquires the channel A on the radio network (protocol on the radio network). Here, the channel with bandwidth 10 Mbps is acquired.

(5) The radio terminal 5421 notifies to the base station node 5410 that packets to the channel A will be transmitted by the o_plug 54104. The radio terminal 5421 also notifies that packets from the channel A will be received by the i_plug 54015 in the own node (IEC 61883 protocol).

(6) The radio terminal 5421 transmits the AV/C command (a connect command, for example) for connecting between the video source Sub Unit 54103 and the o_plug 54104 in the base station node 5410, to the base station node 5410.

(7) Upon receiving the command, the base station node 5410 sets up the connection 54106 in the configuration of a a part (a) of FIG. 23 as recognized by the radio terminal 5421 and the connection 54110 in the configuration of a part (b) of FIG. 23 as recognized by the 1394 node 5401, which are corresponding to the command, and stores that they are corresponding.

(8) The base station node 5410 acquires the Isochronous channel X on the IEEE 1394 bus. At this point, the bandwidth of the Isochronous channel X is set to be the bandwidth of the channel A on the radio network notified by the above processing (5), which is equal to 10 Mbps. In this way, the base station node 5410 recognizes that the Isochronous channel X and the channel A on the radio network are corresponding.

(9) The base station node 5410 notifies to the 1394 node 5401 that packets to the Isochronous channel X will be transmitted by the o_plug 54014. The base station node 5410 also notifies that packets from the Isochronous channel X will be received by the i_plug 54109 in the own node. (IEC 61883 protocol).

(10) The base station node 5410 transmits the AV/C command (a connect command, for example) for connecting between the video source Sub Unit 54013 and the o_plug 54014 in the 1394 node 5401, to the 1394 node 5401, as a processing corresponding to the AV/C command received by the above processing (6).

(11) The 1394 node 5401 sets up the connection 54016 in the own node according to the received command, and connects between the video source Sub Unit 54013 and the o_plug 54014.

(12) The 1394 node 5401 returns a notice that the received command has been completed properly to the base station node 5410.

(13) Upon receiving a notice of the proper completion from the 1394 node 5401, the base station node 5410 returns a notice that the processing corresponding to the AV/C command received at the above processing (6) has been completed properly, to the radio terminal 5421.

(14) The image data are transmitted from the video source Sub Unit 54013 of the 1394 node 5401 to the Isochronous channel X through the connection 54016 and the o_plug 54014 in the 1394 node 5401, and further transferred to the decoder Sub Unit 54107 through the i_plug 54109 of the base station node 5410 and the connection 54110 in the base station node 5410.

(15) The base station node 5410 executes the processing for transferring the image data received at the decoder Sub Unit 54107 in the configuration as recognized from the 1394 node side into the transmission data to be transmitted from the video source Sub Unit 54103 in the configuration as recognized from the radio terminal side.

(16) The image data are transmitted from the video source Sub Unit 54103 of the base station node 5410 to the channel A on the radio network through the connection 54106 and the o_plug 54104 in the base station node 5410, and further transferred to the decoder Sub Unit 54213 through the i_plug 54215 of the radio terminal 5421 and the connection 54216 in the radio terminal 5421.

(17) The radio terminal 5421 executes the decoding processing of the received image data, and displays the decoded image data on a display screen.

By the series of processing as described above, it is possible to realize the image data transfer processing from the 1394 node (the 1394 node 5401 in the examples of FIG. 23 and FIG. 25) to the radio terminal (the radio terminal 5421 in the examples of FIG. 24 and FIG. 25) according to this second embodiment. Also by the similar processing, it is possible to transfer the image data existing in the radio terminal 5421 to the 1394 node 5401 on the IEEE 1394 bus and playback the image data of the radio terminal 5421 at the 1394 node 5401.

FIG. 26 shows an exemplary internal configuration of the base station node 5410. In the base station node 5410, the processing for showing the Sub Unit information on the IEEE 1394 bus to the radio network side and the processing for showing the Sub Unit information on the radio network to the IEEE 1394 bus side are executed, and their correspondence is maintained. Also, at a time of carrying out the packet transfer between the IEEE 1394 bus and the radio network, the routing processing according to this Sub Unit information is executed. In addition, the base station node 5410 maintains the correspondence between the transaction ID attached on the IEEE 1394 bus and the message identifier such as the transaction ID attached on the radio network, and executes the routing processing at a time of the packet transfer between the IEEE 1394 bus and the radio network according to that correspondence.

In order to provide these functions, the base station node 5410 contains a radio interface processing unit 6801 for providing the interface function with respect to the radio network, a packet conversion processing unit 6802 for executing the conversion processing for a packet into which the FCP frame is to be loaded between the IEEE 1394 bus and the radio network (more specifically the transfer processing for the FCP frame between a packet on the IEEE 1394 bus and a packet on the radio network), and a 1394 interface processing unit 6805 for providing the interface function with respect to the IEEE 1394 bus.

The base station node 5410 also includes a Sub Unit_ID correspondence table 6803 for storing the correspondence between the Sub Unit information on the IEEE 1394 bus and the Sub Unit information on the radio network, and a transaction/channel correspondence table 6804 for storing the correspondence between the transaction ID attached on the IEEE 1394 bus and the transaction ID attached on the radio network as well as the correspondence between the Isochronous channel on the IEEE 1394 bus and the resource (channel) on the radio network, for the sake of the packet conversion processing at the packet conversion processing unit 6802.

Besides these functions, the base station node 5410 may also have a function for executing the application on the IEEE 1394 bus or the application on the radio network, but such a function is not directly related to the present invention so that it is omitted in FIG. 26.

Figure 27:
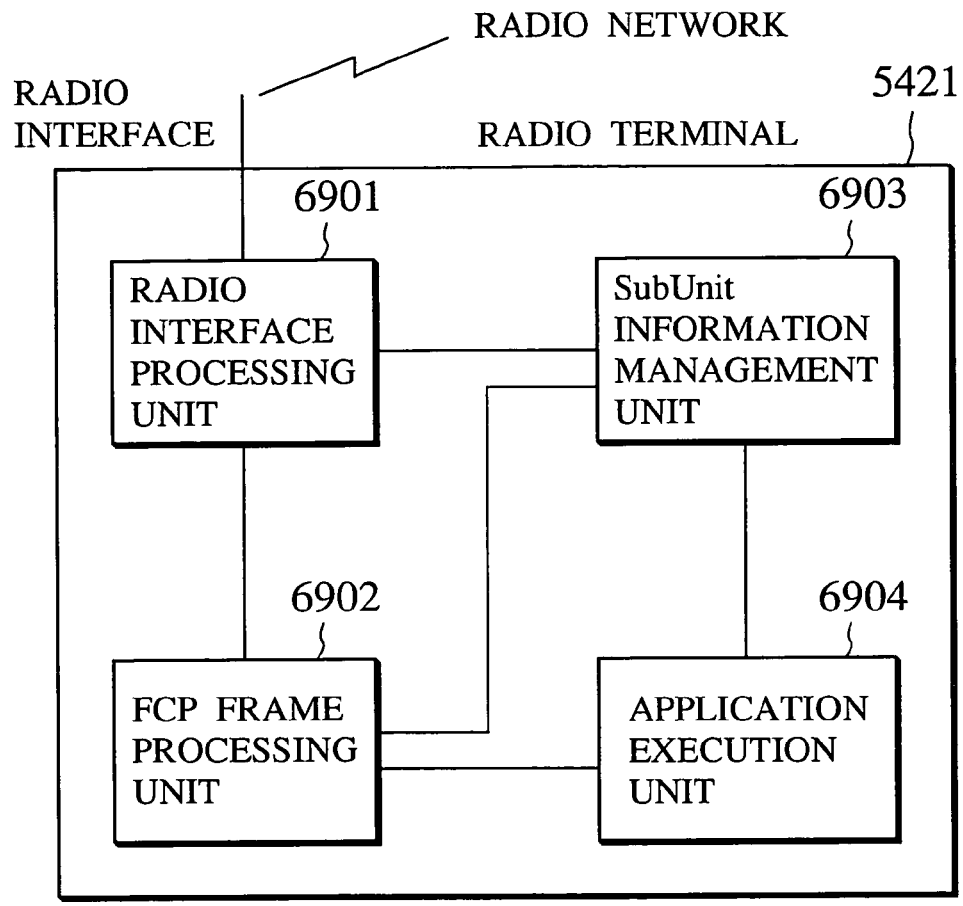
FIG. 27 is a block diagram showing an exemplary internal configuration of a radio terminal according to the second embodiment of the present invention.

FIG. 27 shows an exemplary internal configuration of the radio terminal 5421. The radio terminal 5421 carries out communications with the base station node 5410 by using the Sub Unit information. Consequently, the radio terminal 5421 contains a radio interface processing unit 6901 for providing the interface function with respect to the radio network, an FCP frame processing unit 6902 for executing the processing for the FCP frame corresponding to the AV/C protocol that is to be loaded into a packet to be transferred on the radio network (such as attaching of the destination/source Sub Unit_ID, attaching of the desired command/request information, for example), a Sub Unit information management unit 6903 for managing the Sub Unit information on the radio network, and an application execution unit 6904 for actually executing the AV/C protocol or the like.

Here, it is assumed that the radio terminal 5421 basically executes the AV/C protocol, so that FIG. 27 shows the case of carrying out the Sub Unit information management, but in the case of the radio terminal which executes the HAVi protocol, for example, the SEID information that is its software identifier, the Functional Component information, etc., will be managed.

Next, the third and fourth embodiments directed to the case where the radio terminal moves in the radio network and a communication node to be connected changes (the case of handoff) will be described. Each node and the radio terminal in the third and fourth embodiments basically have the same functions as described in the second embodiment, so that the differences from the second embodiment will be mainly described.

Referring now to FIG. 28 to FIG. 33, the third embodiment of a communication node and a communication terminal according to the present invention will be described in detail.

As shown in FIG. 28, this third embodiment is directed to the case where a radio terminal 621 moves in the radio network and a communication node to be connected is changed from a communication node 602 to a communication node 601 (the case of handoff). FIG. 28 shows the case where there are communication nodes 601 and 602 each having a radio interface and a 1394 interface, as well as 1394 nodes 611 and 612 each having a 1394 interface but no radio interface, and the 1394 node 611 is the control node on the IEEE 1394 bus. There is also a radio terminal 621 which moves in the radio network while communicating with the communication node. Note that the radio terminal 621 has a decoder function provided therein.

In this third embodiment, the case of carrying out the Isochronous communication between the radio terminal 621 and the 1394 node 612 will be considered similarly as in the second embodiment. Here, as the behavior of the communication node on the IEEE 1394 bus at a time of executing such a handoff processing, it is possible to consider two cases including: (1) the case where the handoff processing is realized after the Isochronous channel is newly acquired on the IEEE 1394 bus, and (2) the case where the handoff processing is realized using the Isochronous channel that has been used up until then, without acquiring a new Isochronous channel.

In this third embodiment, the former case of realizing the handoff processing by acquiring a new Isochronous channel will be described. The latter case of realizing the handoff processing using the Isochronous channel that has been used up until then without acquiring a new Isochronous channel will be described as the fourth embodiment.

Figure 29:
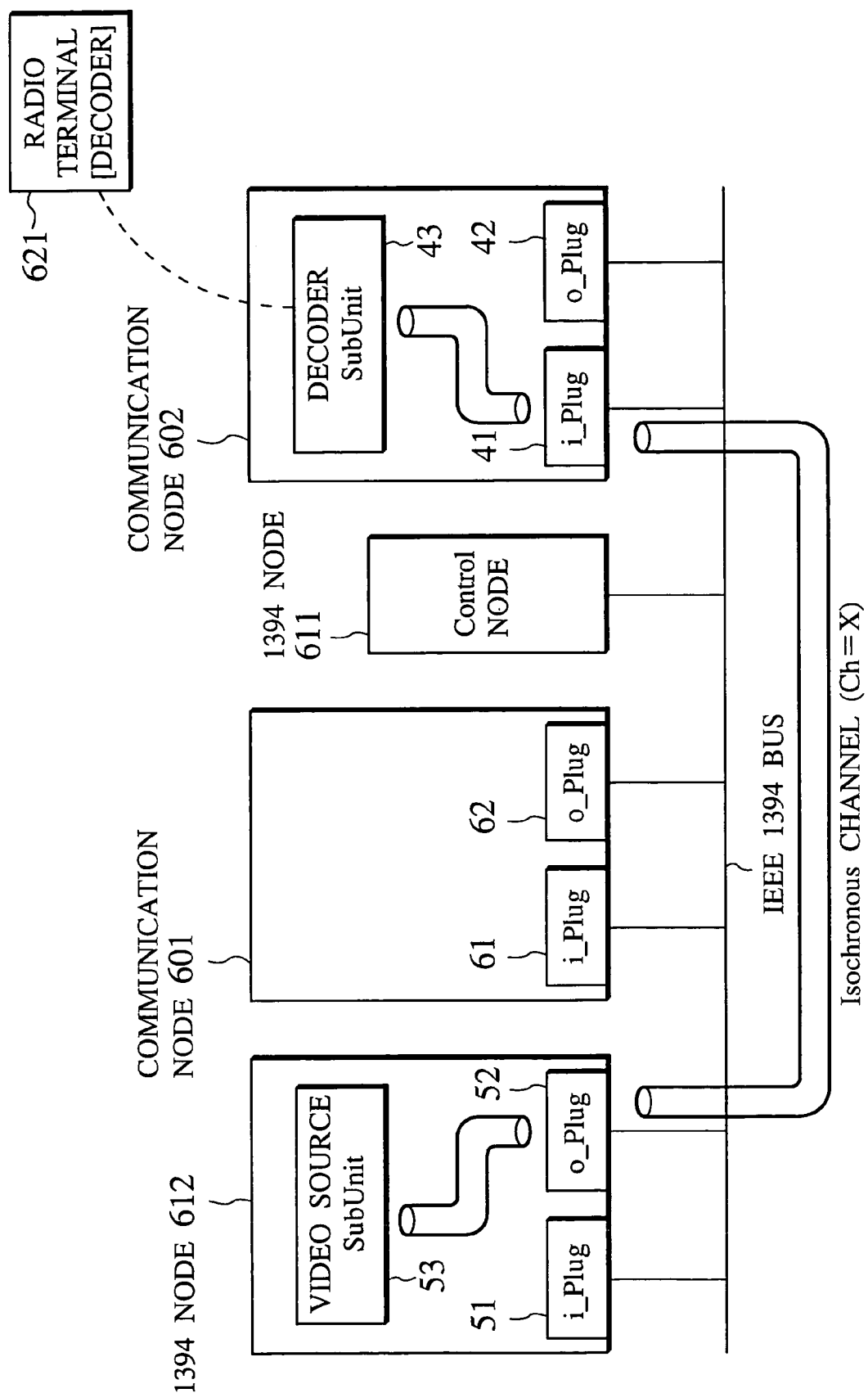
FIG. 29 is a diagram showing an exemplary state of resource acquisition on an IEEE 1394 bus and in an IEEE 1394 node before a move of a radio terminal according to the third embodiment of the present invention.
Figure 30:
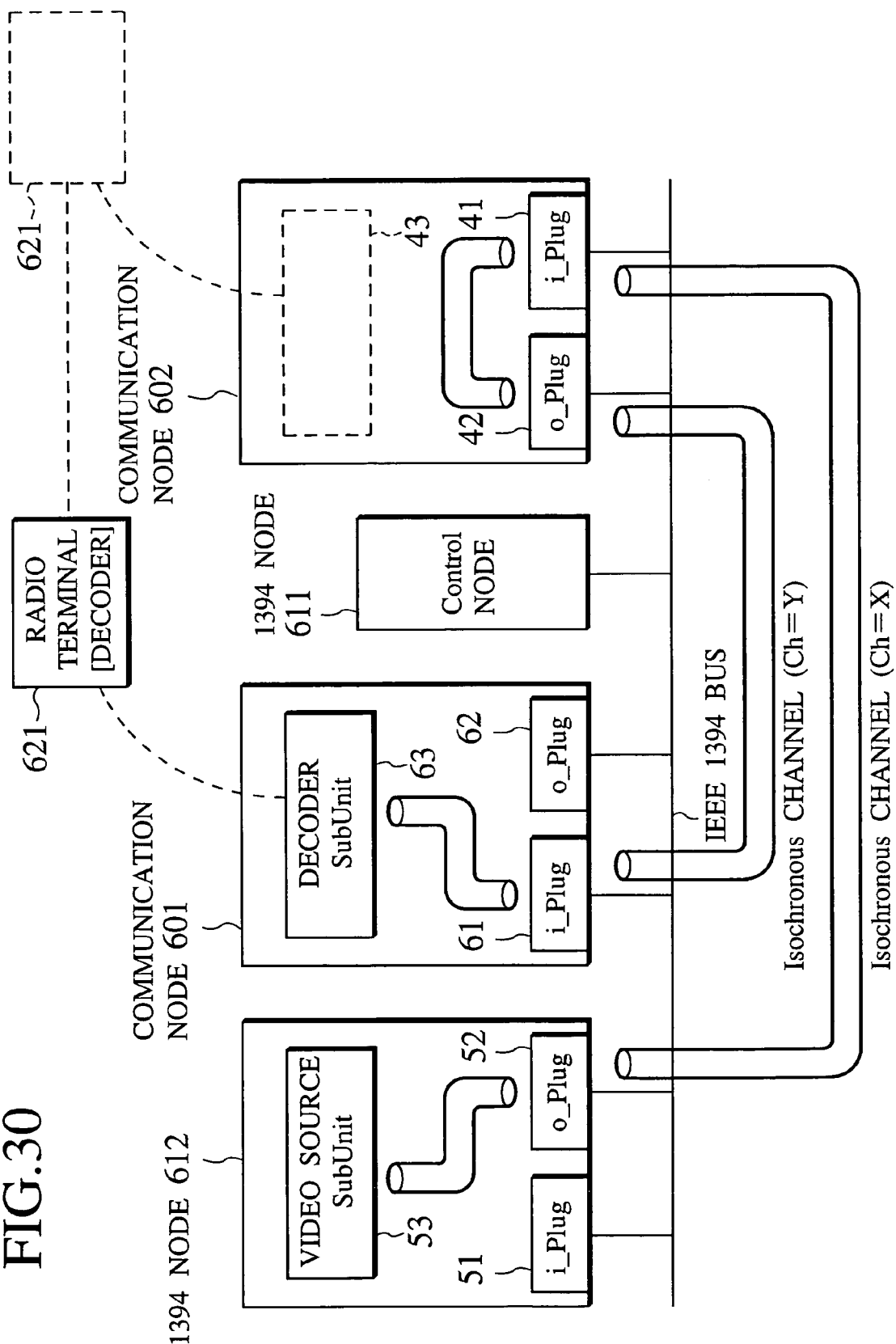
FIG. 30 is a diagram showing an exemplary state of resource acquisition on an IEEE 1394 bus and in an IEEE 1394 node after a move of a radio terminal according to the third embodiment of the present invention.

FIG. 29 and FIG. 30 respectively show states of the Isochronous channel and the inter-Sub Unit connection before and after the handoff processing for switching from the communication node 602 to the communication node 601 due to the move of the radio terminal 621 when the video image is transmitted from the video source in the 1394 node 612 to the radio terminal 621 through the communication node 602.

First, the processing sequence similar to that of FIG. 24 or FIG. 25 is executed. As a result, the state before the handoff processing is such that the 1394 node 612 is transmitting the video data from the video source Sub Unit 53 to the Isochronous channel (ch=X) through the o_plug 52, and the communication node 602 is receiving the data on the Isochronous channel (ch=X) and transferring them to the decoder Sub Unit 43 through the i_plug 41. Here, this processing for the data transfer to the decoder Sub Unit 43 is actually executed by the protocol conversion/data transfer processing from the communication node 602 to the radio terminal 621.

At this point, suppose that the communication is handed off to the communication node 601 as the radio terminal 621 moves. In this third embodiment, at a time of this handoff processing, there is a need for the radio terminal 621 to notify the physical ID at the IEEE 1394 bus of the communication node to which it has been connected up until then (the communication node 602 here), the information on the Isochronous channel that has been used for the data transfer (channel number (X), bandwidth, etc.), and the information on Sub Unit configuration/inter-Sub unit connection in the communication node 602, etc., to the communication node 601 to which it is to be newly connected.

For this reason, the communication node 602 has a unction for notifying the above described physical ID, Sub nit related information, etc., to the radio terminal 621 hen the radio terminal 621 is connected, and a function for receiving the above described information from the radio terminal 621 and executing the corresponding processing to it at a time of executing the handoff. Also, the radio terminal 621 has a function for maintaining the above described information notified from the communication node 602, and a function for notifying the above described information to the communication node 601 to be newly connected at a time of executing the handoff.

In the following example, the above described information that is notified from each communication node to the radio terminal at a time of the radio terminal connection (the physical ID of the node, the information on the Isochronous channel (ch=X) that has been used for the data transfer to the radio terminal 621 (channel number, bandwidth, etc.) and the information on the Sub Unit configuration/connection within the own node, etc.) will be referred to as "handoff information".

Now, the processing procedure to be executed at a time of the handoff of the radio terminal 621 from the communication node 602 to the communication node 601 will be described.

Figure 31:
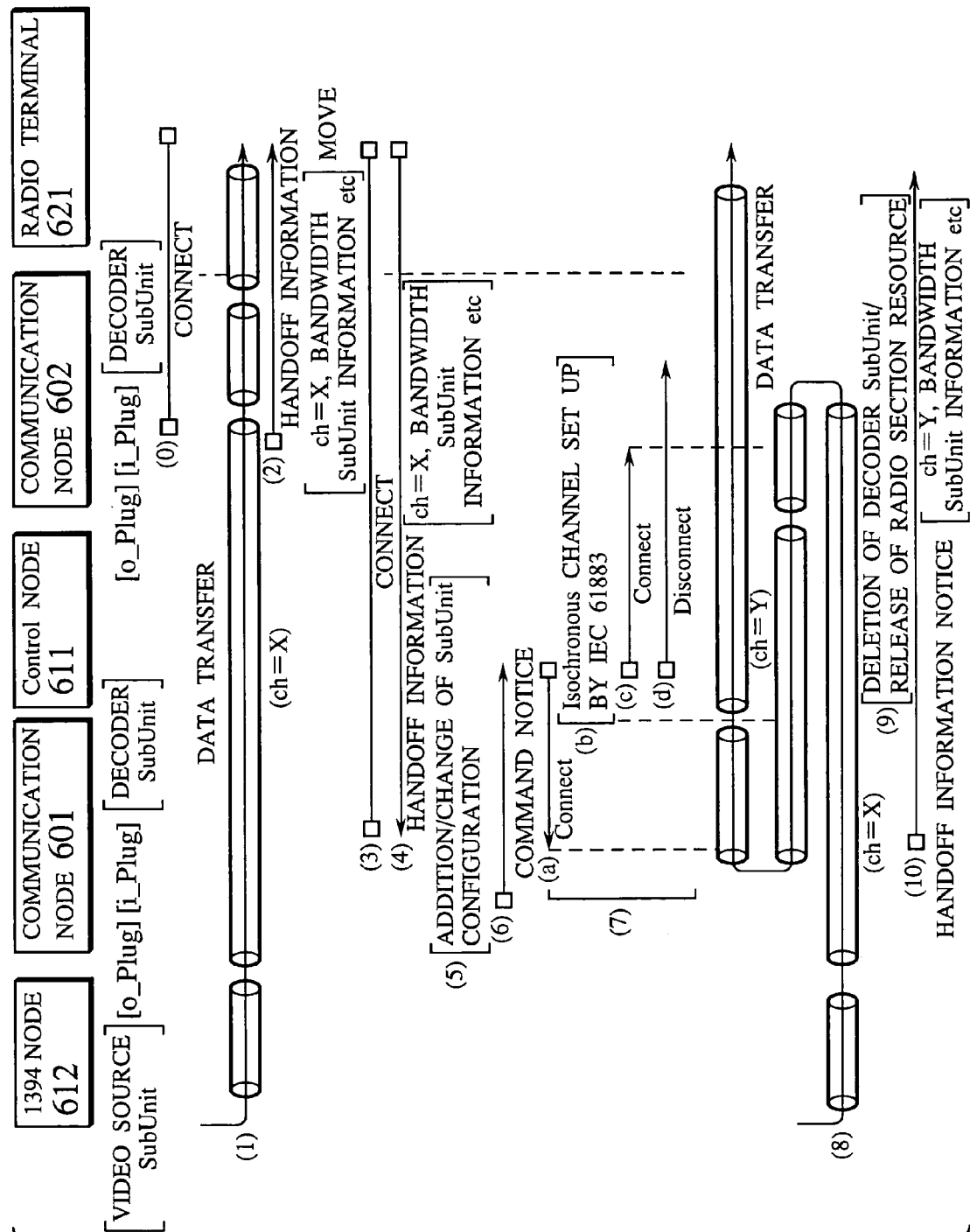
FIG. 31 is a sequence chart of a handoff processing between a radio terminal and base station nodes to which a radio terminal is connected before and after moving in a case where a radio terminal moves according to the third embodiment of the present invention.
Figure 32:
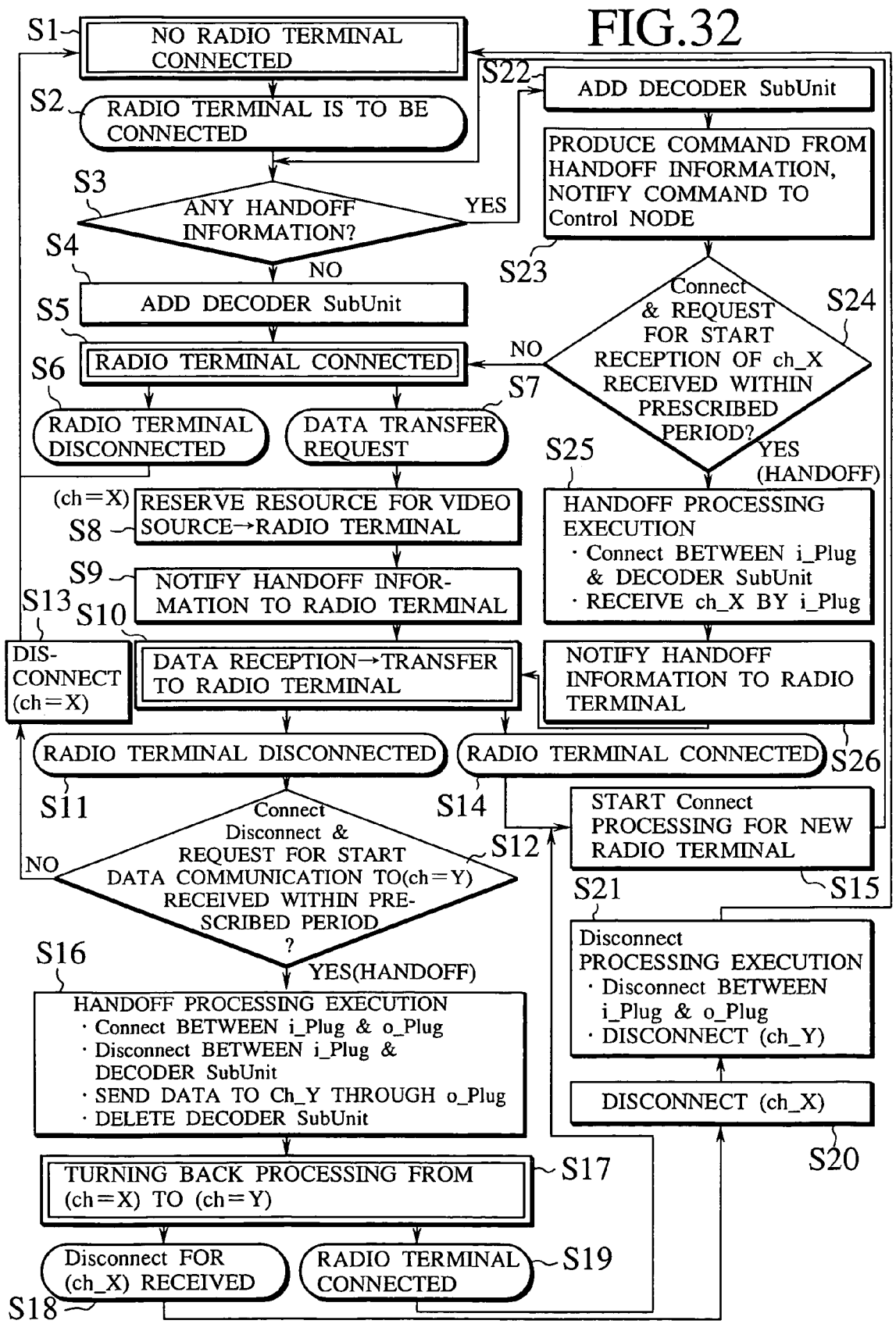
FIG. 32 is a flow chart of an exemplary processing procedure to be executed in base station nodes to which a radio terminal is connected before and after moving in a case where a radio terminal moves according to the third embodiment of the present invention.

FIG. 31 shows an exemplary processing sequence in this case, and FIG. 32 shows an exemplary processing procedure at the communication nodes 601 and 602 in this case.

(0) The radio terminal 621 is connected to the communication node 602 and the radio resource is reserved between the communication node 602 and the radio terminal 621.

(1) By the command from the control node 611 (the command similar to that explained in the second embodiment), the data communication from the 1394 node 612 to the radio terminal 621 is started (that is, the Isochronous channel (ch=X) and the inter-Sub Unit connection in the 1394 node 612/the communication node 602, etc., are set up).

(2) The communication node 602 notifies the handoff information to the radio terminal 621.

(3) The radio terminal 621 moves, and the handoff processing to change the node to be connected from the communication node 602 to the communication node 601 is started, while the radio resource between the communication node 601 and the radio terminal 621 is reserved.

(4) The radio terminal 621 notifies the handoff information of the communication node 602 to which it has been connected up until then, to the communication node 601.

(5) The communication node 601 creates the decoder Sub Unit 63 of FIG. 30 in the own node, according to the Sub Unit information in the notified handoff information.

(6) The communication node 601 notifies commands for the handoff processing that are produced from the received handoff information, to the control node 611.

(7) The control node 611 executes the following processing according to the commands from the communication node 601.

(a) By the connect command of the AV/C protocol, for example, the i_plug 61 and the decoder Sub Unit 63 of the communication node 601 are connected.

(b) By the IEC 61883 protocol, for example, the Isochronous channel (ch=Y) for the data transfer is set up between the i_plug 61 of the communication node 601 and the o_plug 42 of the communication node 602.

(c) By the connect command of the AV/C protocol, for example, the i_plug 41 and the o_plug 42 of the communication node 602 are connected.

(d) By the Disconnect command of the AV/C protocol, for example, the connection between the i_plug 41 and the decoder Sub Unit 43 of the communication node 602 is disconnected.

(8) From a timing at which the i_plug 41 and the o_plug 42 of the communication node 602 are connected by the above (7)(c), the video data of the 1394 node 612 are transferred to the communication node 602 through the Isochronous channel (ch=X), turned back within the communication node 602, and transferred again to the communication node 601 through the Isochronous channel (ch=Y).

(9) Either before or after that, the decoder Sub Unit 43 in the communication node 602 is deleted, and the radio resource between the communication node 602 and the radio terminal 621 is released.

(10) The communication node 601 notifies the handoff information to the radio terminal 621.

In the case where the radio terminal 621 moves further, the above processings (3) to (10) will be repeated.

Note that, in the above processing (6), the communication node 601 that received the handoff information commands the control node 611 to issue prescribed commands, but it is also possible for the radio terminal 621 to command the control node 611 in a manner similar to that of the remote control operation. In such a case, the information on the Isochronous channel, the physical ID and the internal inter-Sub Unit connection information of the communication node to which it has been connected up until then (the communication node 602 in the above example) become unnecessary in the handoff information to be notified from the radio terminal 621 to the newly connected communication node (the communication node 601 in the above example), but instead, it becomes necessary for the control node 611 to have the handoff processing function for reading out the handoff information and executing the necessary processing.

Also, in the above processing, the control node 611 and the communication nodes 601 and 602 are processed as separate nodes, but it is also possible for the communication node 601 or the communication node 602 to have the function of the control node 611.

Moreover, in the above processing, the decoder Sub Unit that has been created in the node from which the radio terminal is handed off (the communication node 602 in the above example) at the above processing (9) is deleted, but there is not absolutely necessary to delete this decoder Sub Unit. For example, it is possible for each communication node to maintain the decoder Sub Unit even while the radio terminal is not connected, and connect the decoder Sub Unit with the i_plug and the o_plug in the own node only when the radio terminal is actually connected.

Now the processing procedure shown in FIG. 32 will be described.

First, the communication node that is a moving origin of the radio terminal in the case where there is no move of the radio terminal will be described.

Initially, the communication node is in a state of having no radio terminal connected (step S1). Then, when the radio terminal is to be connected (step S2), if there is no handoff information for that radio terminal (step S3), the decoder Sub Unit is added (step S4) and the radio terminal is connected (step S5).

Here, if the radio terminal is to be disconnected (step S6), the processing returns to the step S1, but if the data transfer request is issued (step S7), the resource necessary for the data transfer between the target 1394 node and the radio terminal is reserved (step S8), the handoff information is notified to the radio terminal (step S9), and the data received from the IEEE 1394 bus are transferred to the radio terminal (step S10).

Note here that, if another radio terminal is also to be connected (step S14), the new radio terminal connection processing is started (step S15).

Next, when that radio terminal is to be disconnected from that communication node (step S11), if Connect, Disconnect, and request for start data communication to (ch_Y) are not received within a prescribed period of time (step S12), it is regarded that this radio terminal is not to be connected with any communication node so that (ch_X) is disconnected (step S13) and the processing returns to the step S1.

On the other hand, if Connect, Disconnect, and request for start data communication to (ch_Y) are received within a prescribed period of time (step S12), it implies that this radio terminal has moved to another communication node so that the handoff processing is executed (step S16). Then, the processing for turning back from (ch_X) to (ch_Y) (the relay processing) is executed (step S17).

Note here that, if another radio terminal is also to be connected (step S19), the new radio terminal connection processing is started (step S15).

Next, when the command for disconnecting (ch_X) is received (step S18), (ch_X) is disconnected (step S20), the i_plug and the o_plug are disconnected while (ch_Y) is disconnected (step S21), and the processing returns to the step S1.

Next, the communication node that is a moving target of the radio terminal will be described.

Initially, the communication node is in a state of having no radio terminal connected (step S1). Then, when the radio terminal is to be connected (step S2), if there is the handoff information for that radio terminal (step S3), the decoder Sub Unit is added (step S22), commands are produced from the handoff information, and these commands are notified to the control node (step S23).

Here, if Connect and request for start data reception of (ch_X) are not received within a prescribed period of time (step S24), the processing proceeds to the step S5 and the handoff processing is not carried out. If Connect and request for start data reception of (ch_X) are received within a prescribed period of time (step S24), the handoff processing is executed (step S25), and the handoff information is notified to that radio terminal (step S26). Then, the processing proceeds to the step S10 and the data received from the IEEE 1394 bus are transferred to the radio terminal.

Note that the above example is directed to the case of executing the data transfer from the 1394 node on the IEEE 1394 bus to the radio terminal, but it is also possible to execute the data transfer from the radio terminal to another 1394 node on the IEEE 1394 bus by the similar processing.

Figure 33:
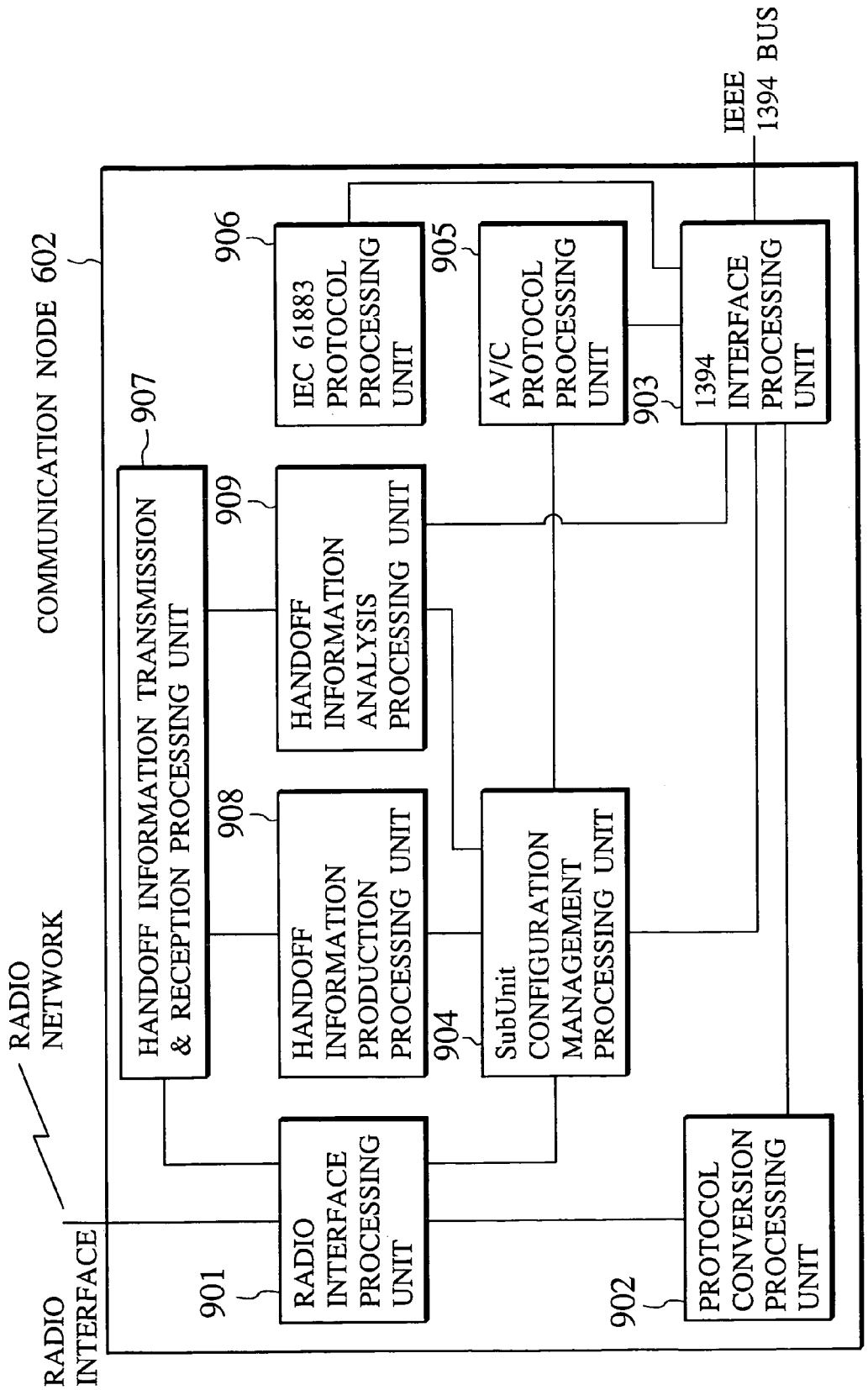
FIG. 33 is a block diagram showing an exemplary internal configuration of a communication node according to the third embodiment of the present invention.

FIG. 33 shows an exemplary internal configuration of the communication node 602 in this third embodiment.

This communication node 602 comprises a radio interface processing unit 901 for executing the interface processing function with respect to the radio network, a protocol conversion processing unit 902 for executing the protocol conversion processing between the radio network and the IEEE 1394 bus, a Sub Unit configuration management processing unit 904 for executing the management processing such as addition/deletion of information regarding the Sub Unit configuration in the communication node 602, an AV/C protocol processing unit 905 for executing the processing corresponding to the AV/C command upon receiving the AV/C command from the control node or the like, an IEC 61883 protocol processing unit 906 for executing the processing corresponding to the IEC 61883 protocol command upon receiving the IEC 61883 protocol command from the control node, a handoff information transmission and reception processing unit 907 for executing the handoff information transmission and reception processing, a handoff information production processing unit 908 for producing the handoff information such as Sub Unit information within the own node, a handoff information analysis processing unit 909 for analyzing the received handoff information, executing the decoder Sub Unit addition processing within the communication node 602 and the inter-Sub Unit connection state changing processing, recognizing the communication node to/from which the radio terminal is to be handed off and the necessary processing on the IEEE 1394 bus, and executing the processing for transmitting commands corresponding to these processings through the control node 611, and a 1394 interface processing unit 903 for executing the interface processing function with respect to the IEEE 1394 bus.

The processings to be executed by the Sub Unit configuration management processing unit 904 in this third embodiment include, apart from the processings described in the second embodiment, the processing for notifying Sub Unit information within the own node such as the decoder Sub Unit to the handoff information production processing unit 908, and the processing for adding the new Sub Unit to the Sub Unit configuration in the own node or changing the Sub Unit configuration in the own node according to the Sub Unit configuration information notified from the handoff information analysis processing unit 909.

Referring now to FIG. 34 to FIG. 37, the fourth embodiment of a communication node and a communication terminal according to the present invention will be described in detail.

This fourth embodiment is also directed to the case where a radio terminal 621 moves in the radio network and a communication node to be connected is changed from a communication node 602 to a communication node 601 (the case of handoff) as shown in FIG. 28, and here the case of realizing the handoff processing without acquiring a new Isochronous channel at a time of executing the handoff processing will be described.

Figure 34:
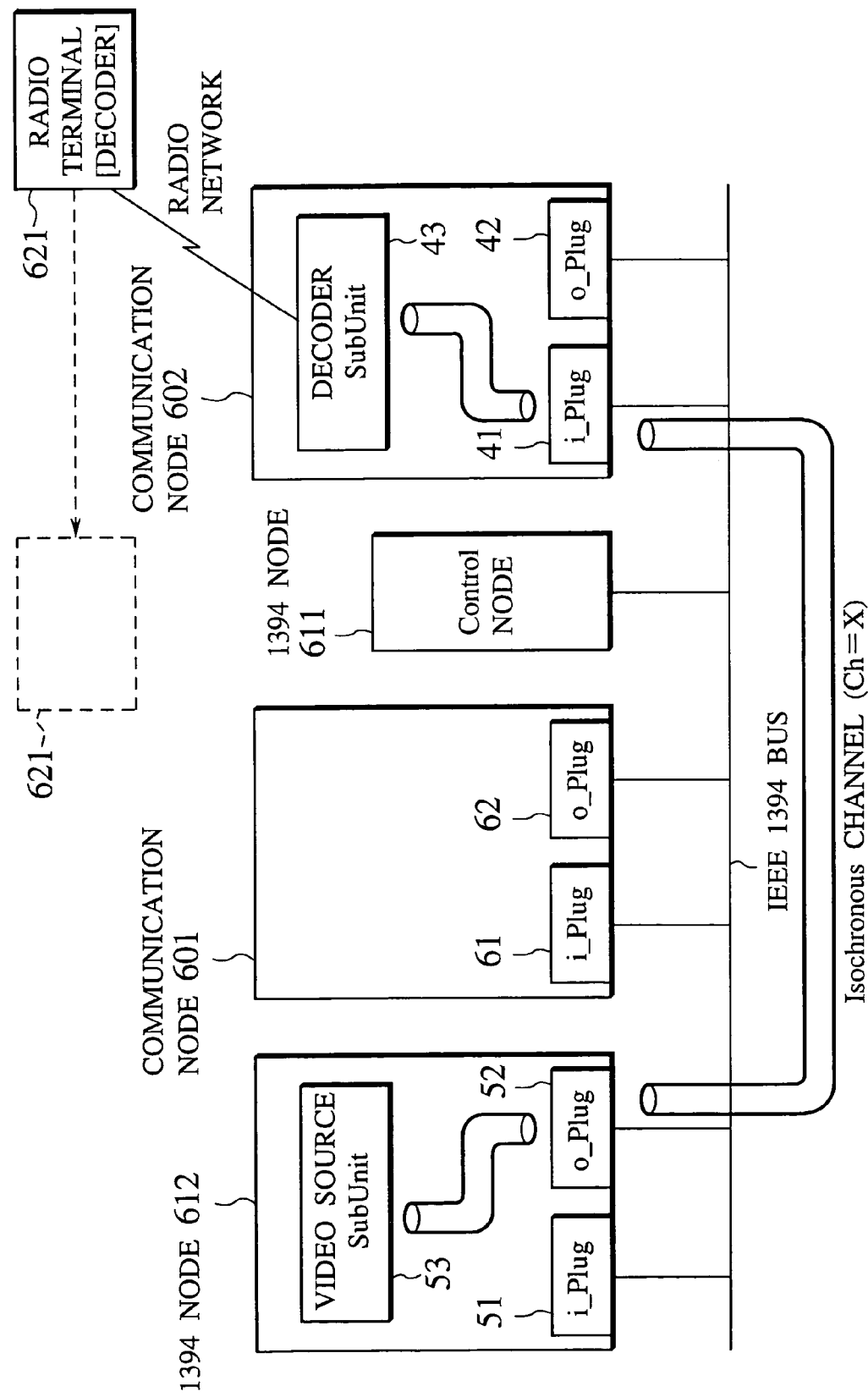
FIG. 34 is a diagram showing an exemplary state of resource acquisition on an IEEE 1394 bus and in an IEEE 1394 node before a move of a radio terminal according to the fourth embodiment of the present invention.
Figure 35:
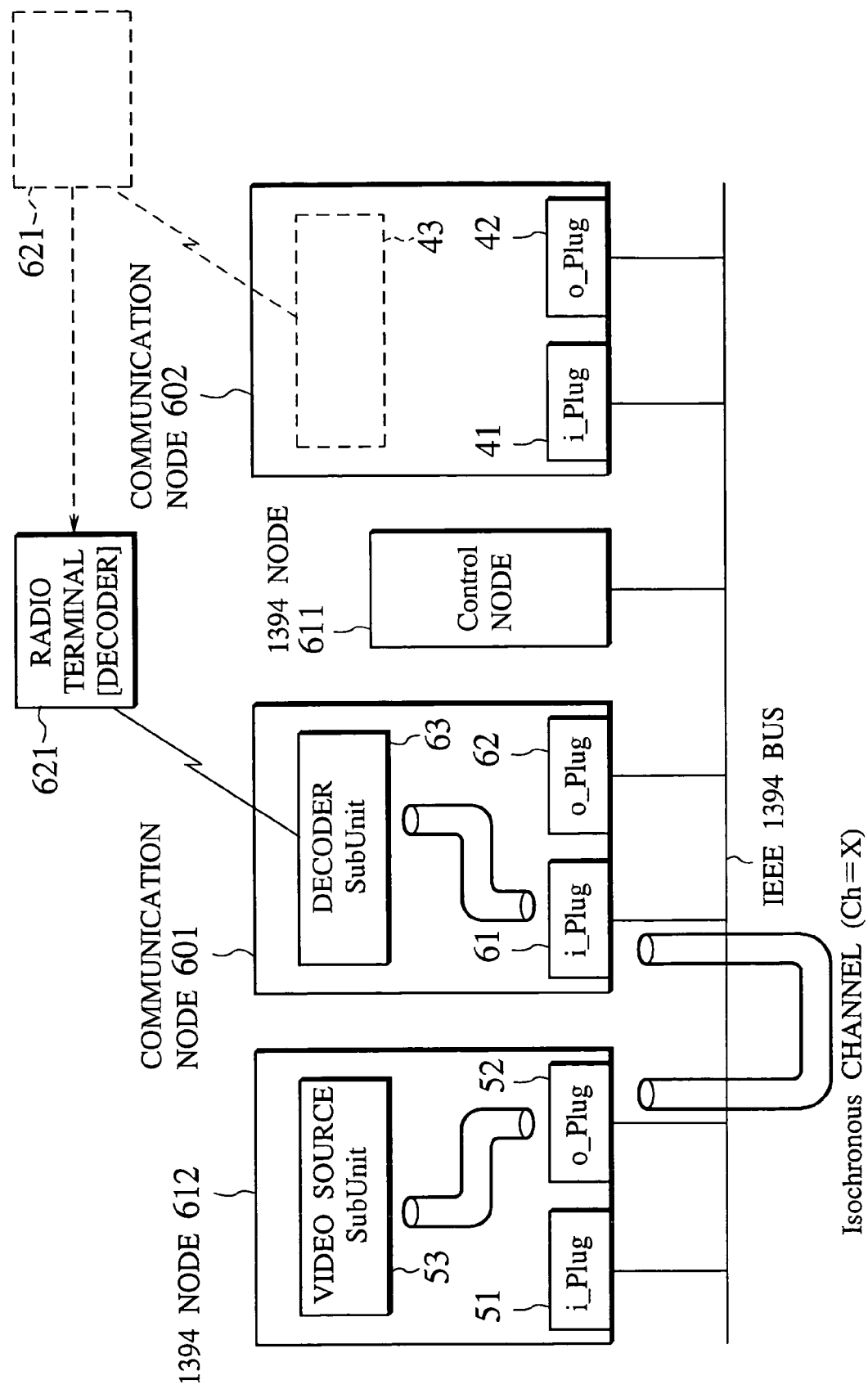
FIG. 35 is a diagram showing an exemplary state of resource acquisition on an IEEE 1394 bus and in an IEEE 1394 node after a move of a radio terminal according to the fourth embodiment of the present invention.

FIG. 34 and FIG. 35 respectively show states of the Isochronous channel and the inter-Sub Unit connection within the communication node before and after the handoff processing for switching from the communication node 602 to the communication node 601 due to the move of the radio terminal 621.

First, the processing sequence similar to that of FIG. 24 or FIG. 25 is executed. As a result, the state before the handoff processing is such that the 1394 node 612 is transmitting the video data from the video source Sub Unit 53 to the Isochronous channel (ch=X) through the o_plug 52, and the communication node 602 is receiving the data on the Isochronous channel (ch=X) and transferring them to the decoder Sub Unit 43 through the i_plug 41. Here, this processing for the data transfer to the decoder Sub Unit 43 is actually executed by the protocol conversion/data transfer processing from the communication node 602 to the radio terminal 621.

At this point, suppose that the communication is handed off to the communication node 601 as the radio terminal 621 moves. In this fourth embodiment, there is also a need to notify the handoff information necessary for this handoff processing between the radio terminal 621 and the communication nodes 602 and 601. Here, similarly as in the third embodiment, the handoff information includes the physical ID at the IEEE 1394 bus of the communication node to which it has been connected up until then (the communication node 602 here), the information on the Isochronous channel (ch=X) that has been used for the data transfer, and the information on Sub Unit configuration/inter-Sub unit connection in the communication node 602, etc.

For this reason, the communication node 602 of this fourth embodiment also has a function for notifying the above described handoff information to the radio terminal 621 when the radio terminal 621 is connected, and a function for receiving the above described handoff information from the radio terminal 621 and changing the Sub Unit configuration and the inter-Sub Unit connection state within the own node according to that information at a time of executing the handoff.

Now, the processing procedure to be executed at a time of the handoff of the radio terminal 621 from the communication node 602 to the communication node 601 will be described.

Figure 36:
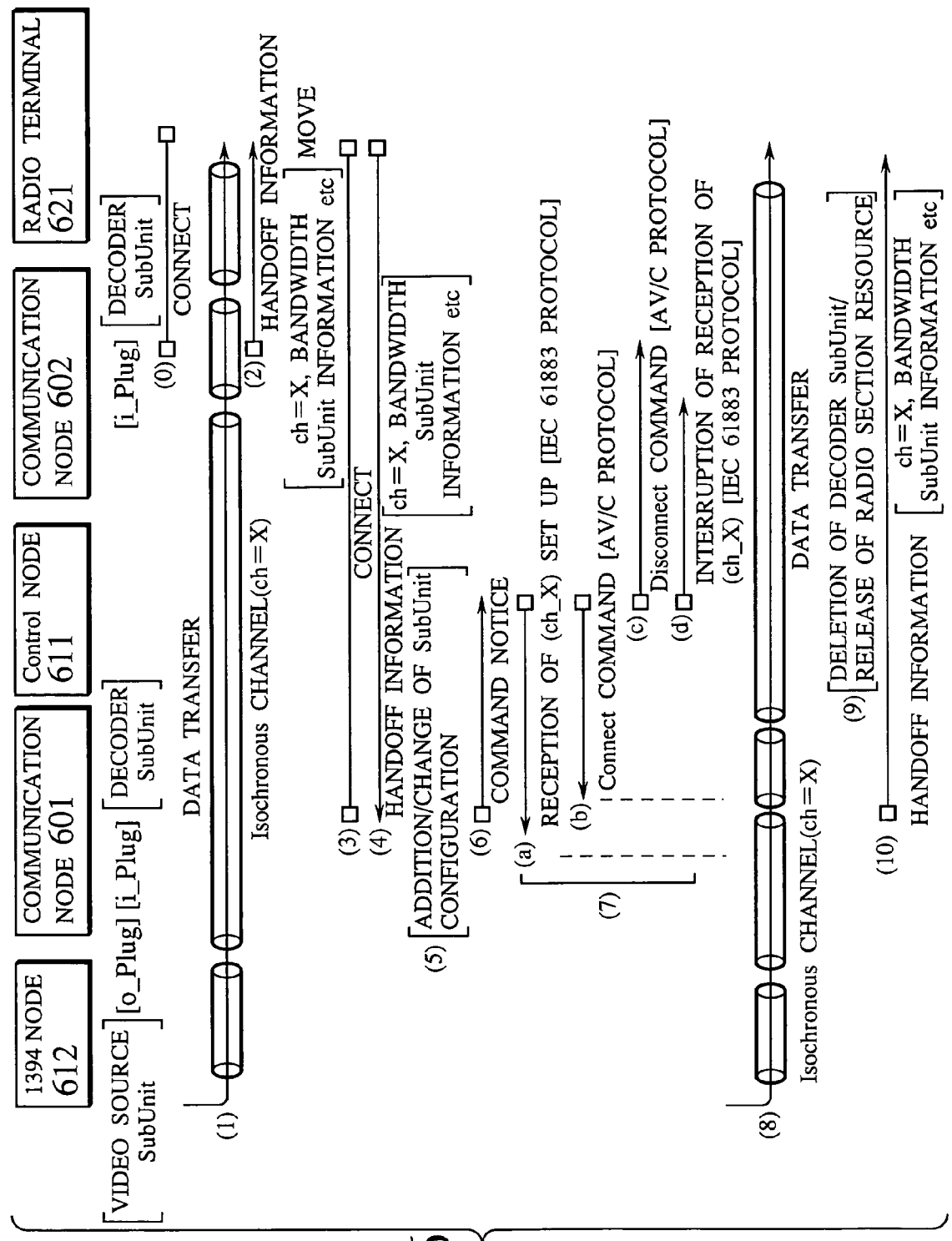
FIG. 36 is a sequence chart of a handoff processing between a radio terminal and base station nodes to which a radio terminal is connected before and after moving in a case where a radio terminal moves according to the fourth embodiment of the present invention.
Figure 37:
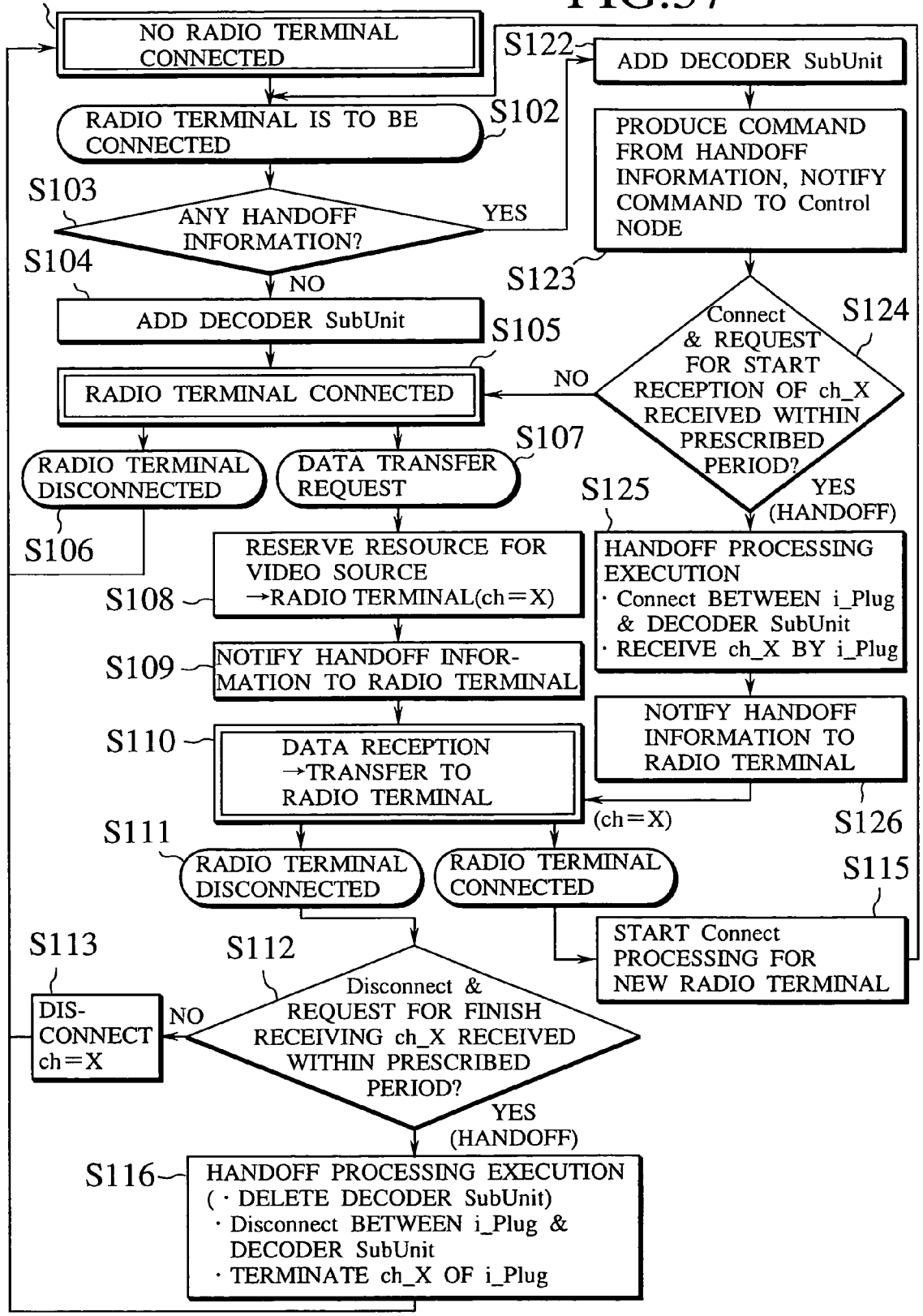
FIG. 37 is a flow chart of an exemplary processing procedure to be executed in base station nodes to which a radio terminal is connected before and after moving in a case where a radio terminal moves according to the fourth embodiment of the present invention.

FIG. 36 shows an exemplary processing sequence in this case, and FIG. 37 shows an exemplary processing procedure at the communication nodes 601 and 602 in this case.

(0) The radio terminal 621 is connected to the communication node 602 and the radio resource is reserved between the communication node 602 and the radio terminal 621.

(1) By the command from the control node 611 (the command similar to that explained in the second embodiment), the data communication from the 1394 node 612 to the radio terminal 621 is started (that is, the Isochronous channel (ch=X) and the inter-Sub Unit connection in the 1394 node 612/the communication node 602, etc., are set up).

(2) The communication node 602 notifies the handoff information to the radio terminal 621.

(3) The radio terminal 621 moves, and the handoff processing to change the node to be connected from the communication node 602 to the communication node 601 is started, while the radio resource between the communication node 601 and the radio terminal 621 is reserved.

(4) The radio terminal 621 notifies the handoff information of the communication node 602 to which it has been connected up until then, to the communication node 601.

(5) The communication node 601 creates the decoder Sub Unit 63 of FIG. 35 in the own node, according to the Sub Unit information in the notified handoff information.

(6) The communication node 601 notifies commands for the handoff processing that are produced from the received handoff information, to the control node 611.

(7) The control node 611 executes the following processing according to the commands from the communication node 601.

(a) By the IEC 61883 protocol, for example, the i_plug of the communication node 601 is set to receive the Isochronous channel (ch=X).

(b) By the connect command of the AV/C protocol, for example, the i_plug 61 and the decoder Sub Unit 63 of the communication node 601 are connected.

(c) By the Disconnect command of the AV/C protocol, for example, the connection between the i_plug 41 and the decoder Sub Unit 43 of the communication node 602 is disconnected.

(d) By the IEC 61883 protocol, for example, the i_plug of the communication node 602 is set to stop receiving the Isochronous channel (ch=X).

(8) From a timing at which the i_plug 61 and the decoder Sub Unit 63 of the communication node 601 are connected by the above (7)(b), the video data of the 1394 node 612 are transferred to the communication node 601 through the Isochronous channel (ch=X), applied with the protocol conversion processing at the communication node 601, and transferred to the radio terminal 621, such that the transfer of the video data to the radio terminal 621 is realized.

(9) Either before or after that, the decoder Sub Unit 43 in the communication node 602 is deleted, and the radio resource between the communication node 602 and the radio terminal 621 is released.

(10) The communication node 601 notifies the handoff information to the radio terminal 621.

In the case where the radio terminal 621 moves further, the above processings (3) to (10) will be repeated.

Note that, in the above processing (6), the communication node 601 that received the handoff information commands the control node 611 to issue prescribed commands, but it is also possible for the radio terminal 621 to command the control node 611 in a manner similar to that of the remote control operation.

Also, in the above processing, the control node 611 and the communication nodes 601 and 602 are processed as separate nodes, but it is also possible for the communication node 601 or the communication node 602 to have the function of the control node 611.

Moreover, in the above processing, the decoder Sub Unit that has been created in the node from which the radio terminal is handed off (the communication node 602 in the above example) at the above processing (9) is deleted, but there is not absolutely necessary to delete this decoder Sub Unit. For example, it is possible for each communication node to maintain the decoder Sub Unit even while the radio terminal is not connected, and connect the decoder Sub Unit with the i_plug and the o_plug in the own node only when the radio terminal is actually connected.

Now the processing procedure shown in FIG. 37 will be described. Here, the differences from the processing procedure of FIG. 32 will be described.

At the communication node which is the moving origin of the radio terminal, the steps S16, S17, S18, S19, S20 and S21 of FIG. 32 are omitted, and instead, at the handoff processing of the step S116, the i_plug and the decoder Sub Unit are disconnected and the reception from (ch_X) at the i_plug is terminated (or the decoder Sub Unit may be deleted in some cases).

Also, at the communication node which is the moving target of the radio terminal, the difference from the third embodiment is that the setting for receiving from the Isochronous channel (ch_X) which has been used by the communication node that is the moving origin of the radio terminal is carried out at the step S125.

Note that the above example is directed to the case of executing the data transfer from the 1394 node on the IEEE 1394 bus to the radio terminal, but it is also possible to execute the data transfer from the radio terminal to another 1394 node on the IEEE 1394 bus by the similar processing.

Note also that the exemplary internal configuration of the communication node 602 in this fourth embodiment is the same as that shown in FIG. 33, but the processing to be executed by the Sub Unit configuration management processing unit 904 is different from that in the third embodiment, and it is the processing for executing the handoff using the Isochronous channel that has been originally used, without setting out a new Isochronous channel on the IEEE 1394 bus.

Referring now to FIG. 38 to FIG. 49, the fifth embodiment of a communication node and a communication terminal according to the present invention will be described in detail.

The second embodiment described above is directed not only to the case where the base station node and the radio terminal is in one-to-one correspondence but also to the case where a plurality of radio terminals are connected to a single base station. However, such a method using Sub Units is associated with the problems that a method for distinguishing the similar Sub Units that exist in the plurality of radio terminals (an identification method based on Sub Unit Type or ID) does not exist or a function for adding or deleting the Sub Unit or the Functional Component in the node is not defined in the AV/C protocol. In particular, the lack of the function for adding or deleting the Sub Unit or the like can be troublesome for the adaptation to the ad hoc network such as the radio network in some cases.

This fifth embodiment is directed to the case where these points are taken into consideration such that the merging of the IEEE 1394 bus and the radio network based on the FCP frame is realized similarly as in the second embodiment, but the AV/C protocol dedicated to the radio terminal, what might be called the radio AV/C, is defined as the upper layer protocol. Here, the ways of adaptation to this radio AV/C can include the case of the adaptation only on the radio network, and the case of the adaptation over the IEEE 1394 bus and the radio network as a whole. In the following, the case of the adaptation only on the radio network will be described first.

FIG. 38 shows a schematic configuration of a network in this fifth embodiment. In the configuration of FIG. 38, 1394 nodes 7101 and 7102 are present on an IEEE 1394 bus, and further a base station node 7110 is connected. Also, two radio terminals 7121 and 7122 are connected to the base station node 7110 through a radio network. FIG. 38 shows the case where the node IDs of the nodes are n=1 for the 1394 node 7101, n=3 for the 1394 node 7102, and n=2 for the base station node 7110, so that the 1394 node 7102 is the Root node on the IEEE 1394 bus.

Here, the 1394 node 7101 contains a Sub Unit A 71011 and a Sub Unit B 71012, the 1394 node 7102 contains a Sub Unit C 71021 and a Sub Unit D 71022, while the radio terminal 7121 contains a Sub Unit X1 71211 and a Sub Unit X2 71212 and the radio terminal 7122 contains a Sub Unit Y1 71221 and a Sub Unit Y2 71222.

Usually, in the AV/C (Audio/Visual Control) protocol or the like, the command is to be transmitted and received in units of such Sub Units inside the 1394 nodes, so that in the case of carrying out the image data transfer in a form where the IEEE 1394 bus and the radio network coexist as in FIG. 38, there is a problem as to how such a Sub Unit information should be presented to each node/terminal. In particular, there is a problem as to how to distinguish Sub Units that are existing on a plurality of radio terminals.

In this fifth embodiment, the transfer processing for the constituent element (Sub Unit) information is executed between the respective networks (the IEEE 1394 and the radio network) at the base station node 7110. More specifically, a group of Sub Units in each node on the IEEE 1394 bus are Sub Units according to the usual AV/C but a group of Sub Units in each radio terminal are Sub Units defined by the radio AV/C protocol for executing exchanges of AV commands with respect to the radio terminal or the base station node.

FIG. 39 shows how the radio terminal 7121 and the IEEE 1394 node 7101 recognize the entire network. First, a part (a) of FIG. 39 shows a configuration of the entire network as recognized by the radio terminal 7121. Namely, the radio terminal 7121 recognizes a group of Sub Units A, B, C and D according to the AV/C protocol that are existing in the nodes on the IEEE 1394 bus as a group of Sub Units A', B', C' and D' according to the radio AV/C protocol in the base station node 7110. Also, a part (b) of FIG. 39 shows a configuration of the entire network as recognized by a node on the IEEE 1394 bus such as the 1394 node 7101. Namely, the 1394 node 7101 recognizes a group of Sub Units X1, X2, Y1 and Y2 according to the radio AV/C protocol that are existing in the radio terminals 7121 and 7122 as a group of Sub Units X1', X2', Y1' and Y2' according to the AV/C protocol in the base station node 7110.

Figure 40:
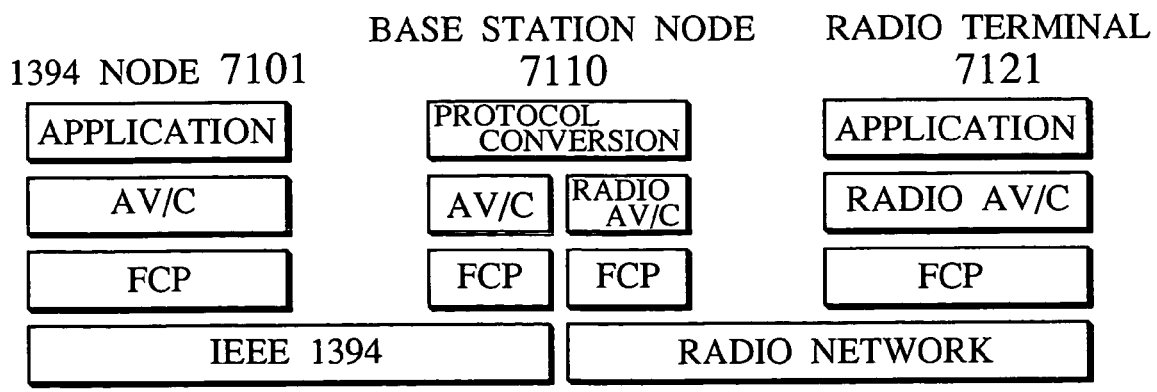
FIG. 40 is a diagram showing an exemplary protocol stack among a node on an IEEE 1394 bus, a base station node and a radio terminal according to the fifth embodiment of the present invention.

FIG. 40 shows an exemplary protocol stack for communications between the 1394 node 7101 and the radio terminal 7121 in this case. FIG. 40 shows the case where the AV/C protocol or the radio AV/C protocol is executed when some application is operated between the 1394 node 7101 and the radio terminal 7121. FIG. 40 shows the case where the application executed at the 1394 node 7101 executes the control command transfer processing with respect to the base station node 7110 by the AV/C protocol, and the radio terminal 7121 executes the control command transfer processing with respect to the base station node 7110 by the radio AV/C protocol. Then, the base station node 7110 executes the protocol conversion processing between the AV/C protocol and the radio AV/C protocol, so as to realize the control command transfer processing between the 1394 node 7101 and the radio terminal 7121.

Figure 41:
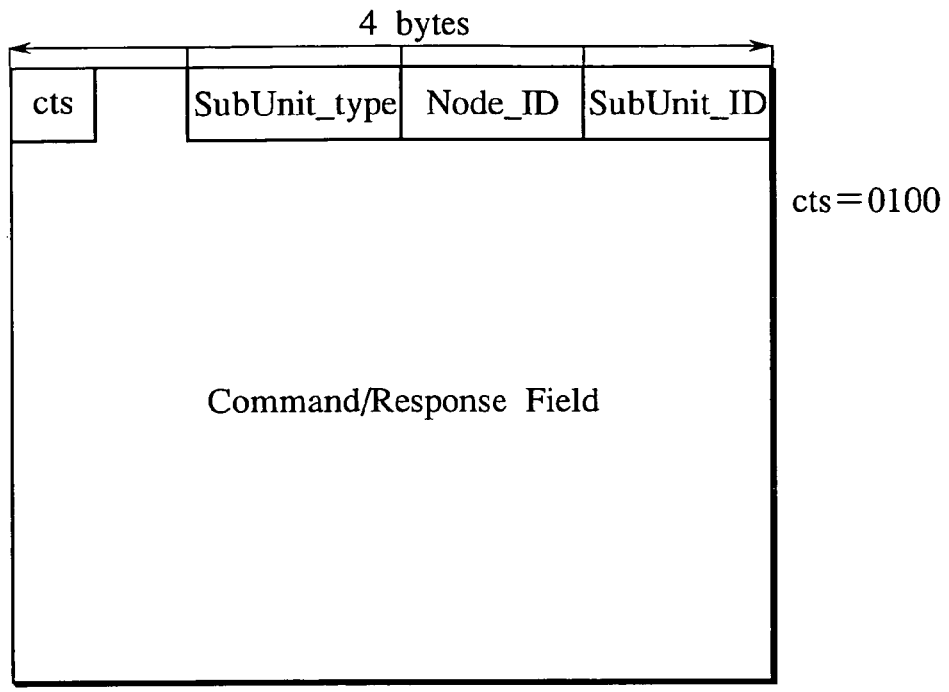
FIG. 41 is a diagram showing an exemplary configuration of an FCP frame according to the fifth embodiment of the present invention.

FIG. 41 shows an exemplary FCP frame used by the radio AV/C protocol that is executed between the radio terminal 7121 and the base station node 7110. FIG. 41 shows the case where cts=0x0100 is allocated as a value of the cts field for the sake of the radio AV/C protocol. Also, in the radio AV/C protocol, the Sub Unit_ID field is enlarged and a Node_ID field is newly provided therein as an identifier of the radio terminal in order to distinguish a plurality of Sub Units. By this, even if a plurality of radio terminals are connected to the base station node 7110 and the same Sub Units are existing in these radio terminals, the base station node 7110 can distinguish these Sub Units.

The radio AV/C protocol that is newly defined here is also provided with the following functions. One is the function for adding/deleting a Sub Unit in each 1394 node (radio terminal). This function is provided because the usual AV/C protocol does not have any function for adding/deleting a Sub Unit. As a method for realizing this addition/deletion of a Sub Unit, it is possible to newly define commands such as add_subunit command and delete_subunit command as the commands of the radio AV/C protocol, for example. In this way, it becomes possible to add a Sub Unit while the system is operating, and it becomes possible to add a Sub Unit without causing a new bus reset processing when the radio terminal is connected to the base station node, for example (the same is also true for the deletion of a Sub Unit).

In conjunction with such a function for adding/deleting a Sub Unit, there is also another added function which is the function for notifying the Sub Unit information of each 1394 node or radio terminal actively to the other 1394 nodes or radio terminals. By this, when the radio terminal is newly connected to the base station, for example, its information can be notified to the other 1394 nodes or radio terminals using this function, so that there is no need to cause the bus reset for the purpose of the notification of the Sub Unit information. As a method for actively notifying the Sub Unit information, it is possible to have a Sub Unit_Info command which can be sent as a Notify command, and make the setting such that the notification is received when there is a change in the Sub Unit information. It is also possible to realize this function by defining a new command such as adv_subunit_info as a command of the radio AV/C protocol.

FIG. 42 shows the processing sequence at a time of transferring the AV/C command from the 1394 node 7101 to the radio terminal 7121 by the Asynchronous packet in this case. FIG. 42 shows an exemplary case where the 1394 node 7101 plays a role of the controller in the AV/C protocol and this 1394 node 7101 transmits the AV/C command to the radio terminal 7121. Consequently, the series of processing described below will be preceded by the processing by which the 1394 node 7101 that is the controller obtains the Sub Unit information within each node on the IEEE 1394 bus and the processing by which the user commands the desired processing to the 1394 node 7101 that is the controller through a remote controller or the like. Also, in the following example, the base station 7110 transfers the AV/C command received from the 1394 node 7101 to the radio terminal 7121 after converting it into the radio AV/C command. This processing sequence proceeds as follows.

(1) The application for activating the AV/C protocol is executed at the 1394 node 7101 that is the controller, and the transmission of some AV/C command is commanded. The destination of the command is the Sub Unit X1 71211 in the radio terminal 7121.

(2) The 1394 node 7101 transmits the AV/C command in a form of the Write Request packet, to the base station node 7110. At this point, the destination node ID=2, the source node ID=1, and the destination Sub Unit_ID that is indicated by the FCP frame loaded in a packet is X1'. Also, a value "a" is allocated as the transaction ID (transaction label value) on the 1394 layer.

(3) When the base station node 7110 receives the Write Request packet properly, it returns an Ack_Complete message.

(4) The base station node 7110 identifies the destination Sub Unit_ID=X1' in the received FCP frame as the Sub Unit X1 71211 in the radio terminal 7121. Also, the received AV/C command is converted into the radio AV/C command.

(5) The base station node 7110 transfers the converted AV/C command to the radio terminal 7121 by loading it into a radio packet on the radio network. The radio AV/C command is assumed to be loaded into an FCP frame. At this point, a value "q" that is the transaction ID on the radio network and that is allocated at the base station node 7110 is also transferred together.

(6) The base station node 7110 stores the fact that a combination of the transaction ID on the 1394 layer=a and its source node ID=1 is corresponding to the transaction ID on the radio network=q.

(7) The radio terminal 7121 executes the processing based on the prescribed radio AV/C protocol according to the information in the received FCP frame.

(8) The radio terminal 7121 transfers the processing result of the radio AV/C command, to the base station node 7110 by using a packet on the radio network. At this point, the transaction ID=q that is written in the packet by which the executed command was received is also returned together, so that it becomes possible to identify the transaction ID on the 1394 layer which corresponds to this packet.

(9) The base station node 7110 converts the received radio AV/C response into the AV/C response. Also, it can ascertain that the received response corresponds to a combination of the transaction ID on the 1394 layer=a and the source node ID=1, from the transaction ID=q written in the received radio packet, so that it can figure out that it suffices to transfer this converted radio AV/C response to the 1394 node 7101.

(10) The base station node 7110 transmits an AV/C response packet (to be transferred by the Write Request packet) to the 1394 node 7101. At this point, the destination node ID=1 and the source node ID=2. Also, a value "a" is allocated as the transaction ID on the 1394 layer.

(11) When the 1394 node 7101 receives the AV/C response packet properly, it returns an Ack_Complete message to the base station node 7110.

The above example is directed to the case where a unique transaction ID on the radio network is allocated at the processings (5) and (6), but besides that, it is also possible to use a combination of the transaction ID on the 1394 layer and the source node ID directly as the transaction ID on the radio network.

Figure 43:
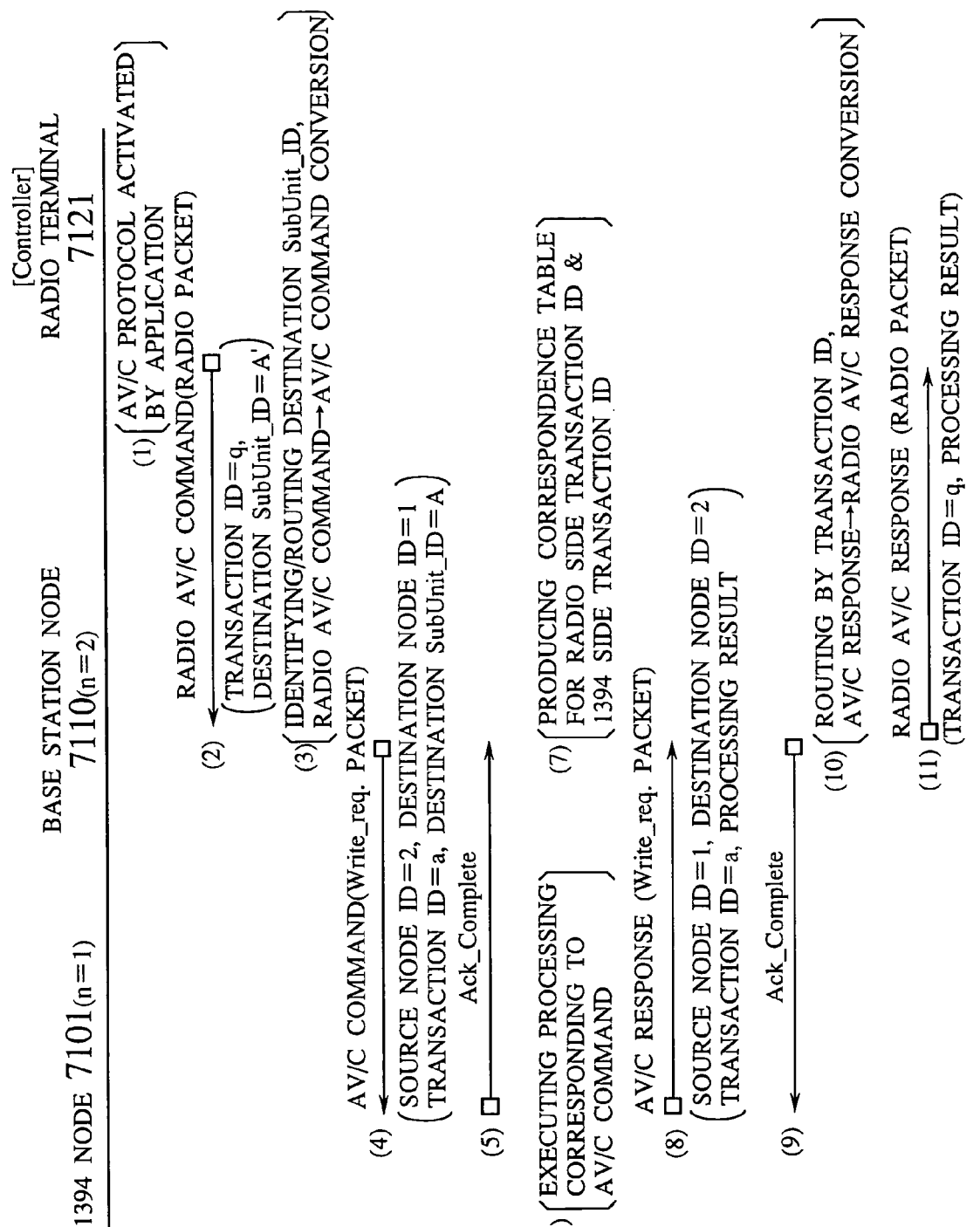
FIG. 43 is a sequence chart of another exemplary processing sequence for a packet transfer according to the fifth embodiment of the present invention.

FIG. 43 shows the processing sequence at a time of transferring the AV/C command from the radio terminal 7121 to the 1394 node 7101 by the Asynchronous packet in this case. FIG. 43 shows an exemplary case where the radio terminal 7121 plays a role of the controller in the AV/C protocol and this radio terminal 7121 transmits the AV/C command to the 1394 node 7101. Consequently, the series of processing described below will be preceded by the processing by which the radio terminal 7121 that is the controller obtains the Sub Unit information within each node on the IEEE 1394 bus and the processing by which the user commands the desired processing to the radio terminal 7121 that is the controller through a remote controller or the like. Also, in the following example, the base station 7110 transfers the radio AV/C command received from the radio terminal 7121 to the 1394 node 7101 after converting it into the AV/C command. This processing sequence proceeds as follows.

(1) The application for activating the radio AV/C protocol is executed at the radio terminal 7121 that is the controller, and the transmission of some radio AV/C command is commanded. The destination of the command is the Sub Unit A 71011 in the 1394 node 7101.

(2) The radio terminal 7121 transmits an FCP frame on which the radio AV/C command is loaded, to the base station node 7110 by loading it into a radio packet. At this point, the destination Sub Unit_ID is A', and the transaction ID on the radio network is "q".

(3) The base station node 7110 extracts the FCP frame from the received radio packet, and ascertains that the actual destination node is the 1394 node 7101 and the destination is the Sub Unit_ID=A of that 1394 node 7101, according to the destination Sub Unit_ID value=A' contained therein. Also, the received radio AV/C command is converted into the AV/C command.

(4) The base station node 7110 transfers the converted AV/C command to the 1394 node 7101 by loading it into a Write Request packet. At this point, the source node ID=2, the destination node ID=1, and the destination Sub Unit_ID is A. Also, the transaction ID on the 1394 layer=a is allocated at the base station node 7110.

(5) When the 1394 node 7101 properly receives the Write Request packet on which the AV/C command is loaded, it returns an Ack_Complete message to the base station node 7110.

(6) The 1394 node 7101 executes the processing based on the prescribed AV/C protocol according to the information in the received FCP frame.

(7) The base station node 7110 stores the fact that the transaction ID on the radio network=q corresponds to the transaction ID on the 1394 layer=a.

(8) The 1394 node 7101 transfers a response message of the AV/C command for which the processing has been finished, to the base station node 7110 by loading it into a Write Request packet. At this point, the source node ID=1, the destination node ID=2, and the transaction ID is "a".

(9) When the base station node 7110 properly receives the Write Request packet on which the AV/C response is loaded, it returns an Ack_Complete message to the 1394 node 7101.

(10) The base station node 7110 ascertains that the received Write Request packet corresponds to the transaction ID on the radio network=q, from the transaction ID value "a" written in that Write Request packet. Also, the received AV/C response is converted into the radio AV/C response.

(11) The base station node 7110 transfers the received FCP frame to the radio terminal 7121 that corresponds to the received transaction ID value, by loading it into a radio packet. At this point, the transaction ID value on the radio network is "q".

Figure 44:
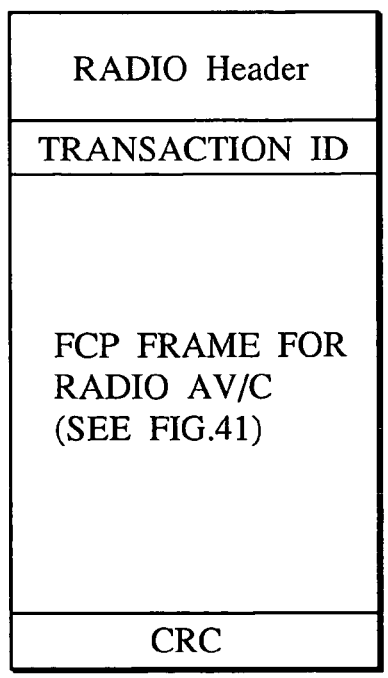
FIG. 44 is a diagram showing an exemplary format of a packet to be transferred on a radio network according to the fifth embodiment of the present invention.

FIG. 44 shows an exemplary packet format at a time of transferring the FCP frame on the radio network in the above example. The packet of FIG. 44 has a radio header for the sake of transfer on the radio network, and a field indicating the transaction ID for identifying the transaction (session) on the radio network. Then, the FCP frame corresponding to the radio AV/C protocol is loaded into the packet, and a checksum such as CRC is included at the end. Using such a packet format, the communications regarding the AV/C protocol or the radio AV/C protocol between the 1394 node and the radio terminal as shown in FIG. 41 and FIG. 42 can be realized.

In this way, it becomes possible to realize the transfer of real time data such as image data between the node on the IEEE 1394 bus and the radio terminal, similarly as in the second embodiment. In this case, the method for recognizing the Isochronous channel on the IEEE 1394 bus and the resource on the radio network as well as the concrete processing sequences can be realized by the same recognition method and processing sequences as described in the second embodiment in conjunction with FIG. 23, FIG. 24 and FIG. 25, so that their description will be omitted here.

Figure 45:
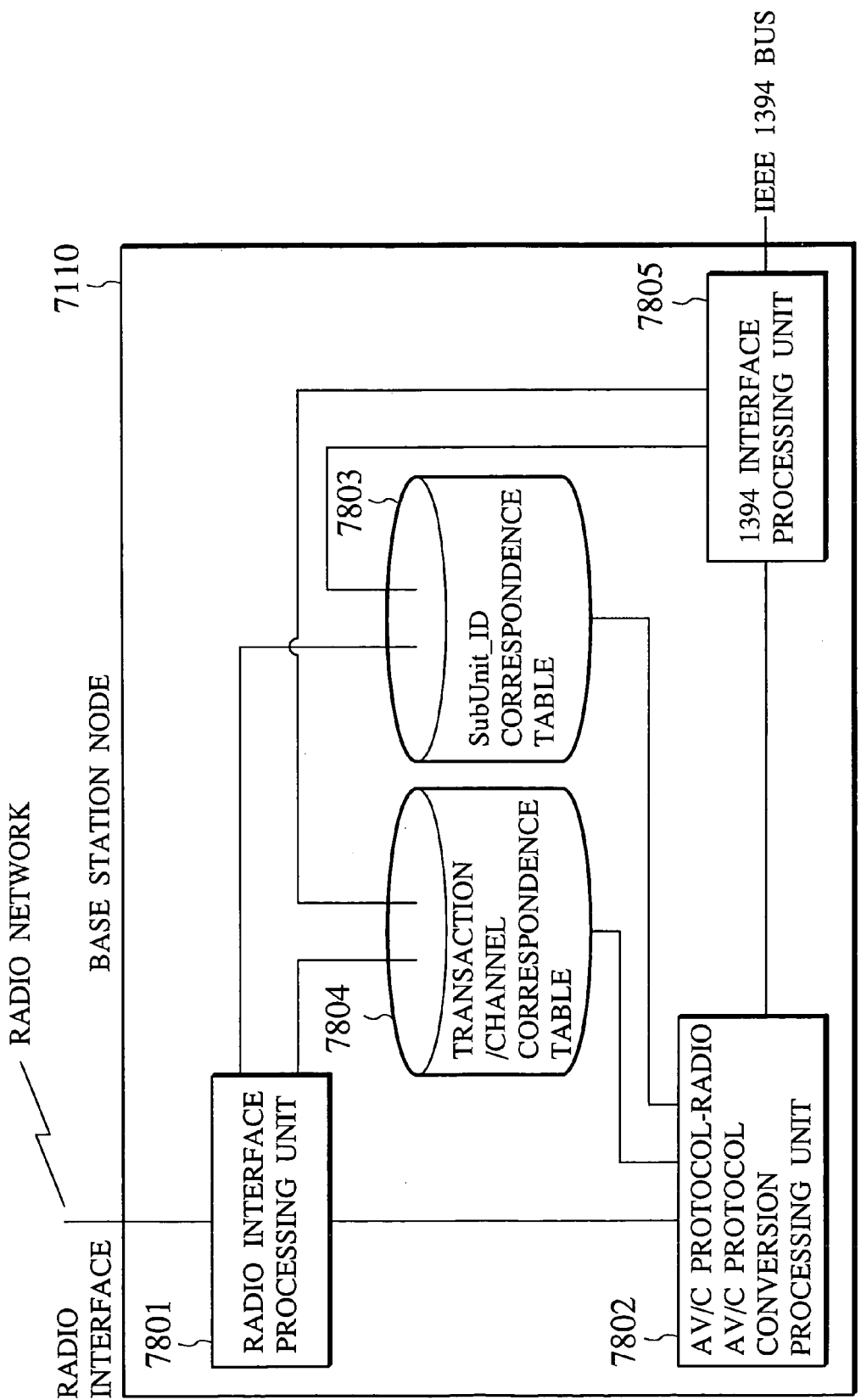
FIG. 45 is a block diagram showing an exemplary internal configuration of a base station node according to the fifth embodiment of the present invention.

FIG. 45 shows an exemplary internal configuration of the base station node 7110. In the base station node 7110, the processing for showing the Sub Unit information on the IEEE 1394 bus to the radio network side and the processing for showing the Sub Unit information on the radio network to the IEEE 1394 bus side are executed, and their correspondence is maintained. Also, at a time of carrying out the packet transfer between the IEEE 1394 bus and the radio network, the routing processing according to this Sub Unit information is executed. In addition, the base station node 7110 maintains the correspondence between the transaction ID attached on the IEEE 1394 bus and the transaction ID attached on the radio network, and executes the routing processing at a time of the packet transfer between the IEEE 1394 bus and the radio network according to that correspondence.

In order to provide these functions, the base station node 7110 contains a radio interface processing unit 7801 for providing the interface function with respect to the radio network, an AV/C protocol-radio AV/C protocol conversion processing unit 7802 for executing the conversion processing for an FCP frame between the IEEE 1394 bus and the radio network (more specifically the protocol conversion processing between an FCP frame for the AV/C protocol and an FCP frame for the radio AV/C protocol), and a 1394 interface processing unit 7805 for providing the interface function with respect to the IEEE 1394 bus.

The base station node 7110 also includes a Sub Unit_ID correspondence table 7803 for storing the correspondence between the Sub Unit information on the IEEE 1394 bus and the Sub Unit information on the radio network, and a transaction/channel correspondence table 7804 for storing the correspondence between the transaction ID attached on the IEEE 1394 bus and the transaction ID attached on the radio network as well as the correspondence between the Isochronous channel on the IEEE 1394 bus and the resource (channel) on the radio network, for the sake of the protocol conversion processing at the AV/C protocol-radio AV/C protocol conversion processing unit 7802.

Besides these functions, the base station node 7110 may also have a function for executing the application on the IEEE 1394 bus or the application on the radio network, but such a function is not directly related to the present invention so that it is omitted in FIG. 45.

Figure 46:
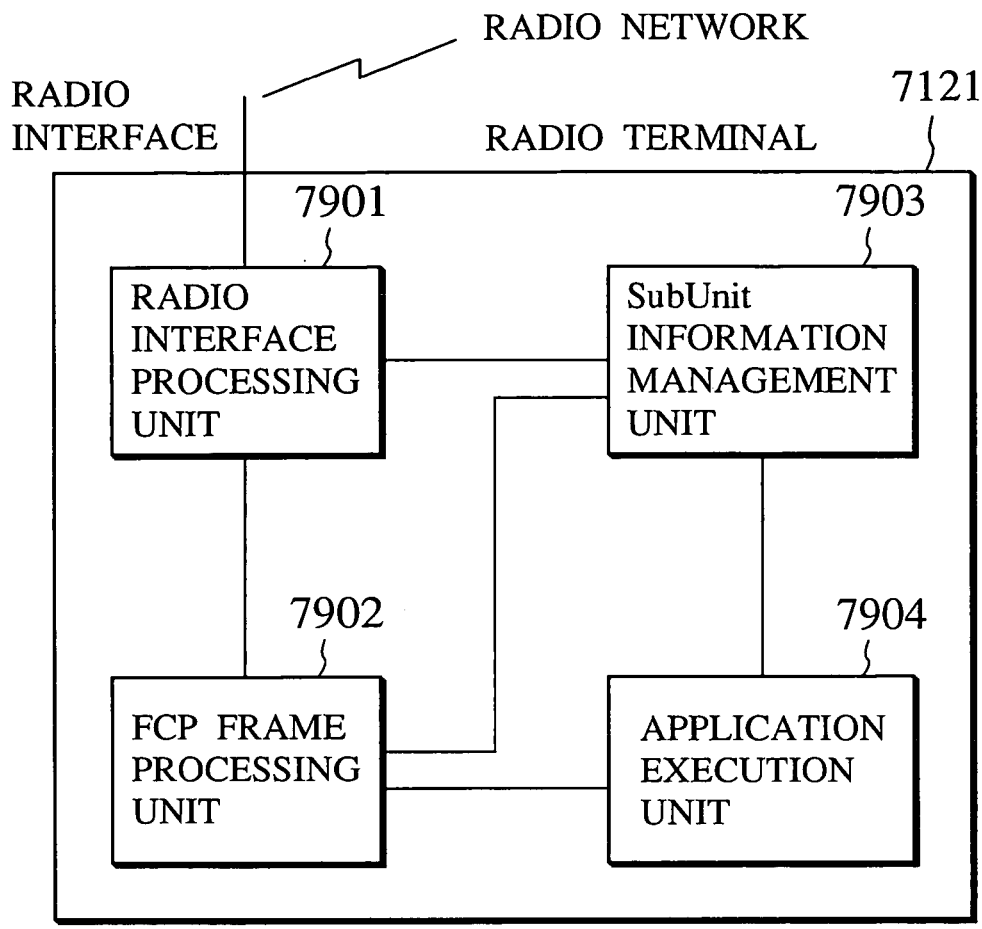
FIG. 46 is a block diagram showing an exemplary internal configuration of a radio terminal according to the fifth embodiment of the present invention.

FIG. 46 shows an exemplary internal configuration of the radio terminal 7121. The radio terminal 7121 carries out communications with the base station node 7110 by the radio AV/C protocol using the Sub Unit information on the radio network. Consequently, the radio terminal 7121 contains a radio interface processing unit 7901 for providing the interface function with respect to the radio network, an FCP frame processing unit 7902 for executing the processing for the FCP frame corresponding to the radio AV/C protocol that is to be loaded into a packet to be transferred on the radio network (such as attaching of the destination/source Sub Unit_ID, attaching of the desired command/request information, for example), a Sub Unit information management unit 7903 for managing the Sub Unit information on the radio network, and an application execution unit 7904 for actually executing the radio AV/C protocol or the like.

Next, the case of adaptation of the radio AV/C protocol over the IEEE 1394 bus and the radio network as a whole will be described.

FIG. 47 shows a schematic configuration of a network in this case, which is similar to the configuration of FIG. 38 but FIG. 47 shows the case where the 1394 node 8101 and the radio terminals 8121 and 8122 are adapted to the radio AV/C protocol while the 1394 node 8102 is not adapted to the radio AV/C protocol. Consequently, among the Sub Units in the 1394 nodes, there are only two Sub units that will be recognized by the radio AV/C protocol, that is, the Sub Unit A 81011 and the Sub unit B 81012 in the 1394 node 8101, and the Sub Unit C 81021 and the Sub Unit D 81022 in the 1394 node 8102 will not be recognized by the radio AV/C protocol.

Figure 48:
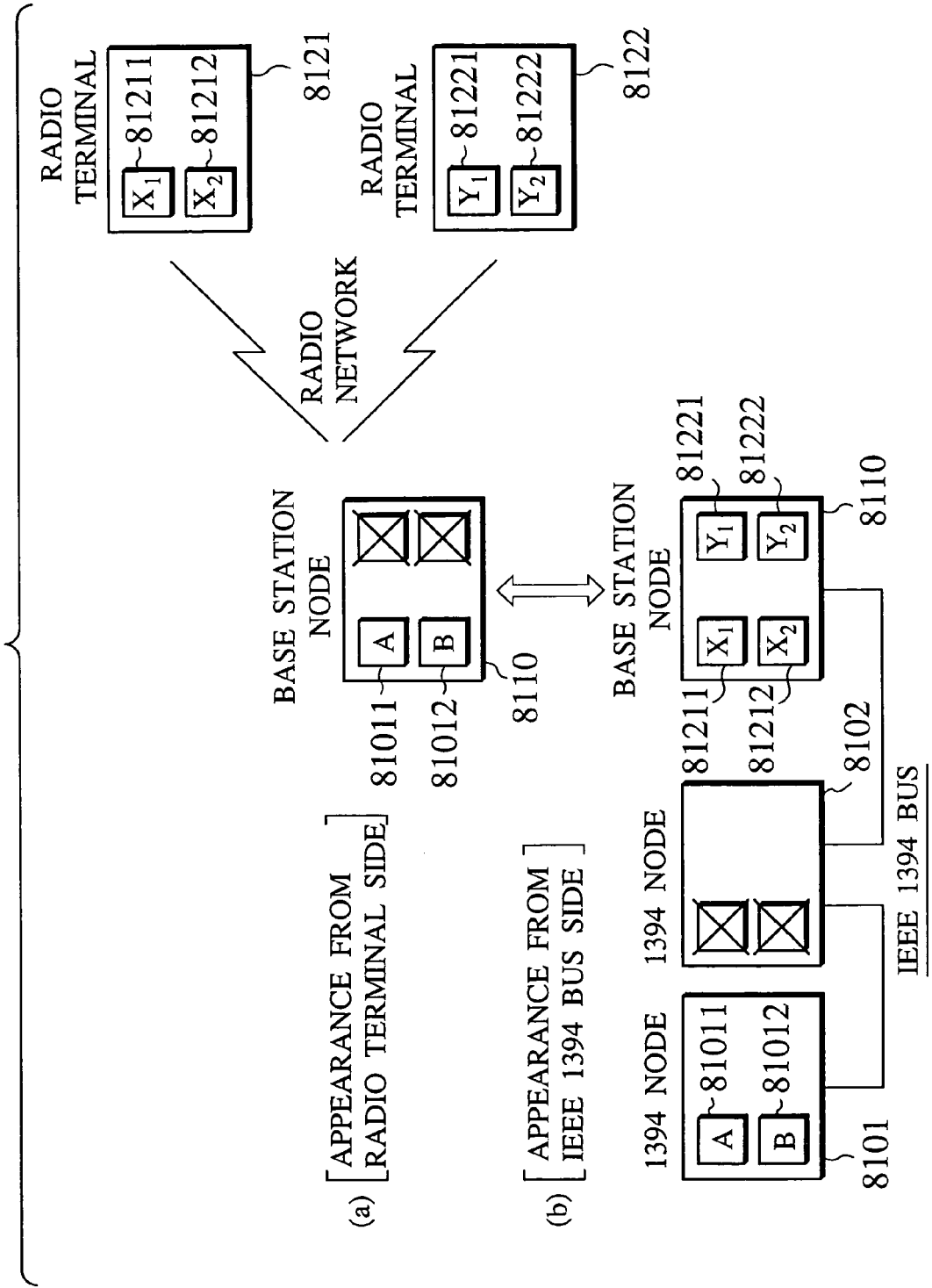
FIG. 48 is a diagram showing another exemplary state of recognition of node constituent elements according to the fifth embodiment of the present invention.

FIG. 48 shows how the radio terminal 8121 and the IEEE 1394 node 8101 recognize the entire network in this case. First, a part (a) of FIG. 48 shows a configuration of the entire network as recognized by the radio terminal 8121. Namely, the radio terminal 8121 recognizes only the Sub Units A 81011 and the Sub Unit B 81012 according to the radio AV/C protocol that are existing in the nodes on the IEEE 1394 bus. Also, a part (b) of FIG. 48 shows a configuration of the entire network as recognized by the 1394 node 8101. Namely, the 1394 node 8101 recognizes a group of Sub Units X1, X2, Y1 and Y2 according to the radio AV/C protocol that are existing in the radio terminals 8121 and 8122 as a group of Sub Units in the base station node 8110.

Figure 49:
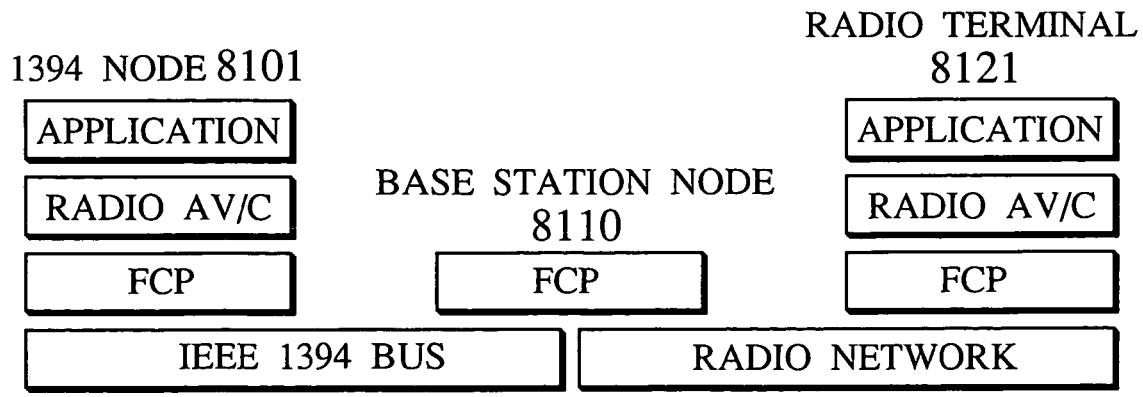
FIG. 49 is a diagram showing an exemplary protocol stack among a node on an IEEE 1394 bus, a base station node and a radio terminal according to the fifth embodiment of the present invention.

FIG. 49 shows an exemplary protocol stack for communications between the 1394 node 8101 and the radio terminal 8121 in this case. FIG. 49 shows the case where the radio AV/C protocol is executed when some application is operated between the 1394 node 8101 and the radio terminal 8121. In FIG. 49, the 1394 node 8101 and the radio terminal 8121 are carrying out the transfer of the desired radio AV/C command or response according to the radio AV/C protocol. In this case, the base station 8110 is executing the FCP frame transfer processing between the 1394 node 8101 and the radio terminal 8121, and the routing processing using the value of the Sub Unit_ID described in the FCP frame and the value of the transaction ID described in the radio packet or the IEEE 1394 packet.

In this case, the FCP frame used by the radio AV/C protocol that is executed between the radio terminal 8121 and the 1394 node 8101 can have the frame structure as shown in FIG. 41.

Also, the functions to be provided in the radio AV/C protocol to be newly defined here include the following, similarly as in the previous case. One is the function for adding/deleting a Sub Unit in each 1394 node (radio terminal), and another is the function for notifying the Sub Unit information of each 1394 node or radio terminal actively to the other 1394 nodes or radio terminals. As a method for realizing these functions, it is possible to define new commands such as add_subunit command and adv_subunit command as the commands on the radio AV/C protocol. Using these functions, it becomes possible to add the functions unique to the radio network to the AV/C protocol.

Also, the radio AV/C protocol is to be executed over the IEEE 1394 bus and the radio network, so that the packet transfer between the 1394 node 8101 and the radio terminal 8121 in this case can be realized similarly as the packet transfer scheme of the second embodiment (FIG. 20 and FIG. 21) (except that the AV/C command and AV/C response are to be replaced by the radio AV/C command and the radio AV/C response). Note however that there is a difference in that the information loaded into the FCP frame at a time of transferring each packet is the command/response according to the AV/C protocol in the second embodiment, whereas it is the command/response according to the radio AV/C protocol here.

In addition, the Isochronous data transfer between the 1394 node 8101 and the radio terminal 8121 can also be realized similarly as the data transfer scheme of the second embodiment (FIG. 24 and FIG. 25). Again, there is a difference in that the information loaded into the FCP frame at a time of transferring each packet is the command/response according to the AV/C protocol in the second embodiment, whereas it is the command/response according to the radio AV/C protocol here.

Referring now to FIG. 50 to FIG. 58, the sixth embodiment of a communication node and a communication terminal according to the present invention will be described in detail.

The fifth embodiment described above is directed to the case where the transfer processing for the AV/C command/response between the IEEE 1394 bus and the radio terminal is executed by defining a new protocol called radio AV/C. In this case, the radio AV/C protocol is identified by the value of the cts field of the FCP frame, and it is defined as a totally separate protocol from the so called AV/C protocol. This requires that the protocol for the AV control that is to be executed at the radio terminal is always the radio AV/C protocol, and this in turn makes it difficult to make a smooth transition from the realization scheme of the fifth embodiment in some cases. In view of these facts, this sixth embodiment is directed the case where the AV/C protocol is executed at the radio terminal as well but the radio terminal addition/deletion function that is unique to the radio is also realized. In this sixth embodiment, the radio AV/C protocol execution function is added only on the 1394 node which has the need to communicate with the radio terminal, and the above described function is realized by executing its transfer processing at the base station node.

In this sixth embodiment, a Wireless Sub Unit for indicating the radio terminal is defined as a Sub Unit_type used in identifying the type of the Sub Unit in the AV/C protocol. Then, as the commands for this Wireless Sub Unit, new commands will be defined similarly as the commands for the Tuner Sub Unit and the VCR Sub Unit. More specifically, at a time of introducing the radio terminal to the IEEE 1394 bus side at the base station node, each radio terminal itself is introduced as a single Sub Unit (Wireless Sub Unit), and the Sub Unit that exists in this radio terminal is introduced a Sub Unit of that Wireless Sub Unit. Using such a method of introduction, the radio terminal connected to the base station can be identified by the Sub Unit_ID at a time of usual Sub Unit identification. Then, each Sub Unit that is existing on each radio terminal will be identified as a Sub Unit in the Wireless Sub Unit so that the same type of Sub Units that are existing within a plurality of radio terminals can be properly distinguished.

Figure 50:
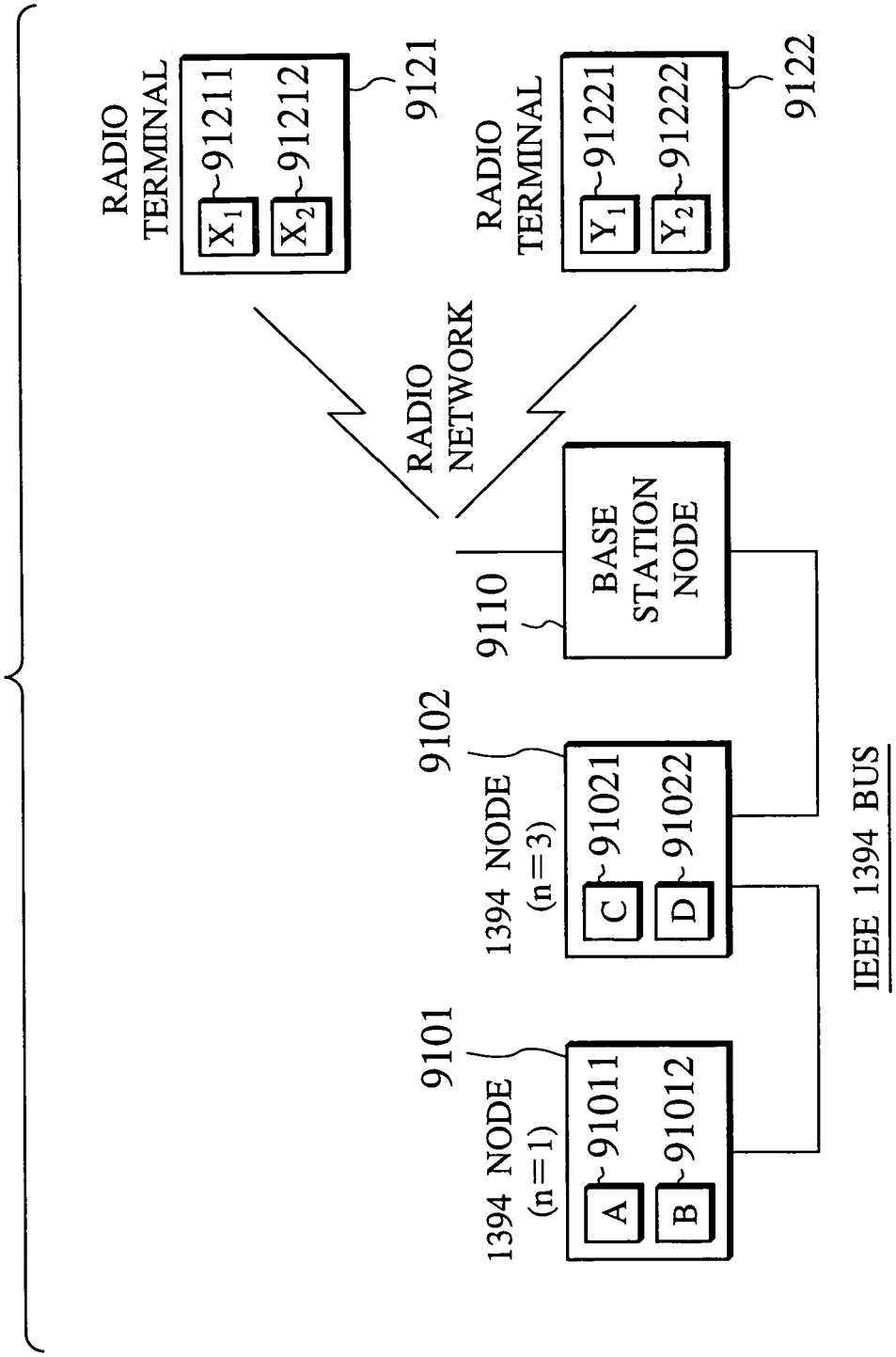
FIG. 50 is a schematic diagram showing an exemplary network configuration using communication nodes according to the sixth embodiment of the present invention.

FIG. 50 shows a schematic configuration of a network in this sixth embodiment, which is the same as that of FIG. 38 of the fifth embodiment so that its description will be omitted here.

Figure 51:
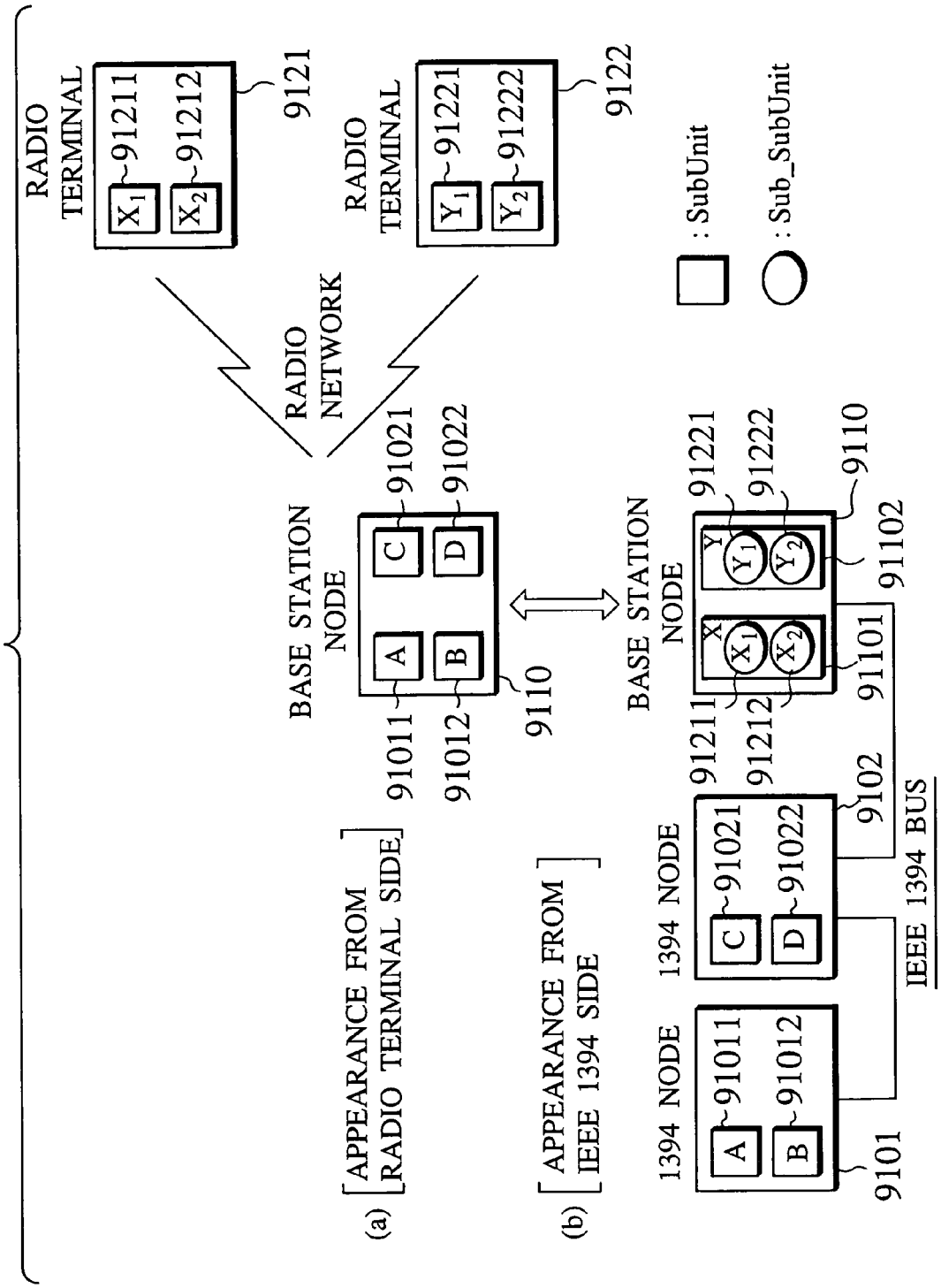
FIG. 51 is a diagram showing an exemplary state of recognition of node constituent elements according to the sixth embodiment of the present invention.

FIG. 51 shows how the radio terminal 9121 and the IEEE 1394 node 9101 recognize the entire network. First, a part (a) of FIG. 51 shows a configuration of the entire network as recognized by the radio terminal 9121. Namely, in a part (a) of FIG. 51, Sub Unit X1 91211, Sub Unit X2 91212, Sub Unit Y1 91221 and Sub Unit Y2 91222 on the radio terminals 9121 and 9122 as well as Sub Unit A 91011, Sub Unit B 91012, Sub Unit C 91021 and Sub Unit D 91022 in the nodes 9101 and 9102 on the IEEE 1394 bus are recognized as the Sub Units on the usual AV/C protocol. This implies that the radio terminal 9121 recognizes the same configuration as in the case of the second embodiment so that, in the case where the radio terminal 9121 executes the function as the controller in the AV/C protocol, for example, it implies that the AV/C command transfer processing and the resource reservation processing can be executed similarly as in the case of the second embodiment.

Also, a part (b) of FIG. 51 shows a configuration of the entire network as recognized by the 1394 node 9101.

Namely, in a part (b) of FIG. 51, the radio terminals 9121 and 9122 are recognized as the Wireless Sub Units 91101 and 91102 in the base station node 9110 respectively, and the Sub Units in each radio terminal are recognized as Sub_Sub Units of the base station nodes 9110. In addition, the Sub Units in the 1394 nodes 9101 and 9102 are recognized as the Sub Units of the usual AV/C. Here, the base station node 9110 executes the protocol transfer function between networks according to the different recognitions as described above.

Figure 52:
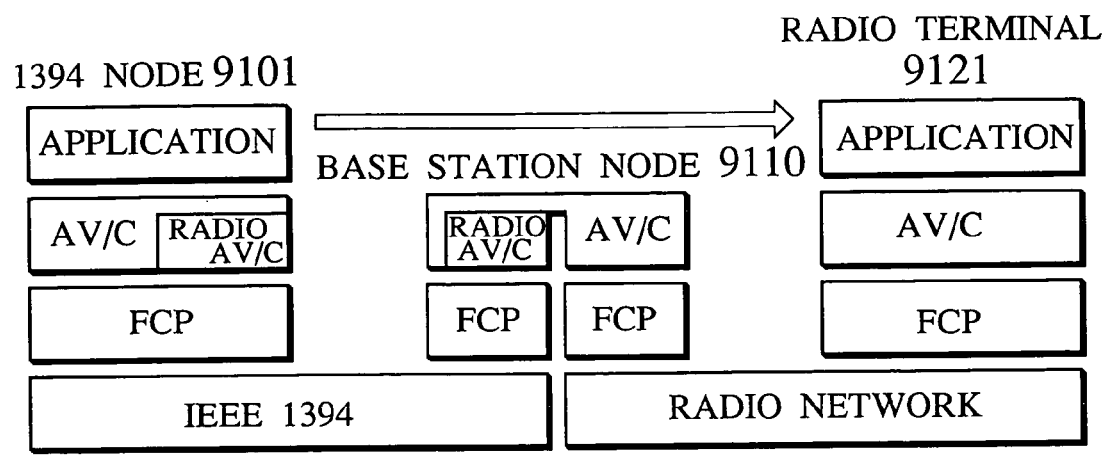
FIG. 52 is a diagram showing an exemplary protocol stack among a node on an IEEE 1394 bus, a base station node and a radio terminal according to the sixth embodiment of the present invention.
Figure 53:
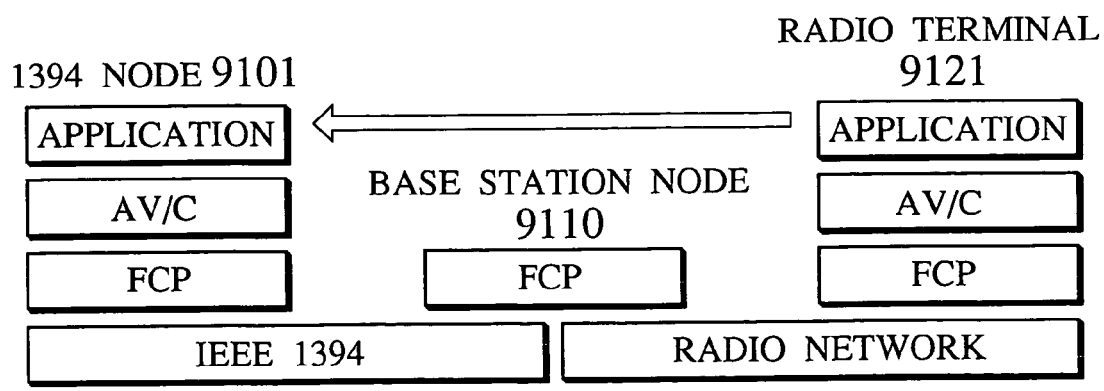
FIG. 53 is a diagram showing another exemplary protocol stack among a node on an IEEE 1394 bus, a base station node and a radio terminal according to the sixth embodiment of the present invention.

FIG. 52 and FIG. 53 show exemplary protocol stacks for communications between the 1394 node 9101 and the radio terminal 9121 in this case. FIG. 52 is the case where the AV/C protocol is executed from the 1394 node 9101 with respect to the radio terminal 9121, and FIG. 53 is the case where the AV/C protocol is executed from the radio terminal 9121 with respect to the 1394 node.

In FIG. 52, the usual AV/C protocol is executed as it is in the case where the 1394 node 9101 executes the AV/C protocol with respect to the other 1394 node, but it is executed by going through the radio AV/C protocol once in the case of executing the AV/C protocol with respect to the base station node 9110. Then, the usual AV/C protocol is executed with respect to the radio terminal 9121 after the protocol conversion from the radio AV/C protocol to the AV/C protocol at the base station node 9110.

In FIG. 53, the radio terminal 9121 can execute the AV/C protocol with respect to the 1394 node 9101 by the usual AV/C protocol. This is due to the fact that the radio terminal 9121 recognize the Sub Unit group in the 1394 node at the same level as the Sub Units in the own terminal as shown in a part (a) of FIG. 39 so that the AV/C protocol can be executed similarly as in the case of the second embodiment. Consequently, the AV/C protocol processing sequence in this case can be executed similarly as in the second embodiment (FIG. 21, FIG. 25).

Figure 54:
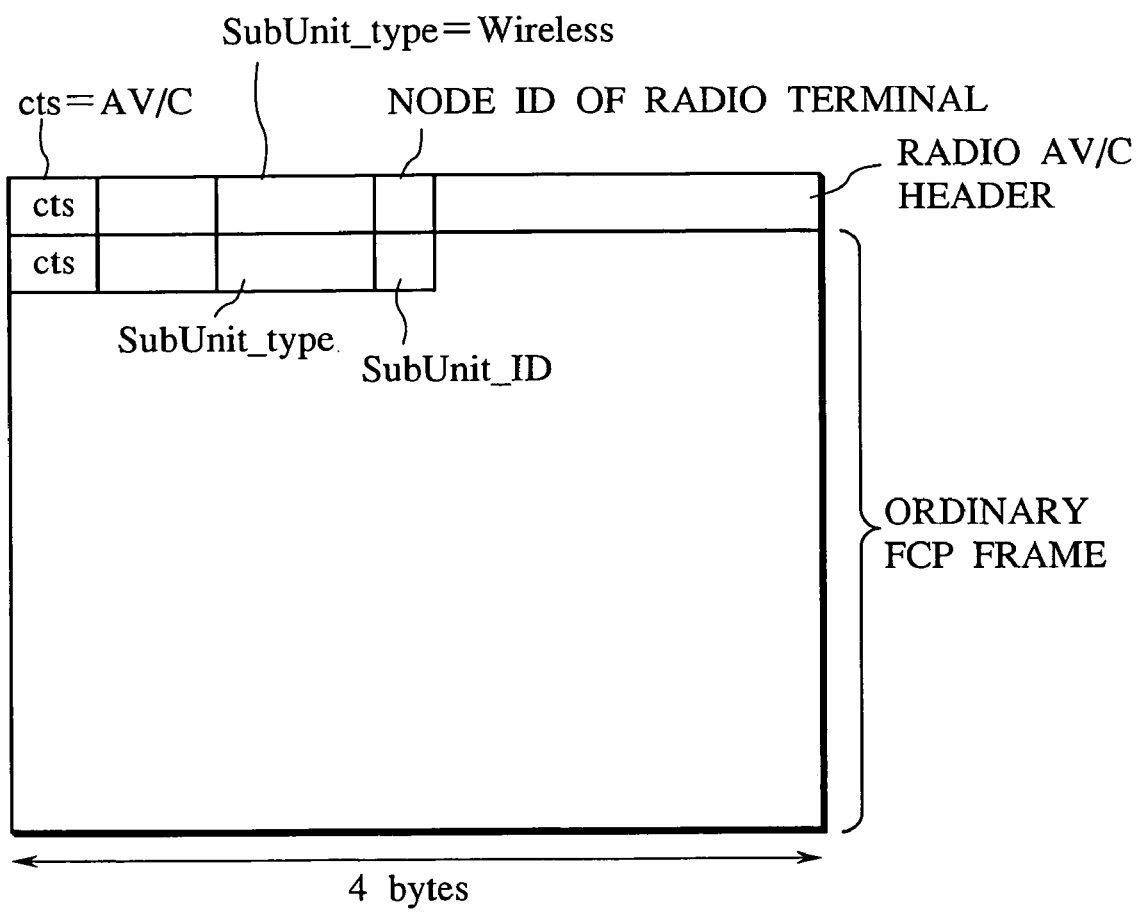
FIG. 54 is a diagram showing an exemplary configuration of an FCP frame according to the sixth embodiment of the present invention.

FIG. 54 shows an exemplary FCP frame used by the radio AV/C protocol that is executed in this sixth embodiment. In the configuration of FIG. 54, a new frame structure is defined when the Sub Unit_type of the destination Sub Unit in the FCP frame of the usual AV/C protocol is Wireless, instead of setting up the cts field value for the radio AV/C protocol as in the fifth embodiment. In FIG. 54, when the Sub Unit_type is Wireless, its Sub Unit_ID will be used as the identifier of the radio terminal. Then, the top four bytes of the usual FCP frame is used as a "radio AV/C header" and the usual FCP frame is attached after that. Consequently, in the case of sending the AV/C command by the radio AV/C protocol, the AV/C command (FCP frame) for the Sub Unit according to the usual AV/C protocol (the Sub_Sub Unit in the radio AV/C protocol) is produced, and the destination information in the radio AV/C protocol (specifying the destination radio terminal) is attached to the tope of the produced command, and then it is transmitted.

Figure 55:
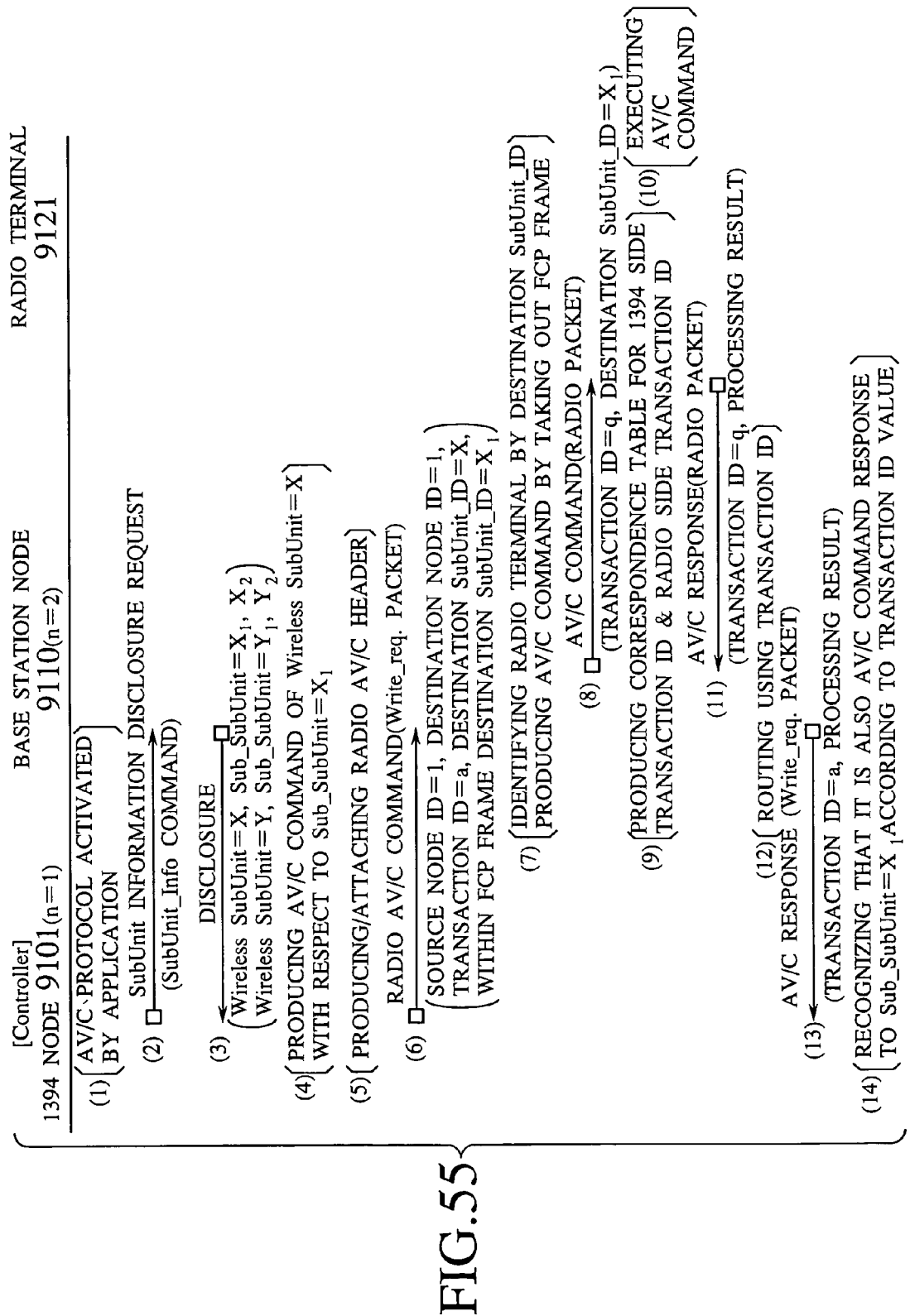
FIG. 55 is a sequence chart of an exemplary processing sequence for a packet transfer according to the sixth embodiment of the present invention.

FIG. 55 shows the basic AV/C protocol processing sequence between the 1394 node 9101 and the radio terminal 9121 in the case of using such a frame structure. FIG. 55 shows an exemplary case where the 1394 node 9101 plays the role of the controller in the AV/C protocol, and the 1394 node 9101 transmits the AV/C command with respect to the radio terminal 9121. This processing procedure proceeds as follows.

(1) The application on the 1394 node 9101 activates the AV/C protocol.

(2) The disclosure of the Sub Unit information in the base station 9110 is requested. The command transmitted at this point is something like the Unit_Info/Sub Unit_Info command defined in the AV/C protocol, which is transferred by the usual AV/C protocol.

(3) The base station node 9110 discloses the Wireless Sub Unit X 91101, its Sub_Sub Units X1 91211 and X2 91212, the Wireless Sub Unit Y 91102, and its Sub_Sub Units Y1 91221 and Y2 91222 as the Sub Unit information in the own node.

(4) The 1394 node 9101 selects the Sub_Sub Unit X1 91211 as the transfer target of the AV/C command, and produces the AV/C command with respect to it.

(5) As the destination is the Wireless Sub Unit, the radio AV/C header is produced/attached. The radio AV/C header contains Sub Unit_type=Wireless and Sub Unit_ID=X.

(6) The 1394 node 9101 transfers the produced radio AV/C command to the base station node 9110. At this point, the source node ID=1, the destination node ID=2, and it is transferred by attaching the transaction ID on the 1394 layer=a. Also, the destination Sub Unit_ID=X in the radio AV/C header and the destination Sub Unit_ID=X1 in the FCP frame.

(7) The base station node 9110 identifies the transfer target radio terminal 9121 from the value of the destination Sub Unit_ID in the received packet. Also, the AV/C command is extracted by removing the radio AV/C header from the received radio AV/C command.

(8) The base station node 9110 transfers the radio packet into which the extracted AV/C command is loaded, to the radio terminal 9121. At this point, the transaction ID on the radio network=q is attached, and the destination Sub Unit_ID=X1 is set.

(9) The base station node 9110 stores a combination of the transaction ID on the IEEE 1394 bus and the source node ID=1, and the transaction ID on the radio network.

(10) The radio terminal 9121 executes the processing corresponding to the received AV/C command.

(11) The radio terminal 9121 transfers the processing result of the executes AV/C command to the base station node 9110 as the AV/C response. At this point, it is transferred by attaching the same ID as the transaction ID attached by the above processing (9).

(12) The base station node 9110 identifies the transfer target 1394 node of the received AV/C response from the value of the transaction ID of the received packet.

(13) The base station node 9110 transfers the received AV/C response to the 1394 node 9101. At this point, it is transferred by attaching the transaction ID on the 1394 layer=a.

(14) The 1394 node 9101 recognizes that the received AV/C response corresponds to the AV/C command transmitted by the above processing (6), according to the value of the transaction ID.

In the series of processing described above, the transfer of Ack_Complete message which is executed at each transaction on the IEEE 1394 bus is omitted. By such a processing, the transfer of the AV/C command to the radio terminal 9121 becomes possible.

The above example is directed to the case where a unique transaction ID on the radio network is allocated at the processing (9), but besides that, it is also possible to use a combination of the transaction ID on the 1394 layer and the source node ID directly as the transaction ID on the radio network. Also, the above described processing sequence is directed to the case where the 1394 node 9101 is operating as the controller, but there is also a contrary case where the radio terminal 9121 is operating as the controller. Such a case can be realized by the same processing sequence as in the second embodiment (FIG. 21), as indicated in FIG. 51 and FIG. 52/53.

Figure 56:
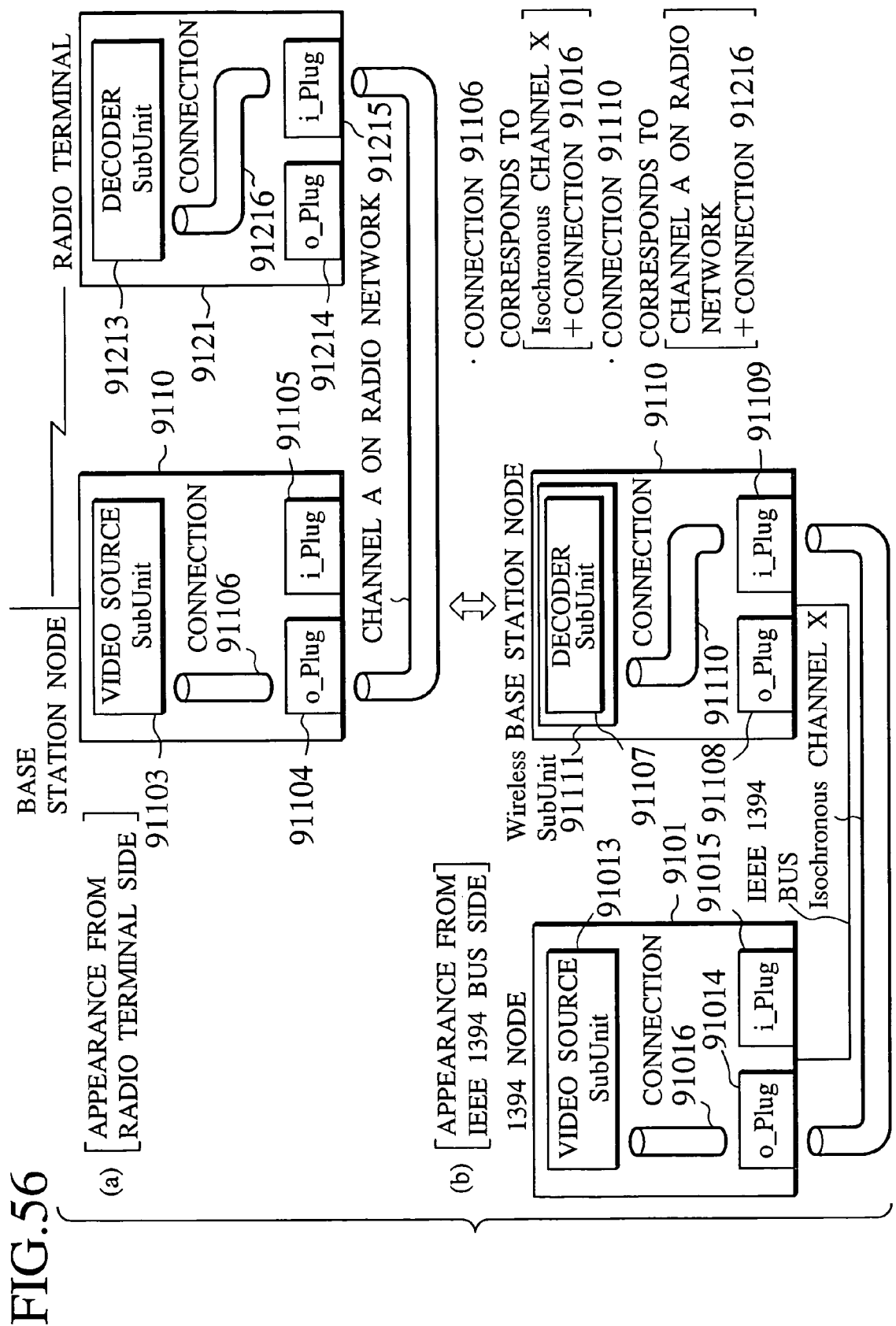
FIG. 56 is a diagram showing an exemplary state of resource acquisition in a case of transferring image data between a node on an IEEE 1394 bus and a terminal on a radio network according to the sixth embodiment of the present invention.

Next, FIG. 56 shows an exemplary case of actually executing the transfer of the real time data such as image data between a node existing on the IEEE 1394 bus and the radio terminal in this sixth embodiment. A part (a) of FIG. 56 shows a configuration at a time of the image data transfer as recognized by the radio terminal 9121, and a part (b) of FIG. 56 shows a configuration at a time of the image data transfer as recognized by the 1394 node 9101. In this case, the transfer processing (the connection processing for an Isochronous channel and a radio channel) between them is executed by the base station node 9110.

The configuration shown in a part (a) of FIG. 56 as recognized by the radio terminal 9121 is actually a network on which the base station node 9110 and the radio terminals 9121 and 9122 are existing, but the radio terminal 9122 is omitted here. The radio terminal 9121 contains a decoder Sub Unit 91213 for decoding and displaying the received image data, and plugs (o_plug 91214, i_plug 91215) for executing the transmission and reception (input and output) processing of the image data with respect to a channel on the radio network. Then, the decoder Sub Unit 91213 and the i_plug 91215 is connected by a connection 91216.

Also, the base station node 9110 appears to contain a video source Sub Unit 91103 for storing the video data which is actually existing in the 1394 node 9101, and contains plugs (o_plug 91104, i_plug 91105) for executing the transmission and reception (input and output) processing of the image data with respect to a channel on the radio network. Then, the video source Sub Unit 91103 and the o_plug 91104 is connected by a connection 91106. In addition, the o_plug 91104 of the base station node 9110 and the i_plug 91215 of the radio terminal 9121 is connected by a channel A on the radio network.

The configuration shown in a part (b) of FIG. 56 as recognized by the 1394 node 9101 is actually a network on which the base station node 9110 and the 1394 nodes 9101 and 9102 are existing, but the 1394 node 9102 is omitted here. The 1394 node 9101 contains a video source Sub Unit 91013 for storing the image data, and plugs (o_plug 91014, i_plug 91015) for executing the transmission and reception (input and output) processing of the image data with respect to an Isochronous channel on the IEEE 1394 bus. Then, the video source Sub Unit 91013 and the o_plug 91014 is connected by a connection 91016.

Also, the base station node 9110 appears to contain a Wireless Sub Unit 91111 corresponding to the radio terminal 9121 and a decoder Sub Unit 91107 for decoding and displaying the received image data which is actually existing in the radio terminal 9121, and contains plugs (o_plug 91108, i_plug 91109) for executing the transmission and reception (input and output) processing of the image data with respect to an Isochronous channel on the IEEE 1394 bus. Then, the decoder Sub Unit 91107 and the i_plug 91109 is connected by a connection 91110. In addition, the o_plug 91014 of the 1394 node 9101 and the i_plug 91109 of the base station node 9110 is connected by an Isochronous channel X on the IEEE 1394 bus.

In such a configuration, the base station node 9110 stores the fact that the connection 91110 in the own node in the configuration as recognized by the 1394 node 9101 is actually corresponding to a combination of the channel A on the radio network and the connection 91216 in the radio terminal 9121, and the fact that the connection 91106 in the own node in the configuration as recognized by the radio terminal 9121 is actually corresponding to a combination of the Isochronous channel X and the connection 91016 in the 1394 node 9101. Then, the transfer processing for the actually transferred image data is executed according to these combinations.

Figure 57:
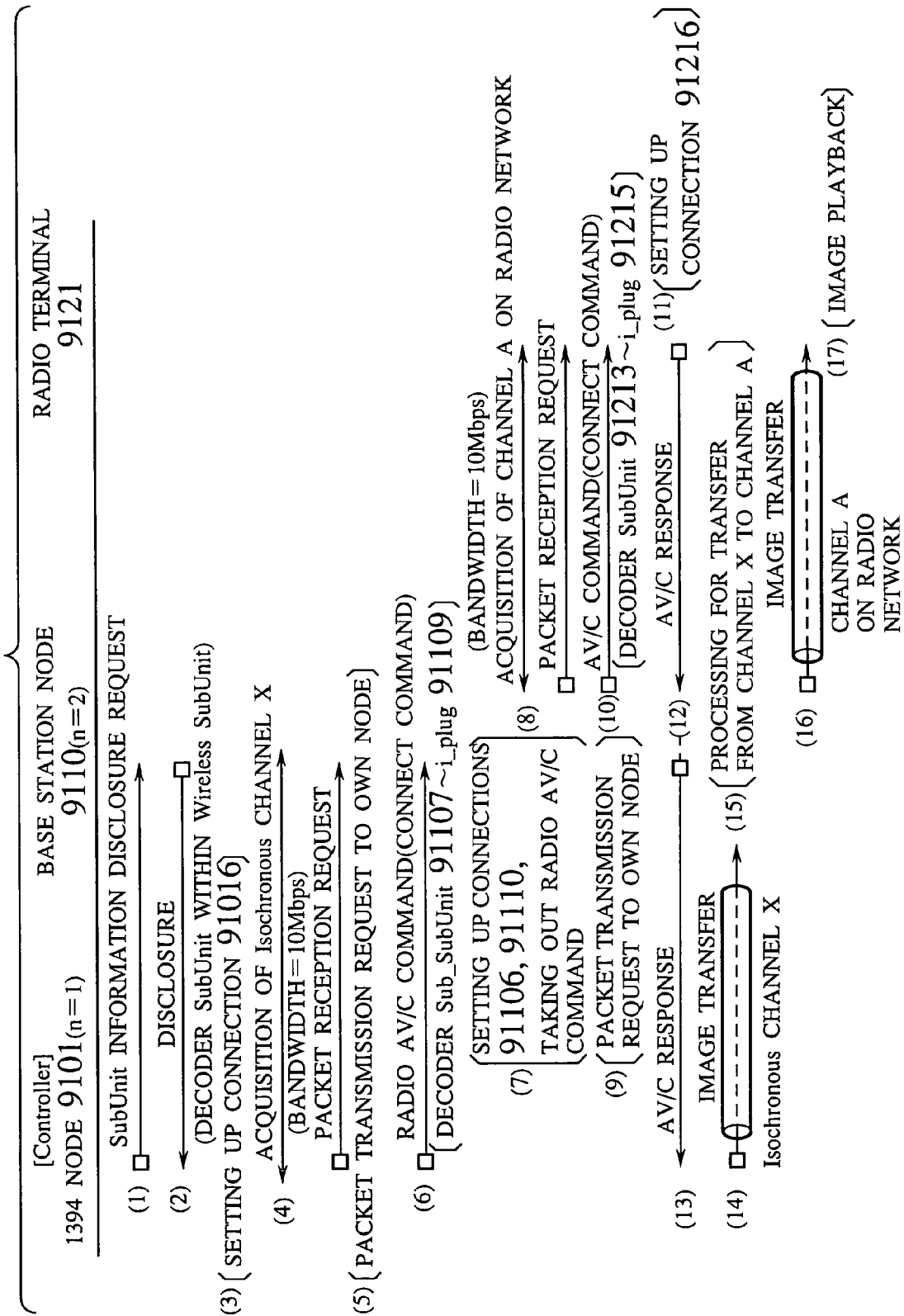
FIG. 57 is a sequence chart of an exemplary resource acquisition procedure on an IEEE 1394 bus and a radio network according to the sixth embodiment of the present invention.

FIG. 57 shows an exemplary processing sequence to be executed in the case of actually transferring the image data by constructing such a network configuration. FIG. 57 shows the case where the 1394 node 9101 is operating as the control node in the AV/C protocol. Also, FIG. 57 shows the case where the IEC 61883 protocol is executable even on the radio network. This processing sequence proceeds as follows.

(1) The 1394 node 9101 requests the disclosure of the Sub Unit information to the base station node 9110.

(2) The base station node 9110 discloses the Sub Unit information in the own node to the 1394 node 9101, where the radio terminal 9121 is introduced as the Wireless Sub Unit and the Sub Units in the radio terminal 9121 are introduced as the Sub_Sub units of the wireless Sub Unit.

(3) The 1394 node 9101 sets up the connection 91016 in the own node.

(4) The 1394 node 9101 or the base station node 9110 acquires the Isochronous channel X on the IEEE 1394 bus.

Here, the bandwidth is set to be 10 Mbps.

(5) The 1394 node 9101 requests to the base station node 9110 that packets from the Isochronous channel X are to be received by the i_plug 91109. The 1394 node 9101 also requests to the own node that packets are to be transmitted to the Isochronous channel X by the o_plug 91014 (IEC 61883).

(6) The 1394 node 9101 transfers the radio AV/C command (a connect command, for example) to the base station node 9110 so as to command the connection between the decoder Sub Unit 91107 and the i_plug 91109 in the base station node 9110.

(7) The base station node 9110 sets up the connections 91106 and 91110 in the own node, and extracts the AV/C command frame from the received packet.

(8) The base station node 9110 acquires the channel A on the radio network. At this point, the requested bandwidth is set to be the value notified by the above processing (5), which is equal to 10 Mbps.

(9) The base station node 9110 requests to the radio terminal 9121 that packets from the channel A are to be received by the i_plug 91215. The base station node 9110 also requests to the own node that packets are to be transmitted to the channel A by the o_plug 91104 (IEC 61883).

(10) The base station node 9110 transfers the AV/C command (a connect command, for example) to the radio terminal 9121, so as to command the connection between the decoder Sub Unit 91213 and the i_plug 91215 in the radio terminal 9121.

(11) The radio terminal 9121 sets up the connection 91216 in the own node.

(12) The radio terminal 9121 transfers the processing result of the received command to the base station node 9110 as the AV/C response.

(13) The base station node 9110 transfers the received AV/C response to the 1394 node 9101 by carrying out the routing processing using its transaction ID value, similarly as in the case of FIG. 55.

(14) The 1394 node 9101 transmits the image data in the video source Sub Unit 91013 to the Isochronous channel X through the o_plug 91014.

(15) The base station node 9110 converts the image data received from the Isochronous channel X into the image data to be transferred on the radio network.

(16) The base station node 9110 transfers the converted image data to the channel A on the radio network.

(17) The radio terminal 9121 playbacks the received video data.

By the series of processing as described above, it is possible to realize the image data transfer processing between the 1394 node and the radio terminal according to this sixth embodiment. Here, the image data conversion is carried out at the above processing (15), but such a conversion processing is not absolutely necessary and may be replaced by a simple packet transfer processing. It is also possible to consider the case where the radio terminal 9121 operates as the control node of the AV/C protocol, and such a case can be realized by the same processing sequence as in the second embodiment (FIG. 25), as indicated in FIG. 51 and FIG. 52/53.

Figure 58:
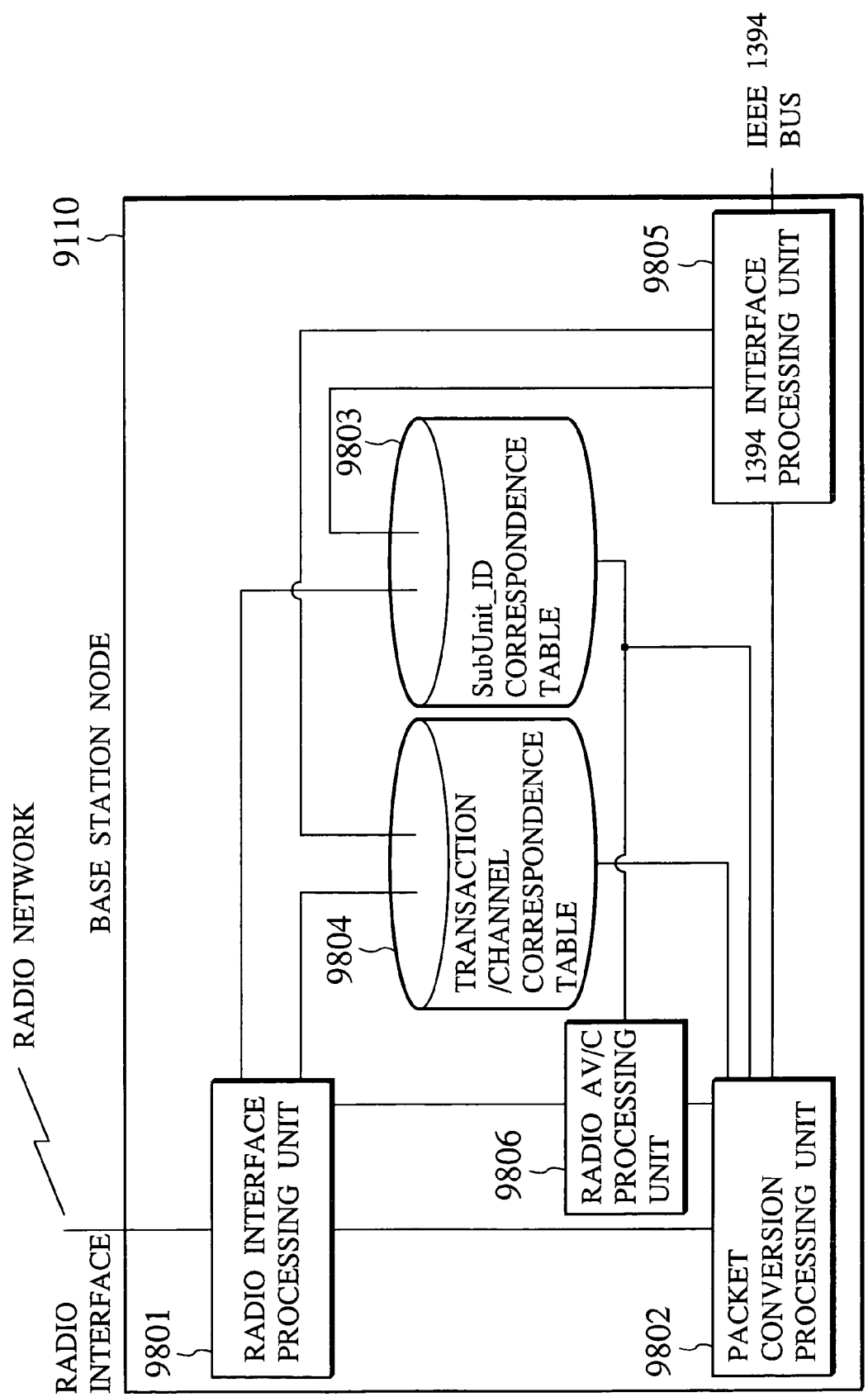
FIG. 58 is a block diagram showing an exemplary internal configuration of a base station node according to the sixth embodiment of the present invention.

FIG. 58 shows an exemplary internal configuration of the base station node 9110. In the base station node 9110, the processing for showing the Sub Unit information on the IEEE 1394 bus to the radio network side and the processing for showing the Sub Unit information on the radio network to the IEEE 1394 bus side are executed, and their correspondence is maintained. Also, at a time of carrying out the packet transfer between the IEEE 1394 bus and the radio network, the routing processing according to this Sub Unit information is executed.

In addition, the base station node 9110 maintains the correspondence between the transaction ID attached on the IEEE 1394 bus and the transaction ID attached on the radio network, and executes the routing processing at a time of the packet transfer between the IEEE 1394 bus and the radio network according to that correspondence.

In order to provide these functions, the base station node 9110 contains a radio interface processing unit 9801 for providing the interface function with respect to the radio network, a packet conversion processing unit 9802 for executing the conversion processing for an FCP frame between the IEEE 1394 bus and the radio network (more specifically the protocol conversion processing between an FCP frame for the AV/C protocol and an FCP frame for the radio AV/C protocol), and a 1394 interface processing unit 9805 for providing the interface function with respect to the IEEE 1394 bus.

The base station node 9110 also includes a Sub Unit_ID correspondence table 9803 for storing the correspondence between the Sub Unit information on the IEEE 1394 bus and the Sub Unit information on the radio network, and a transaction/channel correspondence table 9804 for storing the correspondence between the transaction ID attached on the IEEE 1394 bus and the transaction ID attached on the radio network as well as the correspondence between the Isochronous channel on the IEEE 1394 bus and the resource (channel) on the radio network, for the sake of the protocol conversion processing at the packet conversion processing unit 9802.

In addition, the base station node 9110 also includes a radio AV/C processing unit 9806 for executing the processing in the case of receiving the AV/C command (command according to the radio AV/C command) from the 1394 node to the radio terminal.

Besides these functions, the base station node 9110 may also have a function for executing the application on the IEEE 1394 bus or the application on the radio network, but such a function is not directly related to the present invention so that it is omitted in FIG. 58.

As described above, according to the present invention, it becomes possible to transmit various information transferred on the IEEE 1394 bus, to the radio node that is connected by the radio interface, and it becomes possible to execute the data communications as if the connection to the IEEE 1394 bus is made by the radio interface.

Also, even when the route blocking occurs in the radio section, it is possible to continue the data transfer without giving its influence to the IEEE 1394 bus side (without causing the bus reset), and even when the handoff processing is executed in the case where the radio terminal is moving, it is possible to continue the data transfer without giving its influence to the IEEE 1394 bus side (without causing the bus reset).

Thus, according to the present invention, it is possible to continue the data communications between the communication terminal connected to a first network and the communication node connected to a second network which is operated by a protocol different from the first network, without being influenced by the fluctuating factors on the first network side.

Also, according to the present invention, it is possible to flexibly handle functions provided at a node on the first network, in a network environment in which the first network such as the radio network and the second network such as the IEEE 1394 bus are mixedly present.

Note that the embodiments described above are equally applicable to the home network as well as to the other various types of networks.

Note also that, what has been described as the IEEE 1394 bus in the above can be replaced by a network other than the IEEE 1394 bus, and what has been described as the radio network in the above can be replaced by a network other than the radio network. For example, apart from the combination of the IEEE 1394 bus and the radio network described above, it is possible to consider a combination of the IEEE 1394 bus and a network other than the IEEE 1394 bus, a combination of a wire network other than the IEEE 1394 bus and the radio network, etc. For instance, the wire network other than the IEEE 1394 bus can be Ethernet, X.10, power line such as CEBus, or telephone line, etc.

It is to be noted that the above described embodiments according to the present invention may be conveniently implemented in forms of software programs for realizing the operations of the communication nodes and terminals, as will be apparent to those skilled in the computer art. Appropriate software coding can readily be prepared by skilled programmers based on the teachings of the present disclosure, as will be apparent to those skilled in the software art.

In particular, each of the communication node and the communication terminal as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A communication node which is a base station node, comprising:
   a first interface unit connected to a first network which is a radio network;
   a second interface unit connected to a second network which is a non-radio network;
   a processing unit configured to voluntarily recognize one communication node on the first network as one of constituent elements that constitute said communication node, and to disclose an own configuration information regarding what its constituent elements are to another communication node on the second network through the second interface unit such that said one communication node is recognized as a part of the communication node on the second network by said another communication node on the second network while said one communication node is actually existing only on the first network;
   wherein the processing unit also detects a first message identifier on the second network which is described in a packet received through the second interface unit, attaches a second message identifier on the first network to the packet at a time of transferring the packet to the first network, stores a correspondence between the first message identifier and the second message identifier into a correspondence table, and identifies a message identifier on the second network corresponding to one message identifier on the first network which is described in a packet sent from the first network, by referring to the correspondence stored by the correspondence table according to said one message identifier.

2. A communication node which is a base station node, comprising:
   a first interface unit connected to a first network which is a radio network;
   a second interface unit connected to a second network which is a non-radio network;
   a processing unit configured to voluntarily recognize one communication node on the first network as one of constituent elements that constitute said communication node and to disclose an own configuration information regarding what its constituent elements are to another communication node on the second network through the second interface unit such that said one communication node is recognized as a part of the communication node on the second network by said another communication node on the second network while said one communication node is actually existing only on the first network;
   wherein the processing unit also has at least one of a function for reserving a network resource on the second network by using a first resource information regarding a network resource reserved on the first network, and a function for reserving a network resource on the first network by using a second resource information regarding a network resource reserved on the second network, and stores a correspondence between the first resource information and the second resource information into a correspondence table.

3. A communication node which is a base station, node comprising:
   a first interface unit connected to a first network which is a radio network;
   a second interface unit connected to a second network which is a non-radio network; and
   a processing unit having at least one of a function for voluntarily disclosing a first configuration information regarding constituent elements that constitute one communication node on the first network as an own configuration information regarding what its constituent elements are to another communication node on the second network through the second interface unit such that said one communication node is recognized as a part of the communication node on the second network by said another communication node on the second network while said one communication node is actually existing only on the first network, and a function for voluntarily disclosing a second configuration information regarding constituent elements that constitute said another communication node on the second network as the own configuration information regarding what its constituent elements are to said one communication node on the first network through the first interface unit such that said another communication node is recognized as a part of the communication node on the first network by said one communication node on the first network while said another communication node is actually existing only on the second network;
   wherein the processing unit also detects a first message identifier on the second network which is described in a packet received through the second interface unit, attaches a second message identifier on the first network to the packet at a time of transferring the packet to the first network, stores a correspondence between the first message identifier and the second message identifier into a correspondence table, and identifies a message identifier on the second network corresponding to one message identifier on the first network which is described in a packet sent from the first network, by referring to the correspondence stored by the correspondence table according to said one message identifier.

4. A communication node which is a base station node, comprising:
   a first interface unit connected to a first network which is a radio network;
   a second interface unit connected to a second network which is a non-radio network; and
   a processing unit having at least one of a function for voluntarily disclosing a first configuration information regarding constituent elements that constitute one communication node on the first network as an own configuration information regarding what its constituent elements are to another communication node on the second network through the second interface unit such that said one communication node is recognized as a part of the communication node on the second network by said another communication node on the second network while said one communication node is actually existing only on the first network, and a function for voluntarily disclosing a second configuration information regarding constituent elements that constitute said another communication node on the second network as the own configuration information regarding what its constituent elements are to said one communication node on the first network through the first interface unit such that said another communication node is recognized as a part of the communication node on the first network by said one communication node on the first network while said another communication node is actually existing only on the second network;

wherein the processing unit also has at least one of a function for reserving a network resource on the second network by using a first resource information regarding a network resource reserved on the first network, and a function for reserving a network resource on the first network by using a second resource information regarding a network resource reserved on the second network, and stores a correspondence between the first resource information and the second resource information into a correspondence table.

5. A communication node which is a base station node, comprising:

a first interface unit connected to a first network which is a radio network;

a second interface unit connected to a second network which is a non-radio network;

a processing unit configured to carry out packet input/output processing according to a protocol of the second network, and transfer data to be exchanged at an interface between the processing unit and an application executed on another communication node on the second network, through the first interface unit, on behalf of the application executed on said another communication node on the second network, so as to handle one communication node connected through the first interface unit as if said one communication node is connected to the second network while said one communication node is actually existing only on the first network;

wherein the processing unit also detects a first message identifier on the second network which is described in a packet received through the second interface unit, attaches a second message identifier on the first network to the packet at a time of transferring the packet to the first network, stores a correspondence between the first message identifier and the second message identifier into a correspondence table, and identifies a message identifier on the second network corresponding to one message identifier on the first network which is described in a packet sent from the first network, by referring to the correspondence stored by the correspondence table according to said one message identifier.

6. A communication node which is a base station node, comprising:

a first interface unit connected to a first network which is a radio network;

a second interface unit connected to a second network which is a non-radio network;

a processing unit configured to carry out packet input/output processing according to a protocol of the second network, and transfer data to be exchanged at an interface between the processing unit and an application executed on another communication node on the second network, through the first interface unit, on behalf of the application executed on said another communication node on the second network, so as to handle one communication node connected through the first interface unit as if said one communication node is connected to the second network while said one communication node is actually existing only on the first network;

wherein the processing unit also has at least one of a function for reserving a network resource on the second network by using a first resource information regarding a network resource reserved on the first network, and a function for reserving a network resource on the first network by using a second resource information regarding a network resource reserved on the second network, and stores a correspondence between the first resource information and the second resource information into a correspondence table.

* * * * *